United States Patent
Chapel et al.

(10) Patent No.: US 8,907,520 B2
(45) Date of Patent: Dec. 9, 2014

(54) PARALLEL REDUNDANT POWER DISTRIBUTION

(75) Inventors: Steve Chapel, Iliff, CO (US); William Pachoud, Boulder, CO (US)

(73) Assignee: Zonit Structured Solutions, LLC, Boulder, CO (US)

( * ) Notice: Subject to any disclaimer, the term of this patent is extended or adjusted under 35 U.S.C. 154(b) by 353 days.

(21) Appl. No.: 13/208,333

(22) Filed: Aug. 11, 2011

(65) Prior Publication Data

US 2012/0181869 A1 Jul. 19, 2012

Related U.S. Application Data

(63) Continuation-in-part of application No. 12/569,733, filed on Sep. 29, 2009, now Pat. No. 8,004,115, which is a continuation-in-part of application No. 12/531,212, filed as application No. PCT/US2008/057140 on Mar. 14, 2008, now abandoned.

(60) Provisional application No. 61/372,752, filed on Aug. 11, 2010, provisional application No. 61/372,756, filed on Aug. 11, 2010, provisional application No. 60/894,842, filed on Mar. 14, 2007.

(51) Int. Cl.
*H02J 1/10* (2006.01)

(52) U.S. Cl.
USPC .......................................................... 307/23

(58) Field of Classification Search
USPC .......................................................... 307/23
See application file for complete search history.

(56) References Cited

U.S. PATENT DOCUMENTS

| | | |
|---|---|---|
| 2001/0024065 A1 | 9/2001 | Mcandrews |
| 2004/0076148 A1 | 4/2004 | Ferrys et al. |
| 2007/0052294 A1 | 3/2007 | Kraus |
| 2008/0258556 A1 * | 10/2008 | Ewing et al. .................... 307/23 |
| 2008/0317021 A1 | 12/2008 | Ives et al. |
| 2010/0141038 A1 | 6/2010 | Chapel et al. |
| 2010/0165529 A1 | 7/2010 | Turpin et al. |
| 2012/0181869 A1 | 7/2012 | Chapel et al. |

FOREIGN PATENT DOCUMENTS

| | | |
|---|---|---|
| EP | 1847001 | 1/2013 |
| JP | 09-117063 | 5/1997 |

* cited by examiner

*Primary Examiner* — Robert L. Deberadinis
(74) *Attorney, Agent, or Firm* — Marsh Fischmann & Breyfogle LLP; Kent A. Fischmann

(57) ABSTRACT

Systems and methods are provided for reliable redundant power distribution. Some embodiments include micro Automatic Transfer Switches (micro-ATSs), including various components and techniques for facilitating reliable auto-switching functionality in a small footprint (e.g., less than ten cubic inches, with at least one dimension being less than a standard NEMA rack height). Other embodiments include systems and techniques for integrating a number of micro-ATSs into a parallel auto-switching module for redundant power delivery to a number of devices. Implementations of the parallel auto-switching module are configured to be mounted in, on top of, or on the side of standard equipment racks. Still other embodiments provide power distribution topologies that exploit functionality of the micro-ATSs and/or the parallel micro-ATS modules.

33 Claims, 27 Drawing Sheets

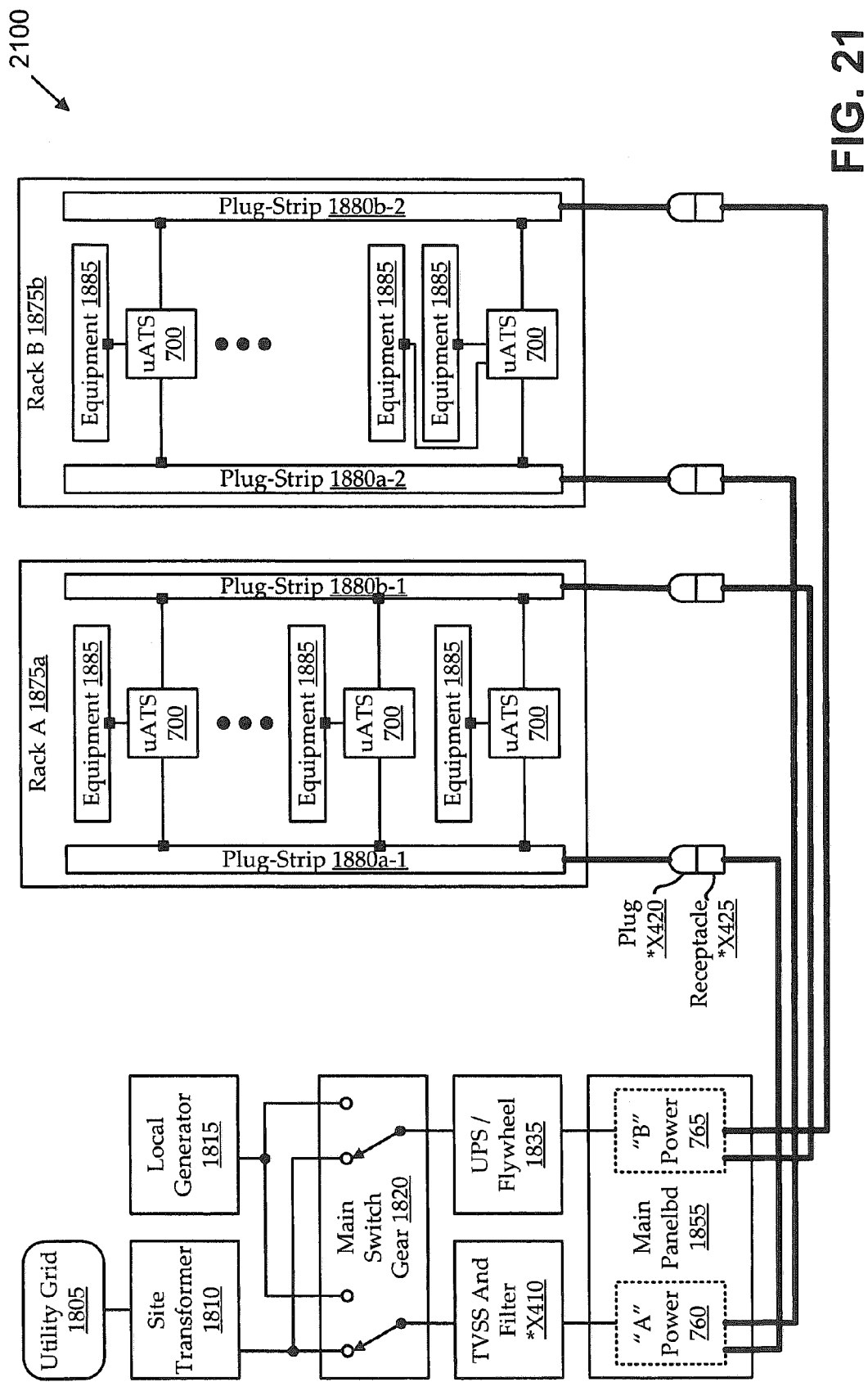

PARALLEL REDUNDANT POWER DISTRIBUTION

CROSS-REFERENCES

This application claims priority from U.S. Provisional Patent Application No. 61/372,752, filed Aug. 11, 2010, entitled "HIGHLY PARALLEL REDUNDANT POWER DISTRIBUTION METHODS," and from U.S. Provisional Patent Application No. 61/372,756, filed Aug. 11, 2010, entitled "REDUNDANT POWER DISTRIBUTION," both of which are hereby incorporated by reference, as if set forth in full in this document, for all purposes. This application is also a continuation-in-part of U.S. patent application Ser. No. 12/569,733, filed Sep. 29, 2009, entitled AUTOMATIC TRANSFER SWITCH MODULE, which, in turn, is a continuation-in-part of U.S. patent Ser. No. 12/531,212, entitled "AUTOMATIC TRANSFER SWITCH," filed on Sep. 14, 2009, which is the U.S. National Stage of PCT Application US2008/57140, entitled "AUTOMATIC TRANSFER SWITCH MODULE," filed on Mar. 14, 2008, which claims priority from U.S. Provisional Application No. 60/894,842, entitled "AUTOMATIC TRANSFER SWITCH MODULE," filed on Mar. 14, 2007, the contents of which are incorporated herein as if set forth in full.

FIELD

Embodiments of the present invention relate to design and operation of data centers and, in particular, to parallel redundant distribution of power including such distribution of power to critical equipment such as in medical contexts or in data center environments.

BACKGROUND

Data centers have a specific set of issues that they must face in relation to power supply and management. Traditional techniques in this area were developed from prior industrial electrical practice in a time when a typical data center held very small numbers of mainframe computers and the change rate was low. Now, data centers often contain tens of thousands of electronic data processing (EDP) devices with high rates of change and growth. Data centers are also experiencing rapidly growing power capacity demands driven, for example, by central processing unit (CPU) power consumption that is currently increasing at a rate of approximately 1.2 annually. Traditional techniques were not adopted to cope with these change rates, and data centers are therefore having great difficulty in scaling to meet those needs.

For example, in a typical data center power distribution network, the branch distribution circuit is the area where most incidents that result in a loss of power to a receptacle typically occur. Indeed, this is where people tend to make changes in the types and amounts of load. Possibly the most common cause of electrical failure, then, is the branch circuit breaker being tripped by a person plugging in a load that exceeds the capacity of the circuit.

In a data center environment, this issue can be complicated in cases where there are thousands of branch circuits present. Also, data centers tend to maintain loading of each branch circuit at or below about 75% of its capacity to account for "inrush loads" that can occur during a cold start, when all of the connected EDP equipment is powering up simultaneously (e.g., which may include spinning up fans, disk drives, etc.). This is typically considered as the highest load scenario; and, if not accounted for, it can trip the branch circuit breakers when it happens. A further contributing factor to this issue is that many information technology (IT) or data center personnel do not always know the power demands of the equipment they are installing, especially considering that the exact configuration in which the equipment is installed can vary the power it draws considerably.

One traditional technique that is used to address this issue is power monitoring. Power monitoring devices (e.g., via plugstrips with amperage meters or Power Distribution Units (PDUs), wall mounted or free-standing units which contain distribution circuit breakers that are connected to power whips that power equipment racks on the data center floor) can be used to determine a current power draw. However, for at least the reasons discussed earlier, sudden changes in power draw can cause sudden problems, which would not be easily remedied by such devices. For example, data center staff or users can trip circuit breakers when they install new equipment, potentially causing service interruptions, which may not be detected using power monitoring devices in time to prevent the issue.

Another factor that contributes to power distribution issues is that many models of EDP equipment have only one power supply, and therefore one power cord. This tends to be even more typical of medical equipment and other types of equipment that may often be deployed into mission-critical or life safety roles. However, since they only have one power input, they can be vulnerable to downtime due to power failures. Also, having only a single power cord and/or supply can complicate maintenance, which power systems can require from time to time. In fact, this can be true even if multiple independent power sources are available, when the device can only be plugged into one power source at a time.

One traditional technique that is used to address this issue is to install auto-switching power plugstrips. However, those plugstrips are typically bulky and expensive. Further, the types that are used in data centers are usually mounted horizontally in data equipment racks. This configuration can take up valuable rack space, and tends to take even more rack space with its two input plugs connected to two different power sources.

SUMMARY

The present invention relates to improved parallel distribution of power in various contexts including in data center environments. In particular, the invention relates to providing improved automatic transfer switches, for switching between two or more power sources (e.g., due to power failures such as outages or power quality issues), as well as associated power distribution architecture, components and processes. Some of the objectives of the invention includes the following:

Providing a high switch density ratio in connection with equipment racks, such that any failure of a switch will affect a small number (e.g., one or only a few pieces of equipment;

Providing a low switch overhead such that valuable rack space occupied only by switches, and not available for equipment, is minimized;

To minimize power cable routing and airflow issues in the data center equipment rack (2-post) and/or cabinet (4-post) (herein are encompassed in references in the text as equipment rack or "rack");

To allow the incorporation of locking power cord technologies at both ends of the power cord for more secure power delivery, for example in data centers located in seismically active geographies such as California;

To offer an alternate method to maximize the efficiency of usage of data center floor space and allow the deployment of the maximum number of equipment racks;

Providing a compact switch and rack/data center architectures enabled by such a compact switch;

Providing a variety of circuits for enhanced switch performance, including in compact switch designs;

To allow for use of narrower racks and more efficient use of data center floor space; and Providing coordinated control of multiple (two or more 0 switches as may be desired for polyphase power delivery or other reasons.

These objectives and others are addressed in accordance with the present invention by providing various systems, components and processes for improving power distribution. Many aspects of the invention, as discussed below, are applicable in a variety of contexts. However, the invention has particular advantages in connection with data center applications. In this regard, the invention provides considerable flexibility in maximizing power distribution efficiency in data center environments. The invention is advantageous in designing the power distribution to server farms such as are used by companies such as Google or Amazon or cloud computing providers.

In accordance with one aspect of the present invention, a method and apparatus ("utility") is provided to enable a high switch density at an equipment rack without dedicating substantial rack space to switch units. A high switch density is desirable so that a malfunction of a single switch does not affect a large number of EDPs. On the other hand, achieving a high switch density by way of a proliferation of conventional switch units, that may occupy 1 u of rack space per switch, involves a substantial trade-off in terms of efficient use of rack space. Various instantiations of automatic transfer switches (ATSs), as described herein, can be implemented using no. or little, dedicated rack space per switch, thus enabling high switch density without any undue burden to rack space.

Accordingly, the noted utility involves an equipment rack having a number of ports for receiving equipment, e.g., where each port may have a height of 1 u, it will be appreciated that some equipment may occupy multiple ports. The equipment rack system includes a number, N, of EDPs mounted in at least some of the ports of the rack and a number, S, of independently operating ATSs. Each of the ATSs is configured to received input power from first and second external power sources, to detect a power failure (e.g., a power outage or unacceptable power quality) related to the first external source, and to automatically switch its output power feed to be coupled to the second external source when a power failure related to the first external source is detected.

The noted equipment rack system has a switch density ratio defined as S/N. In addition, the equipment rack system has a switch overhead ratio, defined as a ratio of the number of ports occupied only by ATSs to the number of ports collectively occupied by the ATSs and the EDPs is less than S/(N+1).

For example, the switch density ratio may be at least 1/4 (and more preferably at least 1/2), and the switch overhead ratio may be less than 1/5 (and more preferably, less than 1/8). In data center environments, it is generally desired to use tall racks so that the floor space of the data center is efficiently utilized. For example, a rack may have a height of more than 30 u's and even more than 50 u's in some cases. Moreover, it is generally not desirable to leave many rack spaces unoccupied for the same reason. Accordingly, for practical purposes, it is expected that data centers will often be configured so that EDPs occupy at least 20 ports of the rack. In such cases, the present invention enables high switching densities while occupying no more than 2 of the ports with ATSs. For example, multiple ATSs (e.g., 12 or more ATSs) may be disposed in one or more enclosures that are collectively occupy only 1 or 2 u's of the rack. In some implementations described below, more of the rack ports of spaces are dedicated to switching units and each piece of equipment can have its own ATSs (i.e., a switch density ratio of 1 and a switch overhead ratio of 0).

According to another aspect of the present invention, a utility is provided for use in supplying redundant parallel power to electronic data processing system. The utility involves a number of automatic transfer switches disposed within an enclosure sized to fit within a single standard equipment rack space. Each of the ATSs is configured to receive a first power feed from a primary power source disposed external to the enclosure, receive a second parallel power feed from a secondary power source disposed external to the enclosure, detect a power failure on the first parallel power feed, and automatically switch an output power feed from being electrically coupled with the first parallel power feed to be electrically coupled with the second parallel power feed when the power failure in the first parallel power feed is detected. In this manner, a number of ATSs can be disposed in a single rack space.

Preferably, the enclosure has a height of no more than approximately 1.5 u and may have a height of 1 u, i.e., no more than about 1.75 inches. Moreover, each ATS preferably has a power density of at least about 2 kilowatts per 10 cubic inches. In this manner, substantial switching capacity can be provided within the spatial-envelope of one or two u's of a standard rack. In certain embodiments, multiple ATSs may be disposed in a single housing that may occupy less than two, for example, one u of rack space. For example, 12 or more ATSs, each having a power density of 2 kilowatts can be contained in 1.5 u's of rack space or less. Such embodiments allow for elimination of plugstrips along side equipment in the racks, thus, allowing for narrower racks and more efficient use of data center floor space.

BRIEF DESCRIPTION OF THE DRAWINGS

The present disclosure is described in conjunction with the appended figures:

FIG. 21 shows an illustrative power distribution topology, according to various embodiments;

Figure 1:
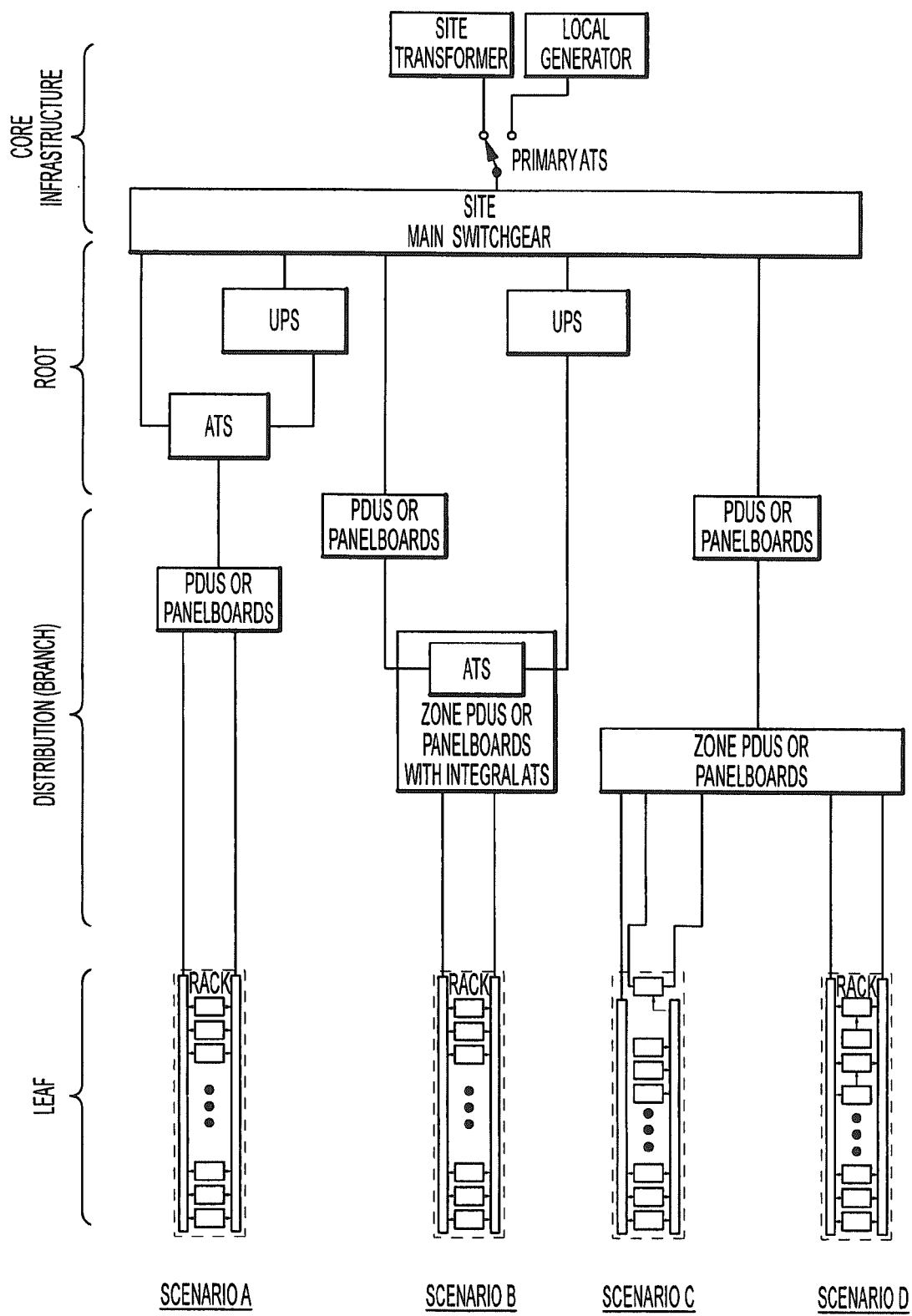
FIG. 1 shows a example of a power distribution topology.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

The following description is structured in two sections, Section 1 discusses the issues involved in data center power distribution and inventive solutions to those problems and Section 2 discusses detailed methods that can be used to construct an automatic transfer switch with the characteristics needed to build the inventive solutions described in and associated rack/data center architectures. It should be noted that the detailed methods described can also be used for other purposes than constructing automatic transfer switches.

Section 1

I. Background—Power Distribution Reliability & Maintenance Issues

The branch distribution circuit is the area where most incidents that result in a loss of power to a receptacle occur. The cause is simple, this is where people make changes in the types and amounts of load. The most common cause of electrical failure is the branch circuit breaker being tripped by a person plugging in a load that exceeds the capacity of the circuit.

In a data center environment this issue is complicated by the fact that there can be thousands of branch circuits present. Also, in a data center, each branch circuit must usually only be loaded to 75% of its capacity, to account for the "inrush load" that occurs during a cold start, when all of the connected electronic data processing (EDP) equipment is powering up simultaneously, spinning up fans, disk drives, etc. This is the highest load scenario, and if not accounted for, it will trip the branch circuit breaker when it happens. A contributing factor to this issue is that most IT or data center staff do not always know what the power demands of the equipment they are installing will be, especially in the exact configuration the equipment has, which can vary the power it draws considerably.

Power monitoring is often used (via plugstrips with amperage meters or Power Distribution Units (wall mounted or free-standing units which contain distribution circuit breakers that are connected to power whips that power equipment racks on the data center floor) to determine the current power draw. However, for the reasons discussed earlier, frequently data center staff or users can trip circuit breakers when they install new equipment, potentially causing service interruptions.

Note: For convenience we will use the term equipment rack to describe both of the terms "equipment rack" and "equipment cabinet", which are often used for 2-post vs. 4-post racks.

A method of increasing power reliability is to use an automatic transfer switch (ATS) at various points in the power distribution topology to provide for automatic failover from a primary power source to a backup power source. This is typically done at one of three points in the power distribution topology, the panelboard on the wall, where the branch circuits originate, the end of the branch circuit in the rack where the power is fed to plugstrips or between the plugstrip and the EDP equipment being powered.

The choice of where to place auto-switching in a power distribution topology has a number of issues to consider.

1. Domain of failure—This is the number of power receptacles that will be affected if the ATS fails to function properly. All power distribution topologies used in data centers can be considered rooted tree graphs, mathematically speaking.

The closer to the root of the tree the ATS is located, the higher the number of power receptacles that will be affected by the actions of that ATS. This is shown in FIG. 1, which shows an example power distribution topology. For the purposes of this discussion, the root(s) of the graph(s) of the power distribution topology are "downstream" of the core power infrastructure. The root(s) start at a UPS unit or a power distribution panelboard. In this model the power distribution panel is either a root or a distribution layer node. The branch circuits originate at the power distribution panel and end at the equipment racks. At the rack, power is distributed via plugstrips (which are confusingly also called power distribution units ("PDU") a term that is often applied to the panelboard). The plugstrips may have circuit breakers in them, also. However, for the purposes of this discussion, we will use the terms panelboards and plugstrips.

It should be noted that large data centers often have many generators and UPS units, since there is a limit to the capacity size you can buy and if you exceed that limit you have to put multiple UPS units in and run them in parallel. Each UPS in this situation will be a root in the power distribution topology. Similarly, you will usually use multiple power distribution panelboards, since they come only so large in power capacity and number of circuit breaker stations. Also, it is more efficient to locate your panelboards so as to minimize the average power whip length, so you tend to use as many as is practical to accomplish this.

ATS switches can be used with panelboards and will switch every branch circuit in a given panelboard to a secondary power source when the primary power source fails. However, the primary design issue with this methodology is if the ATS at the panelboard fails, many EDP devices will be deprived of power. A typical panelboard has a capacity of 225 KVA, and 84 or 96 circuit breaker stations. This can power approximately up to 40 racks via 28-96 branch circuits (depending on the type and number of branch circuits and the average number of watts used per rack). Having 40 racks go down due to ATS failure in a data center is a major hit that can have very serious service impacts. This type of failure has happened in numerous data centers.

2. Power distribution efficiency—This is the amount of power that is "lost" by the insertion of automatic transfer switches into the power distribution system. No automatic transfer switch is 100% efficient, they all have a loss factor. There are two primary types of automatic transfer switches, relay based and solid state based. They have different characteristics with regards to power loss and transfer time. Transfer time between the power sources is important because the power supplies used in modern EDP equipment can only tolerate very brief power interruptions. The Computer and Business Equipment Manufacturers Association (CBEMA) guidelines used in power supply design recommend a maximum outage of 20 milliseconds or less.

a. Mechanical Relay Based ATS

These switches use one or more relays to switch between their input power sources. A relay has two primary loss factors, the contact area of the relay and if the relay requires power to keep it in the "on" state, where it is conducting current. The shape and material of the contacts is carefully chosen and engineered to minimize resistance across the contacts, yet minimize or prevent arcing across the contacts when they are switching. Also, since some arcing may occur in some circumstances, the contacts must be designed to minimize the possibility of the arc "welding" the contacts shut, which is very undesirable.

Another design issue is transfer time of the relay. The contacts are mounted (usually on an armature) so that they can be moved to accomplish their switching function. The contact mass, range of motion, mechanical leverage and force used to move the armature are all relay design issues. The range of motion is dictated by the gap needed between the contacts to minimize arcing at the maximum design current level. As the maximum design current is increased, the gap must also increase. The mass of the contact must be accelerated by the force applied to the armature, which has a practical limit.

These factors impose a limit on the amount of current that can be sent through a pair of contacts and still maintain an acceptable transfer time for EDP equipment. EDP equipment CBEMA guidelines recommend a maximum of approximately 20 milliseconds of power outage for continued operation of modern switched power supplies. If the mass of the armature and contact gap are too large, the relay transfer time exceeds this time limit.

Well designed relay based automatic transfer switches have a loss factor of about 0.5% or less. They also have power supplies to power their internal logic that typically use in the range of 12-20 watts in operation.

b. Solid State ATS

These switches use solid state semiconductors to accomplish switching between their input power sources and their output load. They can switch faster than relay based switches, because they use semi-conductor based switching, not mechanical relays. However, the semiconductors have a loss factor and the efficiency of this type of switch is less than that of a relay based switch, typically around 1%. Also, they are usually less reliable, unless they are built with redundant internal failover capability, which makes them much more expensive. Again, they also have power supplies to power their internal logic that typically use in the range of 12-200 watts or more in operation, depending on the size of the transfer switch, and the level of redundancy offered by the switch.

3. Rack Space Usage

Rack space in a data center is expensive. The data center infrastructure of generators, UPS units, power distribution, raised floor, computer room cooling, raised floors, etc. is a very large capital investment and a large ongoing operational expense. 1U of rack space in a standard 42U equipment cabinet is 2.5% of the space available in that rack. Putting rack mounted automatic transfer switches in large numbers in equipment racks uses a lot of rack space, which represents a loss of space that can be used for EDP equipment. This is very undesirable, which is one reason it is not done.

It should be noted that the transfer switch(es) that are upstream of the UPS units are part of the core power infrastructure not the power distribution. Automatic transfer switching is done in the core infrastructure to insure continuity of connection to a valid power source, such as utility power grid feeds or generators. The transfer time of relay based switches that can handle the power capacities required in the core infrastructure is too slow to avoid (a time of 20 milliseconds or less is recommended for EDP equipment by CBEMA guidelines) shutdown by connected EDP equipment for the reasons described earlier. This is why transfer switches of this type are placed upstream of the UPS units where the brief power outages that these switches create on transfer are covered by the UPS units.

Large State Transfer switches can be used in the core infrastructure, and they are fast enough to switch under the 20 millisecond CBEMA guideline. However, they are very expensive and can represent a single point of failure. And again, they have an unfavorable loss associated with power flowing through the semiconductor devices.

We will discuss later how it is possible to construct a large capacity, fast, efficient and relatively low cost Automatic Transfer Switch by combining many smaller Zonit Micro Automatic Transfer Switches in parallel with integrated control logic as needed.

II. Invention Overview—Highly Parallel Auto-Switched Power Distribution & Appropriate ATS Designs

A. Highly Parallel Auto-Switched Power Distribution

The solutions we have invented are innovative and provide considerable benefits. They are a number of power distribution methods that utilize inventions we have made in creating automatic transfer switches (ATS) that allow these new methods to be used. The automatic transfer switch we are using as a descriptive example, the Zonit Micro Automatic Transfer Switch (μATS™) incorporates the inventions described in PCT Application No. PCT/US2008/057140, U.S. Provisional Patent Application No. 60/897,842, and U.S. patent application Ser. No. 12/569,733, which are fully incorporated herein by reference.

Current automatic transfer switches have specific limitations that prevent useful implementations of highly parallel auto-switched power distribution methods from being used. They are too inefficient, consume too much rack space and cost too much.

The Zonit μATS™ is very small (4.25"×1.6"×1"<10 cu. inches), very efficient (<0.2V @ maximum load loss) and requires no rack space, since it can be self-mounted on the back of each EDP device or incorporated in the structure of the rack outside the volume of the rack used to mount EDP equipment or in rack mounted plugstrips or in a in-rack or near-rack Power Distribution Unit, due to its very small form-factor. It should be noted that the μATS™ is small enough that it could be integrated into EDP equipment also.

This small form factor also helps enable the usage of 24" outside-to-outside width EDP equipment cabinets, which have two key advantages, they fit exactly on 2'×2' raised floor tiles which makes putting in perforated floor tiles to direct air flows easy, since the racks align on the floor tile grid and they saves precious data center floor space. This is true since NEMA equipment racks are not standardized for overall rack width, and the narrower the rack is, the more racks can be fit in a given row length. For example a 24" rack will save 3" over the very common 27" width racks and that represents one extra rack for each 8 equipment racks in a row. This is now practical with modern EDP equipment, since almost all models now utilize front to back airflow cooling. Side-to-side cooling used to be common, but has now almost completely disappeared. The caveat is that there is much less space on the side of the 24" rack for ancillary equipment like vertical plugstrips, automatic transfer switches, etc. so those components must be as small a form-factor as is practical so that they can fit into the rack.

The μATS™ allows efficient, cost-effective and rack space saving per device or near per device (ratios of 1 μATS™ to 1 EDP device or 1 μATS™ to a low integer number of EDP devices) highly parallel and highly efficient auto-switched power distribution methods to be utilized. It should be pointed out that the ratio of μATS™ units to EDP equipment can be selected to optimize several interrelated design constraints, reliability, cost and ease of moving the EDP device in the data center. The 1 to 1 ratio maximizes per device power reliability and ease of moving the device while keeping it powered up. (Note: This can be done with a device level ATS, especially one like the μATS™ by doing a "hot walk" where you move the device by first unplugging one ATS power cord, moving the plug to a new location, unplugging the second ATS power cord, etc. Long extension cords make "hot walks" easier. Ethernet cables can be unplugged and reinserted without taking a modern operating system down and TCP/IP connections will recover when this is done. So, it can and has been done. The authors have done this procedure personally. Obviously, cost can be reduced by using other ratios than 1 to 1 for μATS™ units to EDP devices. The limiting factor in this case is usually μATS™ power capacity and what raised level of risk the data center manager is willing to take, since the more devices connected to any ATS the greater the impact if it fails to function properly.

A. Traditional Power Distribution Methods

Figure 2:
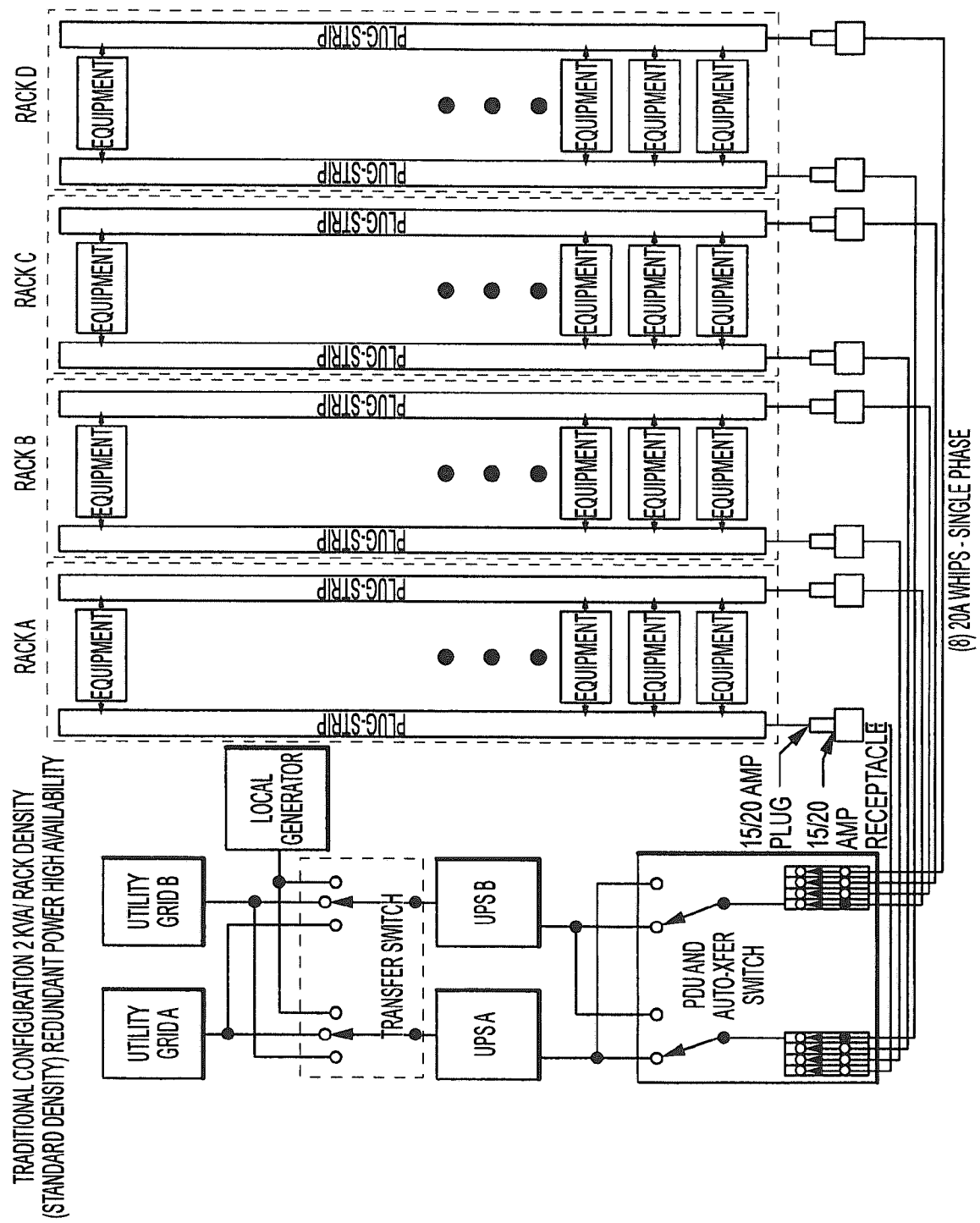
FIG. 2 shows a power distribution designed for a typical data center.
Figure 3:
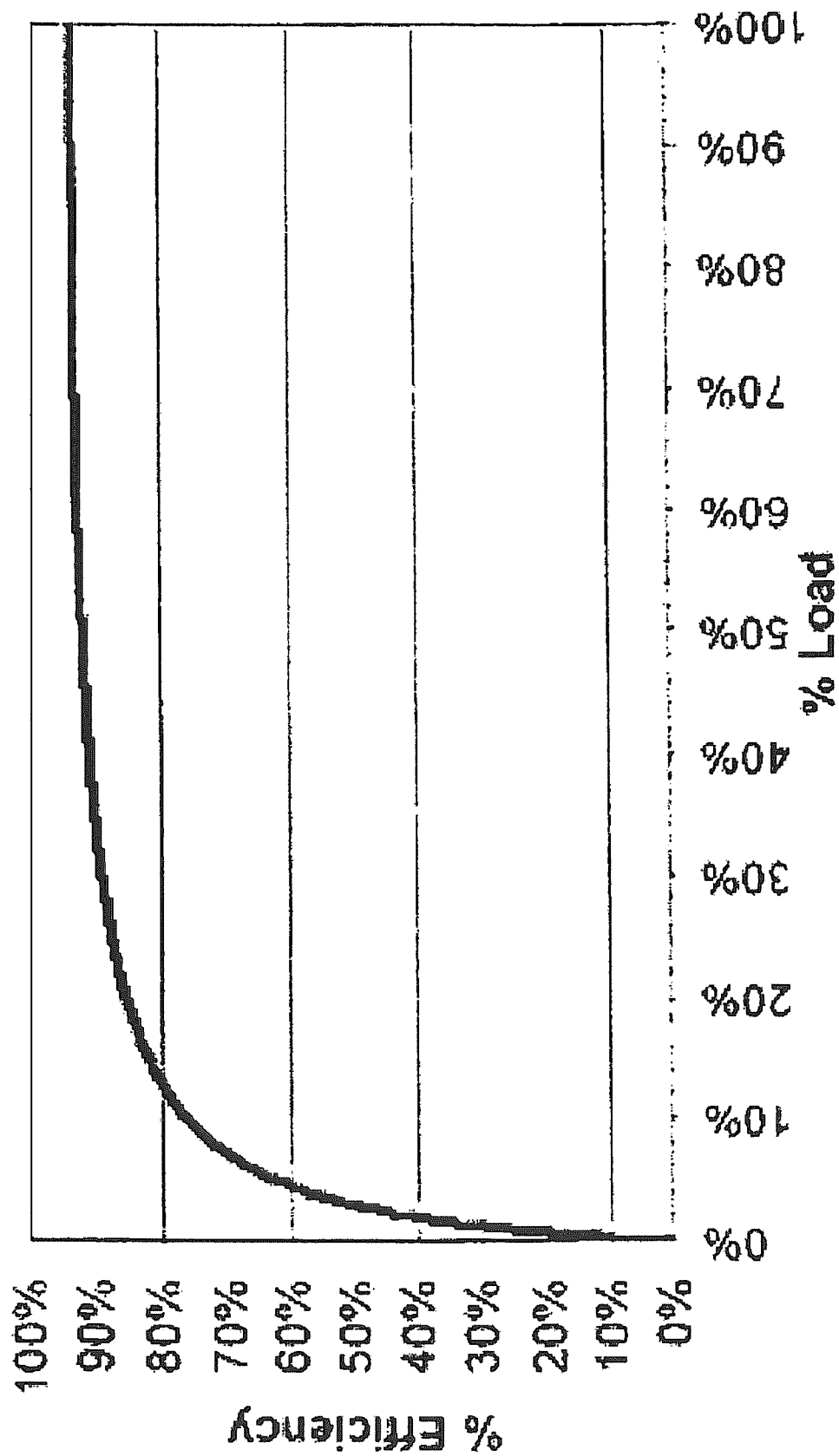
FIG. 3 shows how power efficiencies vary with load changes for double conversion UPS units used in data centers.

Typical data centers use a power distribution design as shown below in FIG. 2. They use double conversion Uninterruptible Power Supply (UPS) units or much more recently, flywheel UPS devices. The best double conversion UPS units used in data centers have power efficiencies that vary as their load changes as shown in FIG. 3. They typically average 85-90% efficiency, flywheel UPS units average ~94% efficiency at typical load levels. This level of efficiency was acceptable when power costs were stable, relatively low and the climate impacts of carbon based fuels was not fully appreciated. Power is now quickly changing from an inexpensive commodity to an expensive buy that has substantial economic and environmental costs and key implications for national economies and national security. A traditional UPS powered data center more typically has efficiencies in the 88-92% range, because no data center manager wants to run his UPS units at 100% capacity, since there is no margin for any needed equipment adds, moves or changes. Also, as is typical, the load between the UPS units is commonly divided so that each has approximately ½ the load of the total data center. In this case, neither UPS can be loaded above 50% since to be redundant, either UPS must be able to take the full load if the other UPS fails. This pushes the UPS efficiency even lower, since each unit will usually not be loaded up above 40-45% so that the data center manager has some available UPS power capacity for adds, moves and changes of the EDP equipment in the data center.

Figure 4:
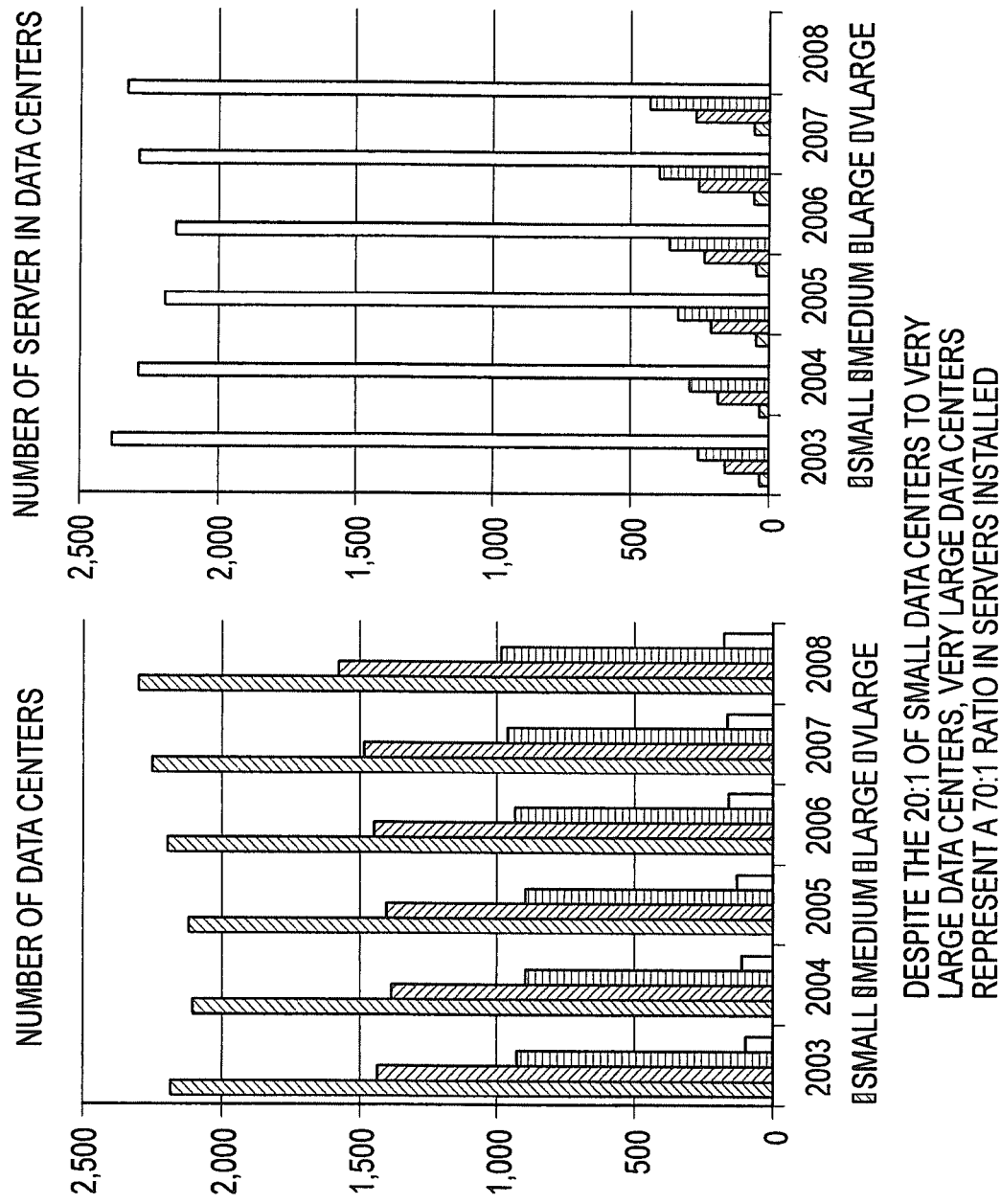
FIG. 4 shows illustrates the increase in large data centers that use large numbers of servers in recent years.

The graphic shown below in FIG. 4 illustrates an important point. The number of very large data centers that house extremely high numbers of servers has been on the increase for the last five years or more. The server deployment numbers are huge. There are a number of commercial organizations today that have in excess of one million servers deployed. With facilities of this scale and the increasing long-term cost of power, making investments in maximizing power usage efficiency makes good sense, economically, environmentally and in terms of national security. This issue will be discussed further as we discuss how to best distribute power in data centers to their servers and other EPD equipment, it is an important point that needs innovative solutions such as we present.

Servers are currently most cost effective when bought in the "pizza box" form factor. The huge numbers of servers deployed in these data centers currently are almost all "commodoity" Intel X86 architecture compatible CPU's. This is what powers most of the large server farms running large Web sites, cloud computing running VMWare or other virtualized solutions, and high performance computing (HPC) environments. It is the most competitive and commoditized server market segment and offers the best server "bang-for-the-buck". This is why it is chosen for these roles.

Commodity servers have great pressure to be cost competitive, especially as regards their initial purchase price. This in turn influences the manufacturers product manager to choose the lowest cost power supply solution, potentially at the expense of best power efficiency, an issue that has impacts that will be discussed further below.

FIG. 4—Data Center Size and Server Counts

There are several reasons to put multiple (dual or N+1 are the most common configurations) power supplies into EDP equipment. The first is to eliminate a single point of failure through redundancy. However, modern power supplies are very reliable with Mean Time Between Failure (MTBF) values of about 100,000 hours=11.2 years, well beyond the typical service life of the EDP equipment. The second reason that multiple power supplies are used is to allow connection to more than one branch circuit. This is the most common point of failure for power distribution, as discussed earlier. Also, having dual power connections makes power system maintenance much easier, by allowing one power source to be shut down without affecting end user EDP equipment.

However, putting multiple power supplies in EDP equipment has costs. The additional power supply(s) cost money to buy. They are almost always specific to each generation of equipment, and therefore must be replaced in each new generation of equipment, which for servers can be as short as three years in some organizations.

Power supplies also have a loss factor, they are not 100% efficient and the least expensive way to make a power supply is to design it to run most efficiently at a given load range typically +−20% of the optimum expected load. Power supplies have an efficiency curve that is similar to UPS units, such as was shown in FIG. 2. This presents another issue. The product manager for the server manufacturer may sell that server in two configurations, with one or two power supplies. In that case, he may chose to specify only one power supply model, since to stock, sell and service two models is more expensive than one model of power supply. This trades capital expense (the server manufacturer can sell the server at a lower initial price point) vs. operational expense. This is because with two AC to DC power supplies, the DC output bus will almost always be a common shared passive bus in the class of commodity server that is most often used in large scale deployments. Adding power source switching to this class of server to gain back efficiency (only one power supply at a time takes the load) is generally too expensive for the market being served. It also adds another potential point of failure that costs to make redundant if needed for greater reliability.

Typical Modern EDP power supplies are almost all auto-ranging (accept 110-240V input) and all switched (Draw on the Alternating Current [AC] input power for just a short period of time and then convert this energy to Direct Current [DC], then repeat). Power supplies of this type are more resistant to power quality problems, because they only need to "drink" one gulp at a time, not continuously. If the input AC power voltage range is controlled within a known range, they will function very reliably. They do not require perfect input AC waveforms to work well. All that is necessary is that they receive sufficient energy in each "gulp" and that the input power is within the limits of their voltage range tolerance. This makes it possible to use a data center power distribution system that is much more efficient than a fully UPS supplied power system at a very reasonable capital expense.

B. Very Efficient Power Distribution Using Highly Parallel Automatic Transfer Switching The primary source of loss in traditional data center power systems is the UPS unit(s). Conversion losses are the culprit as we discussed earlier. It is possible to avoid these losses by using filtered utility line power, but this brings a set of issues that need to be solved for this methodology to be practical that are discussed below. Such a design is shown below in FIG. 5 The power filtering is done by a Transient Voltage Surge Suppression (TVSS) unit, a very efficient (99.9%+) and mature technology.

1. Input Voltage Range Control

Modern power supplies can tolerate a wide range of power quality flaws, but the one thing that they cannot survive is input power over-voltage for too long. A TVSS Unit will filter transient surges and spikes, but it does not compensate for long periods of input power over-voltage, these are passed through. To guard against this possibility, the data center power system we are discussing must deal with out of range voltage (since modern power supplies are not damaged by under-voltage but will shutdown) by switching to the conditioned UPS power if the utility line power voltage goes out of range. We are going to discuss two ways to do this. Voltage sensing and auto-switching could be put in at other points in the data center power system, but for the reasons discussed earlier, the options we present are the most feasible.

The first place that over-voltage protection can be implemented is at the utility step-down transformer. Auto-ranging transformers of this type are available and can be ordered from utility companies. They have a set of taps on their output coil and automatically switch between them as needed to control their output voltage to a specified range. Step-down transformers of this type of this type are not usually deployed for cost reasons by utility companies, but they can be specified and retrofitted if needed.

The second place in the data center power system that over-voltage protection can be implemented is at an ATS in the power distribution topology. This can be done at the ATS at a panelboard or at an ATS at the end of a branch circuit, or at an ATS at the device level. The last is what we chose for reasons that are discussed later. It should be noted that a semiconductor based ATS could be used upstream of the UPS, but this is very expensive and the results of a failure of the ATS are potentially catastrophic, all of the powered EDP units could have their power supplies damaged or destroyed if the ATS unit fails to switch. This is a large downside to chance.

2. Auto-Switching of all single power supply (or cord) EDP devices

If utility line power fails, all single power supply EDP devices must be switched to a reliable alternate power source, such as a UPS. This must be done quickly, within the CBEMA 20 millisecond guideline. Plugging all of these devices directly into the UPS solves the reliable power issue, but defeats the goal of raising power distribution efficiency by only using the UPS during the times when utility power is down. This is especially important in large server farms, where the cost constraints are such that single power supply configurations for the massive number of servers are greatly preferred for cost and efficiency reasons and services will not be much or at all interrupted by the loss of a single or a few servers.

3. Auto-Switching of all dual (or N+1) power supply in EDP devices

Almost all EDP devices share the load among all available power supplies in the device. It is possible to build an EDP device that switches the load between power supplies, so that only one or more are the active supplies and the others are idle, but as described earlier, this is rarely done for both cost and reliability reasons. To insure that multi-power supply EDP devices draw on only filtered utility line power if it is available and switch to the UPS if it is not, each of the secondary power supply units needs to be auto-switched between the utility line and UPS unit(s). Otherwise, the UPS unit will bear a portion of the data center load, lowing the overall efficiency of the power distribution.

4. Avoidance of Harmonic Reinforcing Power Load Surges

If utility line power fails, all EDP devices must draw on the UPS unit until the generator starts and stabilizes. Modern generators used in data centers have very sophisticated electronics controlling their engine "throttle". The control logic of the generator is designed to produce maximum stability and optimum efficiency. However, it takes a certain amount of time to respond to a changed electrical load and then stabilize at that new load. If the load put on the generator changes too fast in a repeating oscillation pattern, it is possible to destabilize the generator, by defeating its control logic and forcing it to try to match the oscillations of the power demands. This can either damage the generator or force it to shutdown to protect itself. In either case the data center can potentially go off-line, a very undesirable result. There are several potential scenarios that can potentially cause this problem.

a. Intermittent Utility Line Failure

Utility line power is outside the control of the data center operator. It can be affected by weather, equipment faults, human error and other conditions. It can fail intermittently which poses a potential hazard to the core data center power infrastructure. If utility power goes on & off intermittently and the timing of the on-off cycles is within a certain range, auto-switching between the utility line source and the generator (even filtered by the UPS units) can result in harmonic reinforcing power load surges being imposed on the generator. This can happens as follows:

i. The utility line power fails
ii. Power is switched to UPS
iii. A timeout occurs and the generator is auto-started
iv. The generator stabilizes and is switched into the system, feeding the UPS
v. The utility line power returns, then goes off again
vi. The generator will not have shutdown, but the core ATS switches may now switch between the generator and utility line sources.

The end-user equipment ATS units will return to line power when it is back on. The timing of this return is a crucial issue. If it happens too fast for the generator to respond properly, and utility line power fails in an oscillating fashion, then the generator can be destabilized as described earlier.

b. Load/Voltage Oscillation

When a load is switched onto the generator, especially a large load, its output voltage momentarily sags. It then compensates by increasing throttle volume and subsequent engine torque, which increases output current and voltage. There are mechanisms to keep the output voltage in a desired range, but they can be defeated by a load that is switched in and out at just the right range of harmonic frequency. This can happen if the power distribution system has protection from overvoltage built into it via mechanisms we will discuss later. The end result can be harmonic reinforcing power load surges being imposed on the generator. This can happens as follows:

i. The utility line power fails
ii. Power is switched to UPS
iii. A timeout occurs and the generator is auto-started
iv. The generator stabilizes and is switched into the system, feeding the utility line power side of the system. Note: This is done in preference to feeding through the UPS in order to maintain redundant feeds to the racks w/ EDP equipment.
v. The generator sags under the large load suddenly placed on it. It then responds to the load by increasing its throttle setting.
vi. The generator overshoots the high voltage cutoff value of the highly parallel ATS units and they switch back to UPS removing the load from the generator.
vii. The generator then throttles back and its output voltage returns to normal levels.
viii. The highly parallel ATS units switch back to the generator, causing it to sag again
ix. Steps vi-viii repeat and can cause a harmonic reinforcing power load surge to build up and destabilize the generator.

We have now identified four issues that must be solved to be able to safely, reliably and economically use filtered utility line power.

1) Input Line power voltage range control
2) Auto-switching of single power cord EDP devices
3) Auto-switching of dual or N+1 power supply EDP devices
4) Prevention of Harmonic Reinforcing Load Surges The solution that we have selected for these problems is to auto-switch at the device or near device level in the power distribution topology. This solution has a number of benefits over other methods of auto-switching which will be discussed, but requires an automatic transfer switch with specific characteristics. The chosen auto-switch needs to have the following qualities.

1) Must prefer and select the primary power source when it is available and of sufficient quality. This is required. For the power distribution system we are discussing, if utility line power is available and of sufficient quality, you want all loads put on it, for maximum efficiency.
2) Must protect against out of range voltage on primary power source and switch to secondary power source if primary power source is out of range. It is also desirable, but not required that if the primary power source has other quality issues, that the ATS switch to the secondary (UPS) power source as a precaution. As noted earlier, this is not required, modern power supplies are relatively immune to any power quality issues except input voltage range, but it doesn't hurt to play it safe.
3) Must transfer within the CBEMA 20 millisecond limit in both directions, primary to backup power source and backup to primary power source.
4) Must incorporate a delay factor in B to A switching (except if the B power source fails) to prevent Harmonic Reinforcing Load Surges. The delay factor chosen must be sufficient to allow modern generators to stabilize their throttle settings and not oscillate.
5) Should maximize the space efficiency of use of the data center floor space. There are two ways to look at this issue, maximize the efficiency of the dimensions of the equipment rack and/or maximize the efficiency of the use of the volume of space the rack provides for mounting EDP equipment. This involves consideration of several factors.

a. EDP equipment rack dimensions

Standard NEMA racks are only standardized in one dimension, the width of the equipment that is mounted in the rack as reflected in the spacing of the vertical mounting flanges used in the rack (and the spacing of the fastener holes in those vertical mounting flanges). They are not standardized for total overall width, height or depth.

The height is generally limited by stability issues, with around 50U (1U=1.75") being near the practical limit, without special bracing to prevent rack tip-over. The depth is generally limited to what the projected maximum depth of the mounted EDP equipment will be. The current maximum depth of most EDP equipment is around 36" with a few exceptions. The overall width of the rack is dependant on what kinds of cabling, power distribution devices and sometimes cooling devices the rack designer may want to support mounting on the sides of the rack, outside the volume occupied by EPD equipment mounted in the rack. The NEMA standard equipment width that is most commonly used is 19".

Most NEMA standard racks for 19" equipment are around 27" wide to allow adequate space to mount a variety of vertical plugstrips in the sides of the rack. These plugstrips (also sometimes called power distribution units) do not have industry standardized dimensions, so it is difficult for equipment rack manufactures to optimize their rack dimensions for all available vertical plugstrips. Therefore the total width and depth of the rack determine its floor area usage. By eliminating the need to run anything but power cords and network cords down the sides of the rack (or optionally down the back of the rack), it is possible to specify narrower racks, down to a width of approximately 21". This is more space efficient. If for example, 24" racks (which align nicely onto the 2'×2' floor tiles used in most raised floors) are used vs. 27" racks, then one additional 24" rack can be deployed in a row of 8 racks. This is a significant gain in data center floor space utilization.

It should be pointed out that to use this approach the data center designer must select racks with appropriate dimensions, so this is most easily done during initial buildout or when an extensive remodel is being executed.

b. Usage of Equipment Mounting Volume within the rack.

Another approach is to not use any of the rack volume that could be used for EDP equipment. This means that the ATS should mount in a zero-U fashion or otherwise be integrated into or near the rack without using rack space that could be used to mount EDP equipment. It could be integrated into EDP equipment directly. It could also be integrated into plugstrips or in-rack or near-rack power distribution units such as the Zonit Power Distribution Unit (ZPDU), which trades a slight amount of rack space usage against access at the rack to the circuit breakers controlling power to the plugstrips in the racks. In this case the ATS function must be integrated into every sub-branch output of the ZPDU, so that each one is auto-switched. This is a potentially worthwhile trade-off to some data center managers. As discussed earlier, rack space is very expensive. It is not cost effective to use it for device level ATS units.

6) Must be very, very efficient. When deploying ATS units at the device level, there will be a large number of them. So, they must be very efficient or they will consume more power than they are worth to implement. Which leads to the last needed characteristic.

7) They must be relatively inexpensive to buy. This has two aspects, how much does each one cost, and how long will it last. Both determine the cost efficiency of the ATS chosen.

8) Must be highly reliable. This is required, or the power distribution design will not be feasible to implement.

The Zonit μATS™ has all of the needed qualities. Its design is specific to that set of requirements, and incorporates patent pending means of accomplishing each of those requirements.

Prefers Primary Source

The μATS™ is designed to always use the primary power source if it is available and of sufficient quality Input Voltage Range Control The μATS™ monitors voltage on the primary input and switches to the secondary source if it is out of range. It switches back to the primary source when it returns to the acceptable range and is stable.

Switches between power sources within the CBEMA 20 ms guideline

The μATS™ switches from A to B in 14-16 milliseconds. Faster switching times are can be achieved, but the times chosen maximize rejection of false conditions that could initiate a transfer. The B to A transfer times are approximately 5 milliseconds once initiated. This is possible because most B to A transfers occur after A power has returned and therefore the μATS™ can pick the time to make the transfer, both power sources are up and running.

It should be noted that the μATS™ "spreads" the load on the source being transferred. This is by design. A population of μATS™ units will have a small degree of variability in their timing of transfers from the B source to the A source, which is not much in real time but is significant in electrical event time. This variance "spreads" the load being transferred as seen by the power source, for example a generator or UPS unit. This is because the load appears as a large number of μATS™ transfers in a time window to the power source. This is beneficial to generators and UPS units, since it distributes a large number of smaller loads over a period of time, thus reducing the instantaneous inrush. This is another advantage of our power distribution method.

Prevents Harmonic Reinforcing Load Surges.

The μATS™ waits a specified time constant when on B power before transferring back to A power (unless B power fails, then it transfers immediately to A power). The time is selected to be outside of the normal response time characteristics of most typical generators. This prevents Harmonic Reinforcing Load Surges because the generator has time to adapt to the load change and stabilize its output.

Must not use any rack space that could be used by EDP equipment

The μATS™ is a very small form factor. It can implemented as a self mounting device that fits onto a 1U EDP device as shown in U.S. patent application Ser. No. 12/569,733, which is incorporated herein by reference. It can be deployed as a true "zero U" solution.

Must be very, very efficient

The μATS™ is extremely efficient, using less than 100 milliwatts when on the primary power source in normal operational mode.

Must be inexpensive and long-lived

The μATS™ is very inexpensive to make. It design is such that its expected useful lifetime is 20 years or more and this could easily be extended to 35 years+ by using components with longer lifetimes, which would raise the cost slightly but could be a worthwhile tradeoff.

The μATS™ is moved from each generation of deployed EDP equipment to the next deployed generation and will return a very low annual amortized cost over its expected service lifetime.

Must be highly reliable

The μATS™ is very reliable. This is a requirement and also a consequence of designing the device for a very long service lifetime.

We can now discuss the advantages of auto-switching at the device or near device level vs. auto-switching at other points in the power distribution topology. As noted the μATS™ makes switching at the device or near device level both possible and desirable. The advantages are described and detailed below.

1) Reliability

This is easy to understand. A population of highly reliable ATS units at the device level produces much higher per device power reliability levels than an ATS that switches a branch circuit or an entire panelboard can due to the statistics involved. The chances of all of the μATS™ units failing at the same time and therefore affecting all of the auto-switched EDP devices is infinitesimal vs. the chance of an ATS that is at a closer to the root of the power distribution topology failing. Consider the following example.

1 Panelboard ATS with an MTBF of 200,000 hours
1/200000=5.0e-06 chance of failure in any given hour.
Note: This would be a very expensive unit w/ this MTBF #.

200 μATS™ units each unit with an MTBF of 200,000 hours
1/200000=0.005% chance of failure per unit in any given hour
and the chance of 200 units failing simultaneously
=200,000 raised to the 200$^{th}$ power divided by 1=6.223015277861141707e-1061.

This is essentially zero chance of simultaneous failure and is over 1000 orders of magnitude better than a single ATS.

This is a key advantage of the data center power distribution method we are describing. Reliability is so very important to data center operators, especially for companies that measure their downtime in hundreds or thousands or millions of dollars per hour. It is hard to over-emphasize this point.

2) Efficiency

Any method for data center power distribution, especially for large server farms, must be efficient. The rising cost and important consequences of power guarantee this. A highly parallel, device or near device level auto-switched power distribution method will be the most efficient method that is cost-effective to implement. There are several reasons for this.

a. Cumulative Contact Area

As noted earlier, mechanical relay based automatic transfer switches are more efficient and at a given cost level, more reliable than solid-state based automatic transfer switches. As also discussed earlier, their highest point of loss is usually contact resistance. This can be minimized with good relay contact design practices, and increasing the size of the contacts helps, but there are limits to what can be accomplished. Another limitation that was discussed earlier is relay transfer time. This limits the capacity of the relays that can be used and still stay within the 20 millisecond CBEMA guidelines.

Using many ATS units in parallel at the device or near device level vs. ATS switches closer to the root of the power distribution helps to address these limitations and increase power distribution efficiency. This is because many ATS units working in parallel have a cumulative relay contact area that is much greater than is feasible to put in a higher capacity relay based ATS unit regardless of where that unit is placed in the power distribution topology. The ATS units in parallel also can easily have a quick enough transfer time because they use smaller relay contacts with quicker transfer times.

b. Zonit μATS™ Efficiency

Another reason for the greater efficiency of the design is the features of the Zonit μATS™. The low power consumption feature is fully described in U.S. Provisional Application Ser. No. 61/372,752. This is crucial to being able to implement the described power distribution methodology. The μATS™ is a more efficient than traditional ATS units of the same power handling capacity by a factor of 10 or more. This is a required characteristic to make highly parallel auto-switched power distribution practical. Otherwise the net result would be to consume more power not less, regardless of the capital expense of the switching units used.

3) Cost-Effectiveness

Any data center power distribution design must be cost effective before it will be widely used and accepted. Traditional accepted methods must be improved upon before they are replaced. The low manufacturing cost of the μATS™ (relative to current ATS units of equivalent capacity) and very long service lifetime make it economically practical to build a highly parallel auto-switched power distribution system.

4) Rack Space Usage

The space in a data center equipment rack or cabinet is very expensive, a point that we covered earlier. The μATS™ does not consume any rack space and is small enough to be integrated into the rack structure outside of the volume in the rack where EDP equipment is mounted. As an example consider the following scenario. A large server farm in a data center often will consist of many "pizza-box" servers in a rack with perhaps a network switch. Each server may use ~3-6 watts of 120V power. This means that a 15 A ATS can only handle 2-4 servers. If the ATS units are 1U rack mounted devices, then using the median value of 3 servers per 15 A ATS, 25% of the rack space devoted to servers would be consumed by ATS devices! This is too inefficient a use of expensive rack space to be practical.

5) Optimized Rack Dimensions

An alternative approach to efficient use of the data center floor space that was discussed earlier is to minimize the dimensions of the rack itself. This can be done in the following way. At a high level, this approach takes the Zonit auto-switching technology and deploys it using a different mechanical packaging method, which has several design benefits and some design tradeoffs, compared to the methods described in this and the incorporated filings. The objectives of the present invention include the following:

To minimize power cable count and routing issues, thereby improving airflow efficiency in the data center equipment rack (2-post) and/or cabinet (4-post) [hereafter both will be referenced in the text as equipment rack].

To allow the incorporation of locking power cord technologies at one or both ends of the power cord for more secure power delivery, for example in data centers located in seismically active geographies such as California.

To offer an alternate method to maximize the efficiency of usage of data center floor space and allow the deployment of the maximum number of equipment racks.

These objectives and others are addressed in accordance with the present invention by providing various systems, components and processes for improving power distribution. Many aspects of the invention, as discussed below, are applicable in a variety of contexts. However, the invention has particular advantages in connection with data center applications. In this regard, the invention provides considerable flexibility in maximizing power distribution efficiency in data center environments. The invention is advantageous in designing the power distribution to server farms such as are used by companies such as Google or Amazon or cloud computing providers and others.

Figure 5:
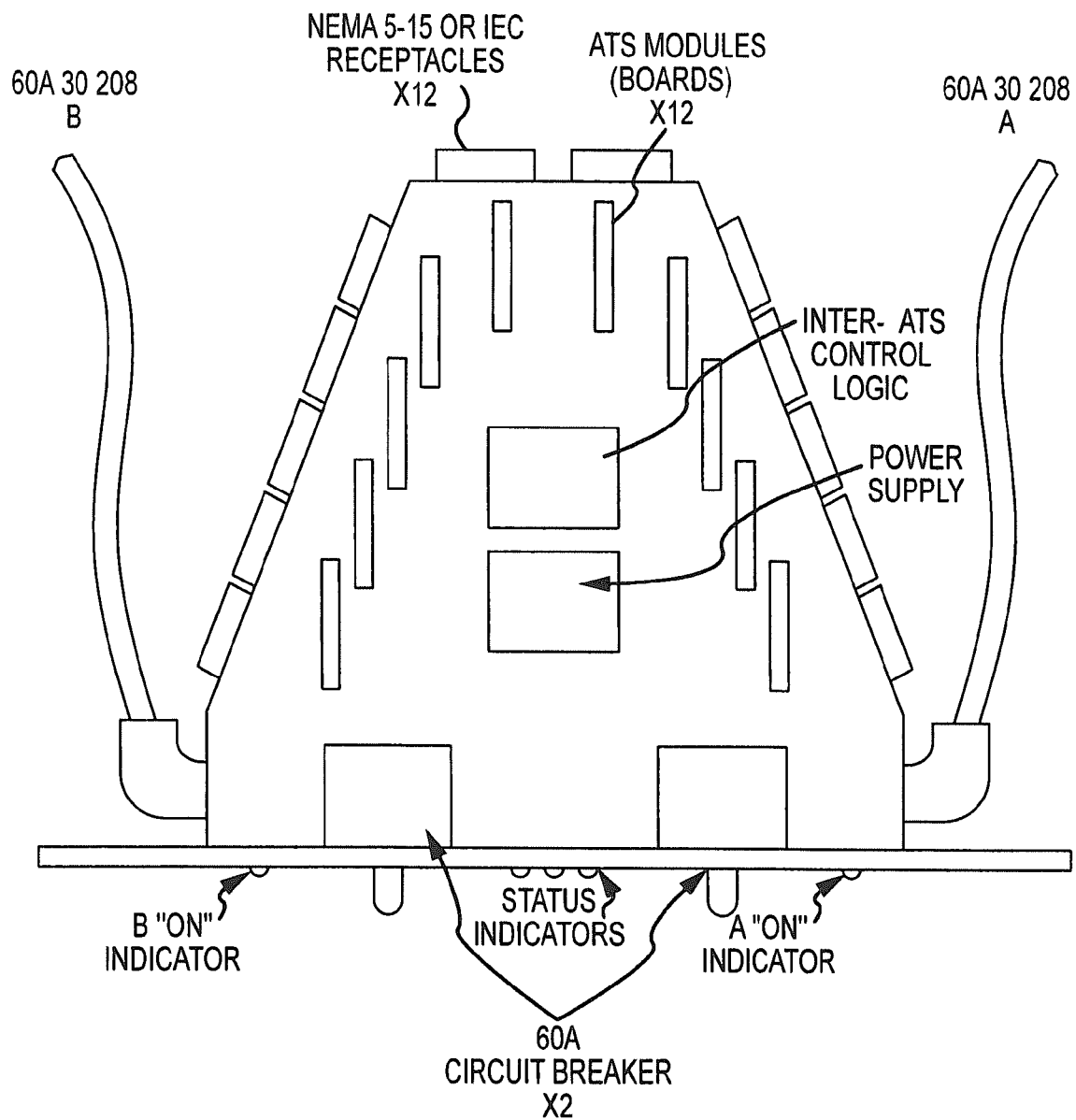
FIG. 5 shows illustrates a switch in accordance with the present invention.

In accordance with one aspect of the present invention, a method and apparatus are provided for distributing power via receptacles (or hard-wired output cords) as is shown in FIG. 5. This apparatus has two power inputs, one from an "A" source, the other from a "B" source. The amperage of the "A" and "B" power sources can be chosen to match the number of auto-switched output receptacles and their anticipated average and/or maximum power draw. The apparatus takes input power from the "A" and "B" sources and distributes it to a number of Zonit Micro Automatic Transfer Switch Modules contained in the enclosure (either as separately deployed modules or modules combined onto one or more printed circuit boards) of the apparatus. The "A" and "B" power sources may be single phase, split-phase or three-phase, but in a preferred instantiation, both would be identical. Each of the Zonit Micro Automatic Transfer Switch Modules feeds an output receptacle (or hard wired power cord) located on the face of the enclosure of the apparatus. Two or more circuit breakers, optionally with visual power status indicators, may be provided to allow disconnecting the unit electrically from the branch circuits that feed it. Additional "Virtual Circuit Breaker" control switches and indicators may also be included to provide a means to disconnect end-user equipment from individual Zonit Automatic Transfer Switch modules. The apparatus can be mounted within the rack or on top of it or on its side. The size of the enclosure can be minimized due to the very small form factor of the Zonit Micro Automatic Transfer Switch. It can contain a multiplicity of Zonit Micro Automatic Transfer Switch ("Zonit μATS") modules within an enclosure that is no more than two NEMA standard rack units (1U=1.75") in height. For example, 12 or more ATSs, each having a power density of 2 kilowatts per 10 cubic inches can be disposed within 1.5 u's of the rack. The Zonit μATS modules can be constructed as separate or combined circuit boards to optimize ease and cost of manufacture. Although the enclosure takes up rack space, by eliminating the need for in rack plugstrips, which are usually mounted vertically in the rack, data center floor space can be optimized as follows. The NEMA standard equipment width that is most commonly used is 19".

Most NEMA standard racks for 19" equipment are around 27" wide to allow adequate space to mount a variety of vertical plugstrips in the sides of the rack. These plugstrips (also sometimes called power distribution units) do not have industry standardized dimensions, so it is difficult for equipment rack manufactures to optimize their rack dimensions for all available vertical plugstrips. Therefore the total width and depth of the rack determine it's floor area usage. By eliminating the need to run anything but power cords and network cords down the sides of the rack (or optionally down the back of the rack), it is possible to specify narrower racks, down to a width of approximately 21". This is more space efficient. If for example, 24" racks (which align nicely onto the 2'×2' floor tiles used in most raised floors) are used vs. 27" racks, then one additional 24" rack can be deployed in a row of 8 racks. This is a significant gain in data center floor space utilization.

Figure 6:
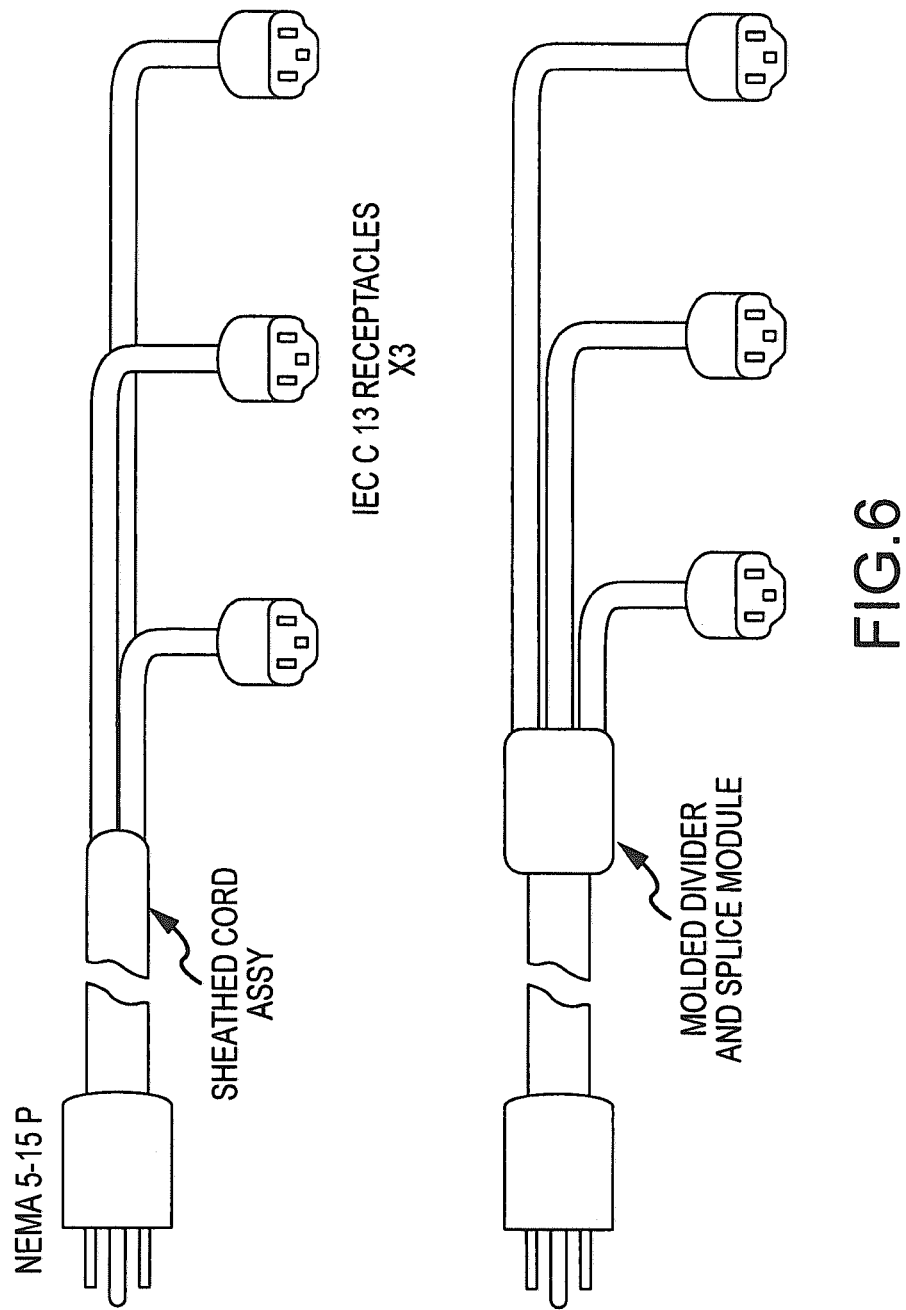
FIG. 6 shows examples of a hydra cord.

In accordance with another aspect of the present invention, a multi-head power cord "hydra cord" can be provided. This cord can be hardwired into the apparatus shown in FIG. 5 or receptacles can be provided. An example is shown in FIG. 6. The number of output heads on the hydra cord can be varied to match the desired average power output (or summed power output to a chosen set of end-user devices) to each connected end-user device. The length and gauge of the hydra power cord (both the main feed section and the separate feeds to each "hydra head") can be optimized to minimize electrical transmission losses and power cord tangle by optimizing the cord lengths for each hydra cord to supply power to a particular set of equipment positions in the equipment rack. A set of appropriately sized hydra cables can be used to feed each equipment location in the rack at whatever interval is desired, such as one uniform equipment mounting space "1U" of 1.75 vertical inches. The pattern of which heads from which hydra cords feed which "U" positions in the rack can also be varied to control which power phase and source feed each "U" positions for whatever reason is desired, for example to balance power phase usage. This is an example usage of the technology described in U.S. Pat. No. 6,628,009 the contents of which are incorporated herein as if set forth in full.

In accordance with another aspect of the present invention, locking power cord technologies can be used to improve the security of power delivery. The apparatus could for example, be equipped with standard NEMA L5-15 locking receptacles for 120V service or NEMA L6-15 receptacles for 200V+ service. Other locking receptacle types could be used. The "hydra cord head" on the output cords can be equipped with IEC locking technologies (IEC C13 and C19 would be the types most commonly used in IT equipment) using the technologies described in PCT Applications PCT/US2008/057149 and PCT/US2008/05048 the contents of which are incorporated herein as if set forth in full.

In accordance with another aspect of the present invention, the apparatus described can be incorporated in the technologies described in U.S. Pat. No. 6,628,009 and PCT Applications PCT/US2008/057140 and PCT/US2010/050550 the contents of which are incorporated herein as if set forth in full. This apparatus incorporates the parallel auto-switching functionality in an instantiation of the Zonit Power Distribution System a novel implementation of which is shown in U.S. Pat. No. 6,628,009. To auto-switch polyphase power sources, a preferred instantiation would adopt the rule "if one phase of a polyphase power source fails, all phases switch to the alternate power source". To do this the logic each of the single-phase automatic transfer switches would be modified to achieve this functionality.

An additional possible refinement would be to use two (or more) uATS modules to monitor each of the phases of the polyphase power source. The two (or more) modules would act as primary and backup logic for determining when to switch the relays (of which there would normally only be on set of relays per power phase of the polyphase power source) from the A to the B power source and back from B to A. Another possibility is to use more than two modules and use a majority approach to decide when to switch the relays (of which there would normally only be on set of relays per power phase of the polyphase power source) from the A to the B power source and back from B to A. An example would be to use three modules and set the logic such that at least two of three agree to switch power sources before the switch can be made. The advantage of these "multi-uATS" approaches is that they eliminate single points of failure in the polyphase switching apparatus.

C. Increased Efficiency for Traditional Power Distribution Via UPS Load Shifting As discussed earlier, it is normal practice to share loads when two A-B UPS units are used in a data center as the power sources. This is usually due to the nature of the end use equipment having dual power supplies that distribute the load more or less equally to both the A and B power supply inputs. Also, as earlier covered, this reduces UPS efficiency since they must not be loaded over 50% to function in a redundant power configuration. Using large numbers of μATS™ switches it is possible to raise the efficiency of such a power distribution system as follows. All of the electrical load for EDP equipment in the data center can be "Load Shifted" via μATS™ units onto one of the two UPS units, increasing the efficiency of that UPS unit as shown in the UPS efficiency curve shown in FIG. 3. The other UPS unit is at idle and will only be used if the primary unit fails. The UPS units must be designed to handle this type of load being immediately placed on them, but almost all modern UPS units can do this. The result is an increase of ~3-5% in the efficiency of the data center, a useful improvement. It should be noted that while only one pair of UPS units is discussed here the methodology scales to larger data centers that have many UPS units deployed in pairs for redundancy.

The methodology to accomplish this is simple and can be deployed incrementally for each piece of EDP equipment, reducing service impacts. Every single power supply (or corded) EDP device will be connected via a μATS™ to the A and B UPS units. Every dual or N+1 power supply EDP device will have one power supply connected to the A UPS via a normal power cord, the second or all other N+1 power supplies will be connected to the A and B UPS units via μATS™ units.

This insures that when the A UPS unit is available it takes all of the load and when it is not the B UPS carries the load. The μATS™ units can be deployed in one to one per device ratios, or low integer number ratios, respecting μATS™ power capacity limits.

Almost all EDP devices share the load among all available power supplies in the device. It is possible to build an EDP device that switches the load between power supplies, so that only one or more are the active supplies and the others are idle, but as described earlier, this is rarely done for both cost and reliability reasons. To insure that multi-power supply EDP devices draw on only filtered utility line power if it is available and switch to the UPS if it is not, each of the secondary power supply units needs to be auto-switched between the utility line and UPS unit(s). Otherwise, the UPS unit will bear a portion of the data center load, lowering the overall efficiency of the power distribution, which is undesirable.

B. ATS Design with Suitable Characteristics for Highly Parallel Power Distribution Traditional ATSs tend to have limitations that prevent their effective use in implementations of highly parallel, auto-switched, power distribution architectures. For example, these traditional ATSs may typically be too inefficient, consume too much rack space, and cost too much. Embodiments of the micro-ATS described herein address some or all of these issues.

According to one embodiment, the micro-ATS (e.g., the Zonit μATS™) is very small (e.g., 4.25-inches×1.6-inches×1-inch, or less than 10 cubic inches) and very efficient (e.g., less than 0.2 volts at maximum load loss). Certain implementations use no rack space, as they are self-mounted on the back of each EDP device, incorporated in the structure of the rack outside the volume of the rack used to mount EDP equipment, incorporated in rack-mounted plugstrips, or incorporated in an in-rack or near-rack Power Distribution Unit (i.e., any of which being possible due to the small form-factor of the micro-ATS). In other implementations, the micro-ATS is small enough to be integrated directly into the EDP equipment itself.

Various embodiments of micro-ATSs are described herein, including their various components. For the sake of clarity and context, the micro-ATS embodiments are described as switching between two separate power sources, "A" and "B." In some implementations, the A and B power sources are single-phase sources. In other implementations, polyphase power sources are connected. Where polyphase power sources are connected, polyphase embodiments of micro-ATSs are used. Substantially the same components (e.g., circuits) described herein with reference to the single-phase implementations are applicable to the polyphase implementations.

For example, polyphase embodiments can be implemented as multiple single-phase micro-ATS units acting in parallel, with additional functionality provided for synchronizing certain of the control circuits so that they act together across the multiple ATS units to handle switching and return from one polyphase source to the other polyphase source and back. Various embodiments of polyphase micro-ATSs can also have different conditions under which to switch power sources. For example, given three phase power with X, Y, and Z "hot" leads, a fault on any of three might be considered reason to switch from the A to the B polyphase source. To return to the A polyphase source, it may be desirable to ensure first that all three hot leads are present, stable, and of sufficient power quality on the A source.

Section 1

Figure 7:
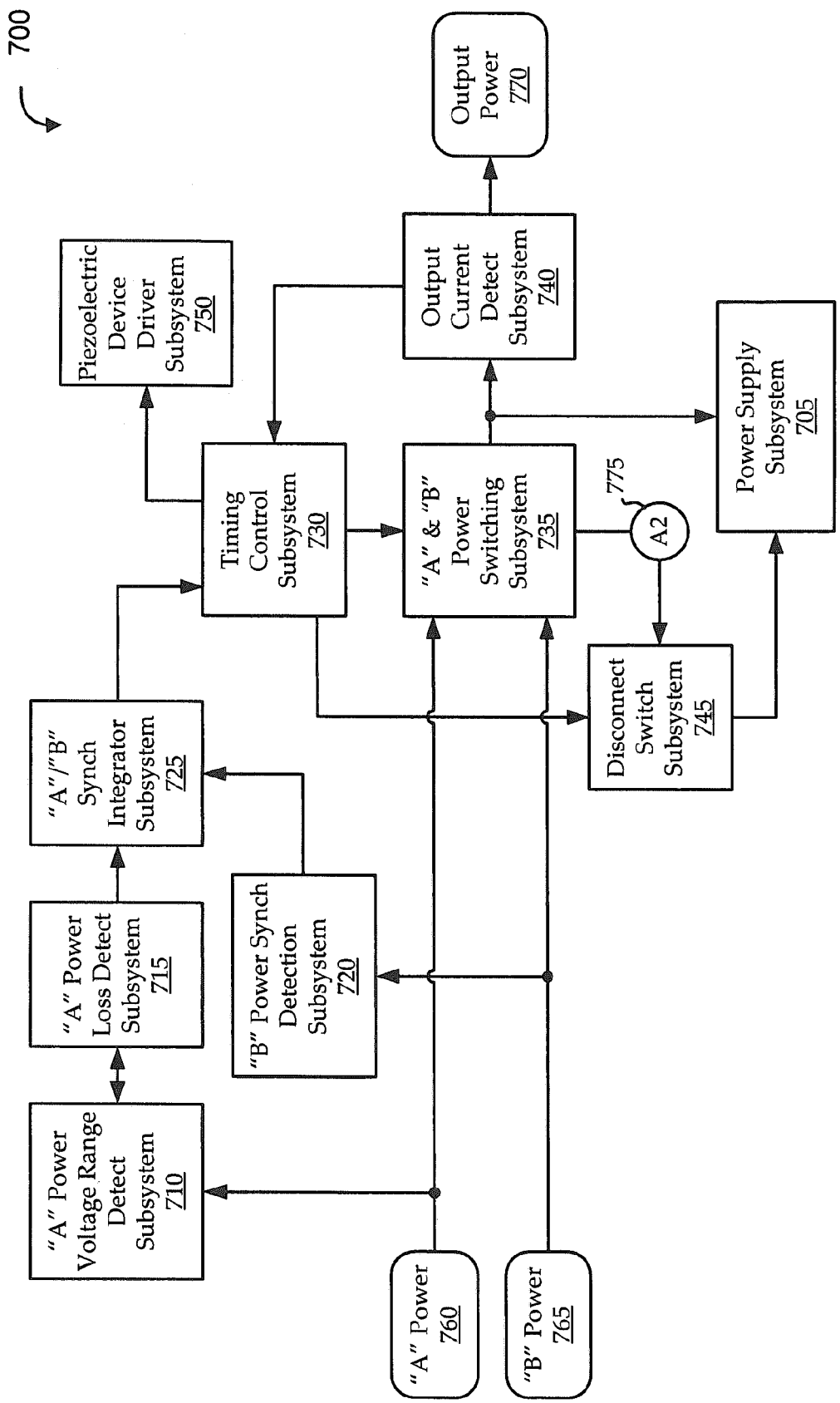
FIG. 7 shows a system diagram of an illustrative micro-ATS, according to various embodiments.

Various ATS implementations and associated system architectures will now be described. Turning first to FIG. 7, a system diagram of an illustrative micro-ATS 700 is shown, according to various embodiments. As illustrated, the micro-ATS 700 is connected to an "A" power source 760 and a "B" power source 765, and uses its various components to provide output power 770 to one or more devices or distribution topologies (e.g., to one or more EDP devices in a branch circuit of a data center). The micro-ATS 700 includes a power supply subsystem 705, an "A" power voltage range detect subsystem 710, an "A" power loss detect subsystem 715, a "B" power synchronization detection subsystem 720, an "A"/"B" synchronization integrator subsystem 725, a timing control subsystem 730, an "A" & "B" power switching subsystem 735, an output current detect subsystem 740, a disconnect switch subsystem 745, and a piezoelectric device driver subsystem 750.

Embodiments of the power supply subsystem 705 include innovative ways of powering control circuitry of the micro-ATS 700. Embodiments of the "A" power voltage range detect subsystem 710 determine if the power being supplied to the micro-ATS 700 is in a desired (e.g., predetermined) voltage range. Embodiments of the "A" power loss detect subsystem 715 determine when the "A" power being supplied to the micro-ATS 700 has been lost using desired discrimination characteristics. Embodiments of the "B" power synchronization detection subsystem 720 measure the timing of the alternating current waveform of the "B" power. Embodiments of the "A"/"B" synchronization integrator subsystem 725 provide synchronization of "B" to "A" transfers at zero voltage crossing times and "A" to "B" integration functionality. Embodiments of the timing control subsystem 730 control when the selected power source to the micro-ATS 700 is switched, either the "A" source to the "B" source or from the "B" source to the "A" source, and can handle over-current condition switching and relay sequencing. Embodiments of the "A" & "B" power switching subsystem 735 control actual switching between the "A" and "B" power sources in either direction to change which supply is acting as the input power source to the micro-ATS 700.

Embodiments of the output current detect subsystem 740 detect and measure presence and various characteristics of output current from the micro-ATS 700, and can, in some embodiment, mimic characteristics of a fuse so that the micro-ATS 700 can protect itself without blowing actual physical fuses (i.e., which must be replaced). Embodiments of the disconnect switch subsystem 745 disconnect a secondary power source from the power supply when it is not in use. Embodiments of the piezoelectric device driver subsystem 750 implement innovative techniques for driving piezoelectric or other devices.

Each component is described below as performing particular functionality in the context of the micro-ATS 700. It will be appreciated that other configurations are possible in which similar or identical functionality can be implemented using other components, combinations of components, etc. Further, in some cases, values are given for components such as resistors and capacitors, etc. and ranges are given for current, voltage, and/or other power characteristics. These values and ranges are intended to add clarity to illustrative examples and should not be construed as limiting the scope of embodiments.

Figure 8A:
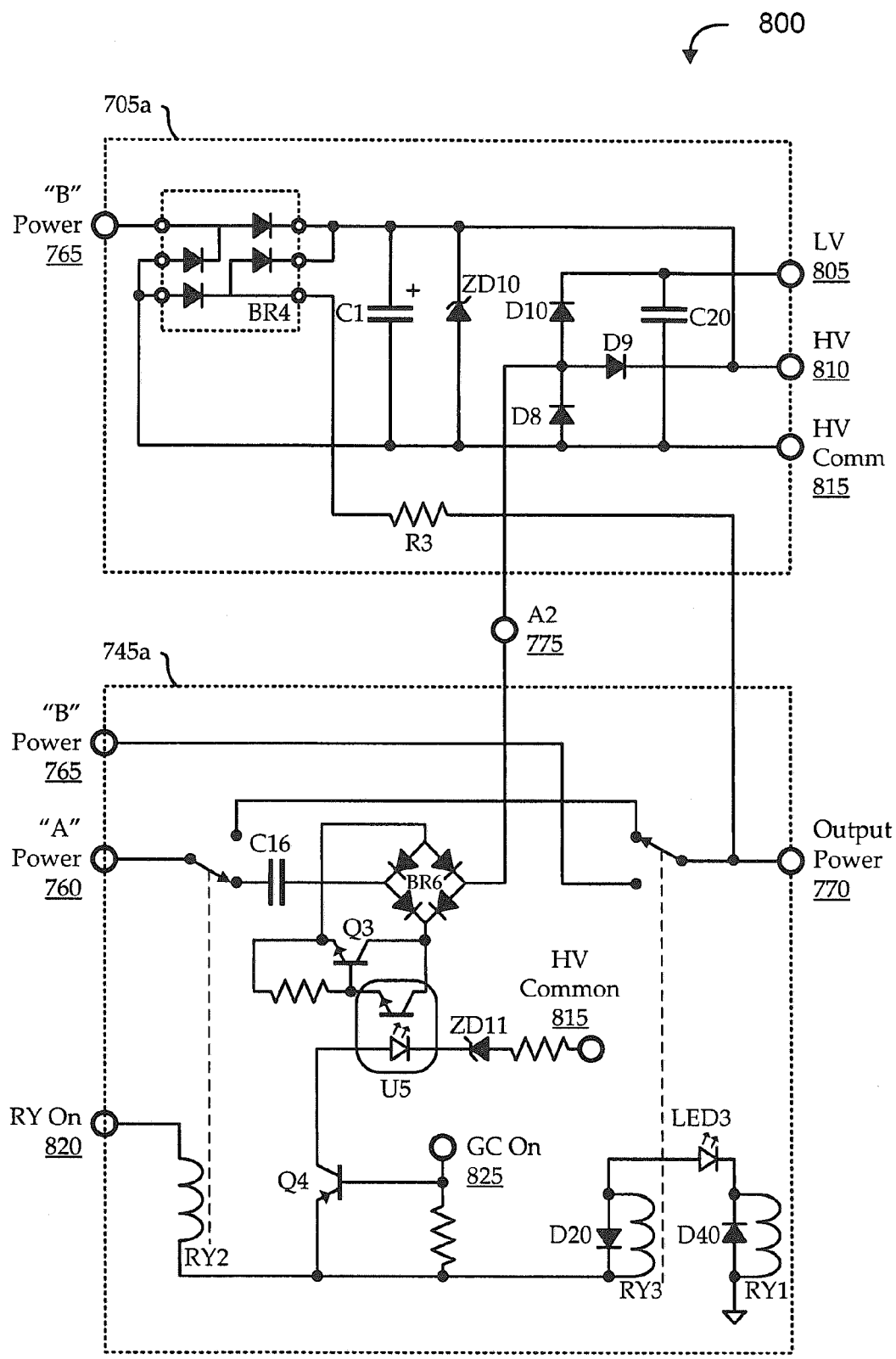
FIG. 8A shows a circuit diagram of an illustrative power supply subsystem in context of an illustrative "A" & "B" power switching subsystem for use in some embodiments of a micro-ATS.

FIG. 8A shows a circuit diagram 800 of an illustrative power supply subsystem 705a in context of an illustrative "A" & "B" power switching subsystem 735 for use in some embodiments of a micro-ATS 700. As discussed above, the micro-ATS 700 is connected to an "A" power source 760 and a "B" power source 765. The power supply subsystem 705a performs a number of functions, including power conditioning (e.g., current limiting and power clean-up).

The source power for the power supply subsystem 705a is acquired from the center taps of RY3 H ("Hot") and RY1 N ("Neutral"). Thus, the source of power for the ATS Power Supply is from the "A" side when the output of the micro-ATS 700 is on the "A" Side, and on the "B" Side when transferred to the "B" side. Components of the "A" & "B" power switching subsystem 735 serve as the automatic transfer switch for the micro-ATS 700 power supply subsystem 705a. The current available from output power is limited by R3. ZD10 limits the full wave rectified output of the bridge BR4 to 150V peak. ZD10 guarantees that C1 does not exceed its rated voltage. C1 stores enough charge to allow HV ("High Voltage") operations of the relays during transitions between the "A" power source 760 and the "B" power source 765.

During an over-current fault, neither the "A" power source 760 nor the "B" power source 765 is available at the output power 770 node, but RY2 and all the rest of the micro-ATS 700 circuitry may still need power. This is accomplished by node A2 775 which manifests "A" power 760 at the NO terminal of RY2 via C16 and BR6 when RY2 is activated. C16 limits the current available during a fault.

Bridge BR6 normally blocks A2, as will be discussed more fully below. When a fault occurs, GC On will be pulled almost down to Common, and positive power will be available at U5 LED via ZD11. This turns on the U5 transistor. The U5 transistor and Q3 form a Darlington pair that shorts the bridge BR6, allowing A2 to drive HV through diode D9. A2 also drives LV ("Low Voltage") through diode D10. C20 provides filtering and storage for LV.

Figure 8B:
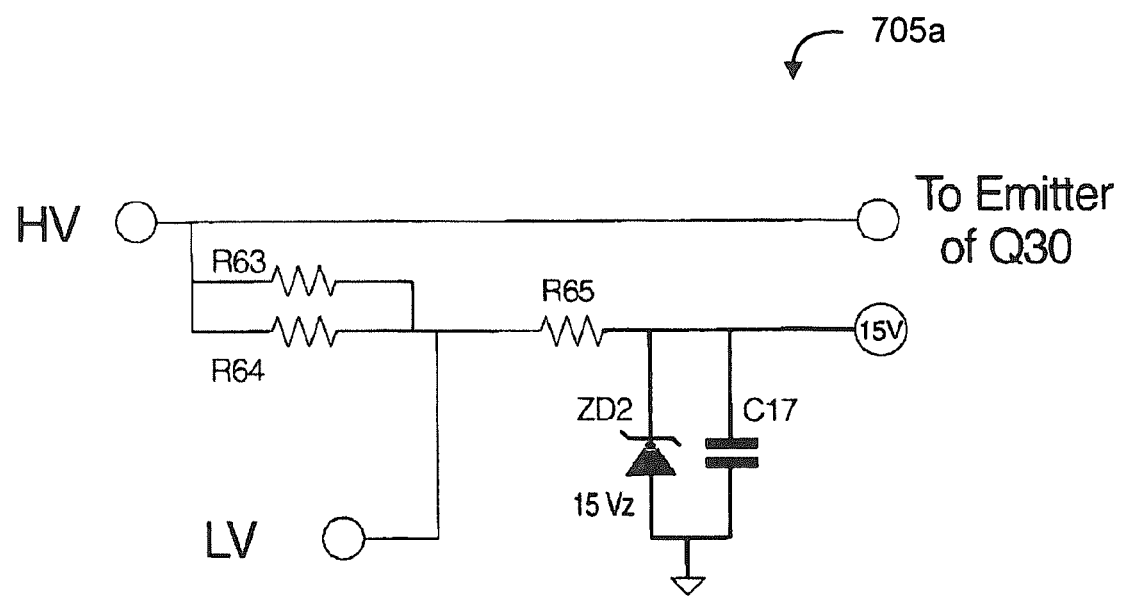
FIG. 8B shows illustrative detail of the 15-volt power supply as normally supplied by HV through a set of resistors.

In some embodiments, as illustrated in FIG. 8B, the 15-volt power supply is normally supplied by HV through R63, R64 and R65. These three resistors drop the voltage and limit the current for Zener diode ZD2. ZD2 regulates the voltage for the comparator and other electronics on the control board. C17 further filters out the 15-volt signal. During a fault condition A2 provides power for the 15V supply through LV. HV is pulled down to 45V in this condition due to current limiting capacitor C16 mentioned earlier.

Embodiments of the power supply subsystem 705, such as the embodiments illustrated and described with reference to FIGS. 8A and 8B, provide a number of innovative features. One such feature is that some embodiments of the power supply subsystem 705 acts as a transformer-less, very high-efficiency power supply. For example, as illustrated above, the circuit produces low and high-voltage DC power from multiple AC inputs that is suitable for powering both low-voltage control circuitry and higher power relays. It does so very efficiently and with a minimum of expensive analog parts.

Another such feature is that some embodiments of the power supply subsystem 705 provide capacitor current limiting for very low-power usage. As illustrated above, power consumption of the power supply subsystem 705 is limited by use of a capacitor. This can efficiently limit the power supply capacity to a desired value, thereby providing maximum efficiency and low power consumption.

Yet another such feature is that some embodiments of the power supply subsystem 705 provide optical isolation to reduce or even eliminate cross currents As will be discussed more fully below, embodiments of the control and synchronization subsystems (e.g., the "B" power synchronization detection subsystem 720, the "A"/"B" synchronization integrator subsystem 725, the timing control subsystem 730, etc.) optically isolate between input power sources, virtually eliminating cross-currents between them.

Still another such feature is that some embodiments of the power supply subsystem 705 provide power control relays (e.g., illustrated as RY1, RY2 and RY3) to direct the source power to the output of the micro-ATS 700 as well as provide the internal source selection (transfer switch function) for powering the micro-ATS 700 power supply subsystem 705.

And another such feature is that some embodiments of the power supply subsystem 705 use an optically isolated disconnect circuit to prevent cross-source currents when the micro-ATS 700 is in the over-current fault mode. In this mode, there is no power delivered to the output, and thus, power must still be delivered to the micro-ATS 700 control and relay drive circuitry. As illustrated above, this can be accomplished via the A2 775 power path, and controlled by BR6 and optical isolation control U5.

Figure 9:
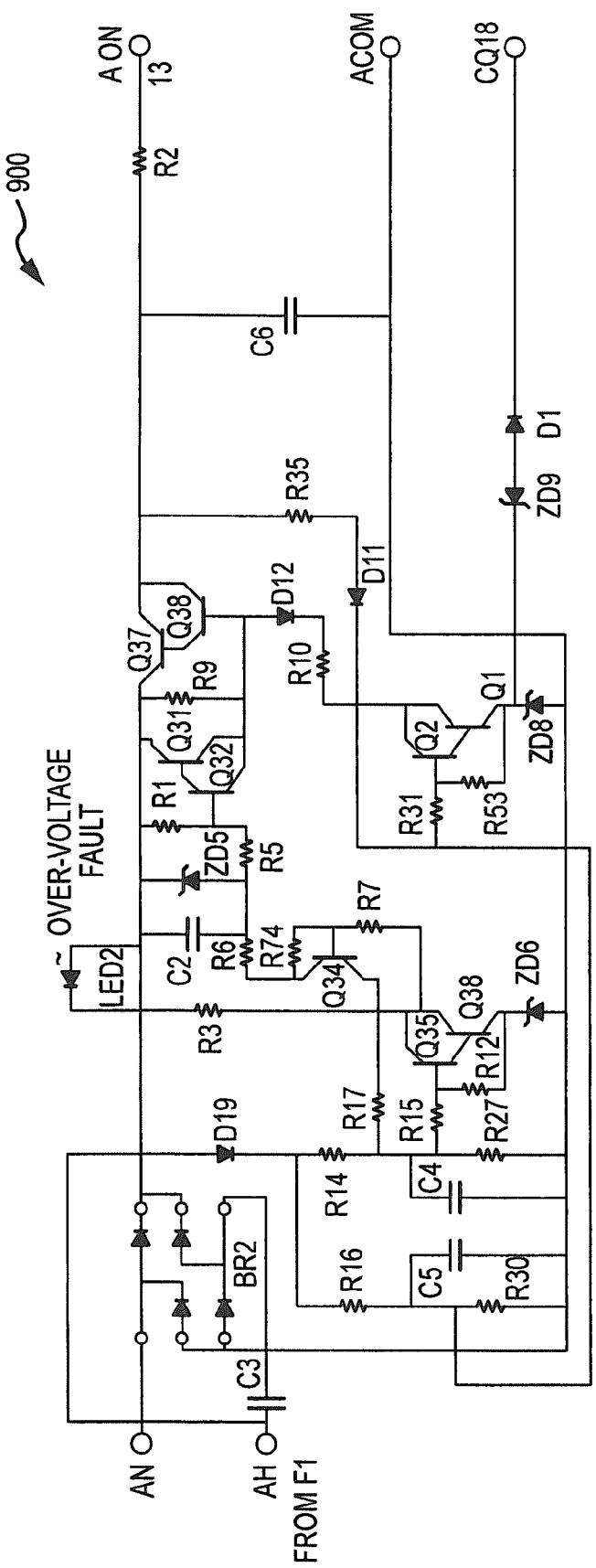
FIG. 9 shows a circuit diagram of an illustrative "A" power voltage range detect subsystem for use in some embodiments of a micro-ATS.

FIG. 9 shows a circuit diagram of an illustrative "A" power voltage range detect subsystem 710a for use in some embodiments of a micro-ATS 700. Embodiments of the "A" power voltage range detect subsystem 710a receive "A" power 760 nodes AH and AN. The "A" power 760 is full wave rectified by bridge BR2. C3 is used to limit the current available in this and the "A" power loss detect subsystem 715, as will be described below. In normal operation the "A" power voltage range detect subsystem 710a can generate the A (ON), A (COM), and CQ18 signals to the "A" power loss detect subsystem 715.

The illustrated "A" power voltage range detect subsystem 710a includes over-voltage detection and under-voltage detection functionality. According to the over-voltage detection functionality, D18 half-wave rectifies the "A" power 760 and drives a ladder comprised of R14 and R27, which charges C4. When over-voltage occurs on "A" power 760, ZD6 and Q36 will begin to conduct drawing current through resistors R7, R74, R6, R5, and R1. This will turn on Q34, which will pull up the voltage on C4 through R17. This will latch Q35, Q36, and Q34 in an on state. This also will pull current through R8, thereby turning on the over-voltage indicator, LED2. C2 will be charged and ZD5 will conduct. Q32 and Q31 will conduct, turning off Q37 and Q38. This turns off A (ON). In the illustrated embodiment, this will tend to occur at around 135VAC at AH, though other over-voltage thresholds can be set as desired.

Under-voltage functionality detects when "A" power 760 is below a desired low-voltage threshold. As illustrated, increasing diode D18 will charge capacitor C5 via the ladder formed by R16 and R30. When the charge on C5 reaches a preset level (illustrated as 100VAC, but other levels can be set as desired), ZD8 starts to conduct through R31 and R58. Q1 and Q2 will start to turn on, pulling current through R10, D12 and R9. This turns on Q37 and Q38 applying power to A (ON). This in turn drives current through R35 and D11, which turns Q1 and Q2 on harder and adds hysteresis to the voltage on C5. If "A" power 760 is at normal voltage and decreasing, the "A" voltage will have to drop to around 88VAC (or any other desired value) to turn A (ON) off. This is due to the additional current through R35 and D11 charging C5 when A (ON) is present.

When the "A" power loss detect subsystem 715 is on, signal CQ18 will be low. ZD9 and D1 will lower the voltage on the emitter of Q1. Q1 and Q2 will be turned on harder serving to improve the hysteresis of the under voltage circuit. C6 and R2 act to smooth out the A (ON) signal. C6 provides storage so that the zero crossings of the rectified AC signal do not turn the A detect circuit off. R2 controls the decay time of the discharge of C6 when power is lost on the "A" power 760 side.

Embodiments of the "A" power voltage range detect subsystem 710, such as the embodiments illustrated and described with reference to FIG. 9, provide a number of innovative features. One such feature is that some embodiments of the "A" power voltage range detect subsystem 710 provide very high efficiency. As illustrated, using high impedance components and switching off of the power delivery to the "A" power loss detect subsystem 715 as the technique for initiating and holding the voltage fault conditions is very efficient and consumes a minimum amount of power. In addition, the "A" power voltage range detect subsystem 710 also provides all power to the "A" power loss detect subsystem 715, and has current limiting provided by C3. Use of a capacitor for current limiting minimizes power consumption by returning unused current to the source on each half cycle instead of wasting it as heat as in a traditional resistor limiting technique.

Another such feature is that some embodiments of the "A" power voltage range detect subsystem 710 provide easily programmed over-voltage detect delay. As illustrated, the over-voltage detect functionality uses a single capacitor value (C4) to determine the delay for detecting an over-voltage condition. Another such feature is that some embodiments of the "A" power voltage range detect subsystem 710 provide easily programmed "A" voltage OK delay. The "A" power voltage range detect subsystem 710a determines whether the voltage from "A" power 760 is "OK." That functionality uses a single capacitor value (C5) to determine the delay for accepting the A input voltage for start-up of the micro-ATS 700, and can be easily adjusted for various requirements.

Yet another such feature is that some embodiments of the "A" power voltage range detect subsystem 710 provide an easily programmed thresholds for "A" under-voltage detect, "A" voltage OK, and "A" over-voltage detect. Under voltage assumes that the voltage was at one point acceptable, and that it is now lower than desired. As illustrated, a single resistor value (R35) controls the difference between the acceptable value and the low voltage shut down point. Similarly, the "A" voltage OK threshold can be programmed via a single resistor value change (R16), and the "A" over-voltage threshold can be programmed via a single resistor value change (R14).

FIG. 10A shows a circuit diagram of an illustrative "A" power loss detect subsystem 715a for use in some embodiments of a micro-ATS 700. Embodiments of the "A" power loss detect subsystem 715 handle fundamental operation of the primary power ("A" power 760) detect and delay portions of the micro-ATS 700.

The simplified overview of the "A" side power sense and delay circuit is shown. A description of the fundamentals of a Silicone Controlled Rectifier is also included to help understand the principals of the power detect and hold function.

The primary function of this circuit in the uATS is to detect the presence of AC power on the "A" side, and hold connection to that power source in the relay section later described. This circuit also has the delay control that prevents returning to a power after a transfer for about 5 seconds. This prevents unnecessary transfers if the "A" side power source is intermittent. In addition, this circuit also rejects many conditions, such as outages shorter than 4 ms, momentary sags, etc., of power that would otherwise cause false transfers.

The core functionality is achieved by rectifying the AC power via a current limiting 0.22 uf capacitor. The rectified power is mildly filtered in C6, but the primary function of C6 is to control the amount of hold-over current present during AC outages at the zero crossing of the AC line. Otherwise, the uATS would disconnect from the "A" side at every AC crossing, 120 times a second.

This capacitor is also largely responsible for determining the time for a minimum outage before releasing the latch that controls the "A" side connection, and transferring to the Alternate Power Source, ("B" side).

The transistor pair of Q17 (PNP) and Q18 (NPN) act as a SCR connected pair. Observing the description of the SCR, and the pair of Q17 and Q18 (FIG. 5) demonstrates this configuration.

The thyristor is a four-layer, three terminal semiconductor device, with each layer consisting of alternately N-type or P-type material, for example P-N-P-N. The main terminals, labeled anode and cathode, are across the full four layers, and the control terminal, called the gate, is attached to p-type material near to the cathode. (A variant called an SCS—Silicon Controlled Switch—brings all four layers out to terminals.) The operation of a thyristor can be understood in terms of a pair of tightly coupled bipolar junction transistors, arranged to cause the self-latching action:

Referring to FIG. 5, when current is continuously flowing through the Q 17, Q18 pair, it will remain latched "on". If current is interrupted, the latching will be lost, and it will not conduct again until re-started. In this circuit, conduction, or "gating" is accomplished via the charging of C8 via R20, and the resulting eventual conduction of current through Zener Diode ZD1. This sub-circuit has a time constant of about 5 seconds and provides the delay function on start-up necessary to prevent rapid transfers if source power is intermittent. A unique feature of using this dual transistor SCR emulation is that access to the collector of Q17 allows the secondary function of the "SCR" pair by allowing supplemental current to be presented to the base of Q15. Upon successful latching of the "SCR" pair, the timing capacitor C8 is reset nearly to zero voltage by the conduction of Q15. This prepares the timing circuit for the next off-to-on cycle. Another feature of this circuit is that access to the base of Q17 allows insertion of a transient suppression filter and programmed current release point determined by resistors R13, R26 and C7. This is necessary because the release point of the "SCR" pair must be below the on threshold of the optical isolator and subsequent amplifier circuit. In other words, it is important that the release point be determined by the "SCR" un-latching rather than the gain of the optical coupler and amplifier.

Additional components include R19, which depletes C6 at a known rate, R21 which guarantees full discharge of C 8 on initial startup, and LED 5 (Green), an indicator for the user interface to show that A power is on and is selected for the source of delivery to the output of the uATS.

Another unique feature of this design is it's extremely low power consumption. Since this circuit must operate at all times when the primary power ("A" side) is being delivered to the load, minimization of power consumption was of high importance. No external power supplies are required, and power through LED 5, and the Optical Isolator LED, is determined primarily by the current limiter 0.22 uf capacitor (C3), and the 56 K pass resistor R2. Other values of Resistance and capacitance could be selected to further reduce normal function power consumption, but these values are selected for maximum noise immunity and lowest power consumption in this application.

FIG. 5 demonstrates the initial electrical activity very shortly after application of power to the circuit.

AC power (Teal) is applied to the bridge, converted to rectified DC and charges C6 and C8. C8 charges slowly towards the conduction threshold of ZD1. No action happens in any other parts of the circuit. This is the initial delay part of the start up cycle of the "A" side. If the uATS were returning power from the "B" side to the "A" side after a previous failure of the "A" side, this delay would provide about 5 seconds to make sure the "A" side was stable.

FIG. 6 represents the condition just at the conduction threshold of ZD1. At this point the base of Q18 now has voltage being applied to it relative to the emitter.

Q18 is not yet conducting, as about 0.6 V must be present prior to beginning of conduction, but the latch is about to set.

At this point, C8 is charged to about 13 V, D19 is conducting and ZD1 is conducting. As C8 continues to charge, eventually base current starts to flow in Q18, initiating an "avalanche" condition in the "SCR" pair, Q18 and Q17.

FIG. 7 shows the condition of current flow a few microseconds after the base current starts to flow, and current starts to flow through LED5, the optical coupler LED, R13 and the base of Q17.

Current flows in the base of Q17, thus causing it to conduct and add current to the base of Q18, further turning it on, adding current to the base of Q17, so on and so on until the pair is "latched" on. This set of events occurs very rapidly, and the LED of the optical isolator is turned on very rapidly. Simultaneously, the base of Q15 has voltage applied to it, and the subsequent current causes Q15 to conduct, discharging C8. The discharge rate of C8 is limited by the base current limiter resistor R24.

FIG. 8 shows this state of this circuit during the discharge cycle of C8, and just before the final state of the circuit prior to normal functional operation of the uATS which is the state of delivering "A" Side power to the output.

At this stage, C8 has been discharged below the conduction threshold of ZD1, and hence Q18 is getting its base current solely from the collector of Q17 via the system current limiting resistor R25.

FIG. 9 shows the normal operating state of the uATS while on the "A" Side power source, the primary power source. The vast majority of the uATS operating time should be in this mode.

Figure 10:
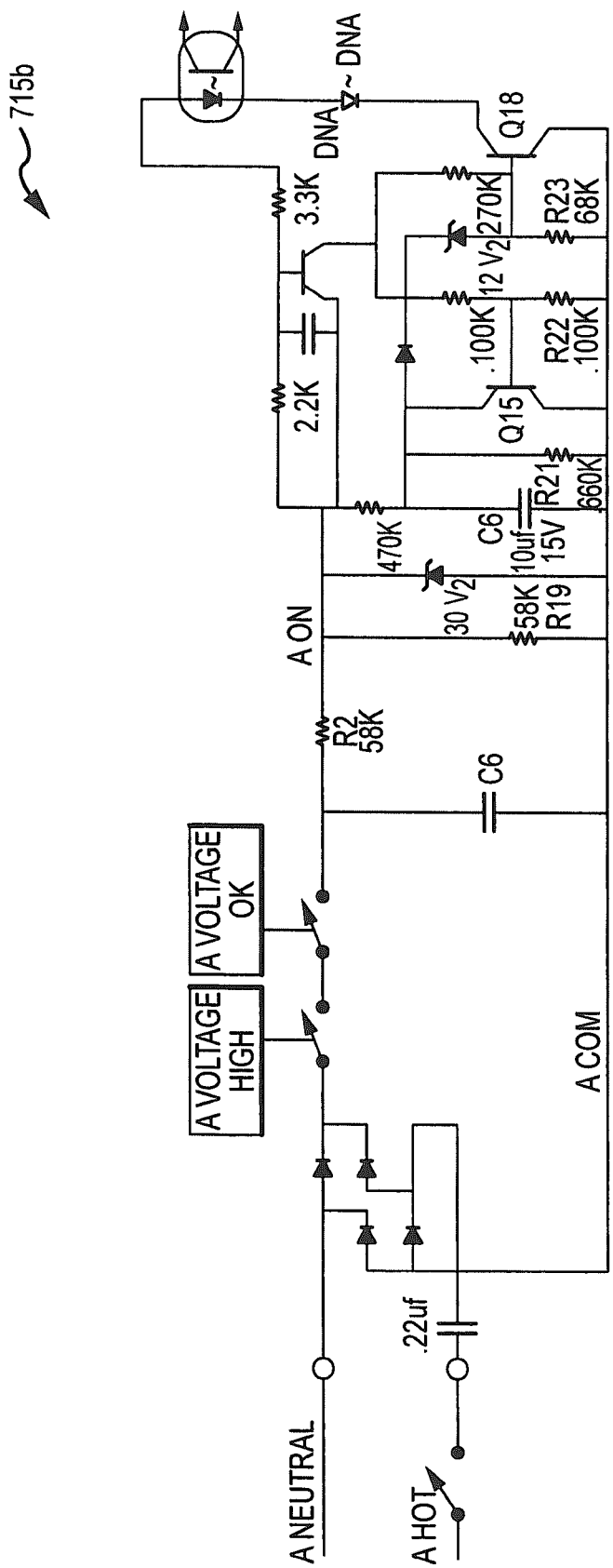
FIG. 10 shows a circuit diagram of an illustrative "A" power loss detect subsystem for use in some embodiments of a micro-ATS.

FIG. 10 shows the u ATS shortly after the loss of "A" Side Power. The circuit continues to operate for a short period by extracting the remaining charge from C6.

As the available power in C6 is depleted, the resistive divider of R26 and R13 reaches a point where Q17 begins to not be forward conducting through its base, thus reducing the current in it's collector.

Figure 11:
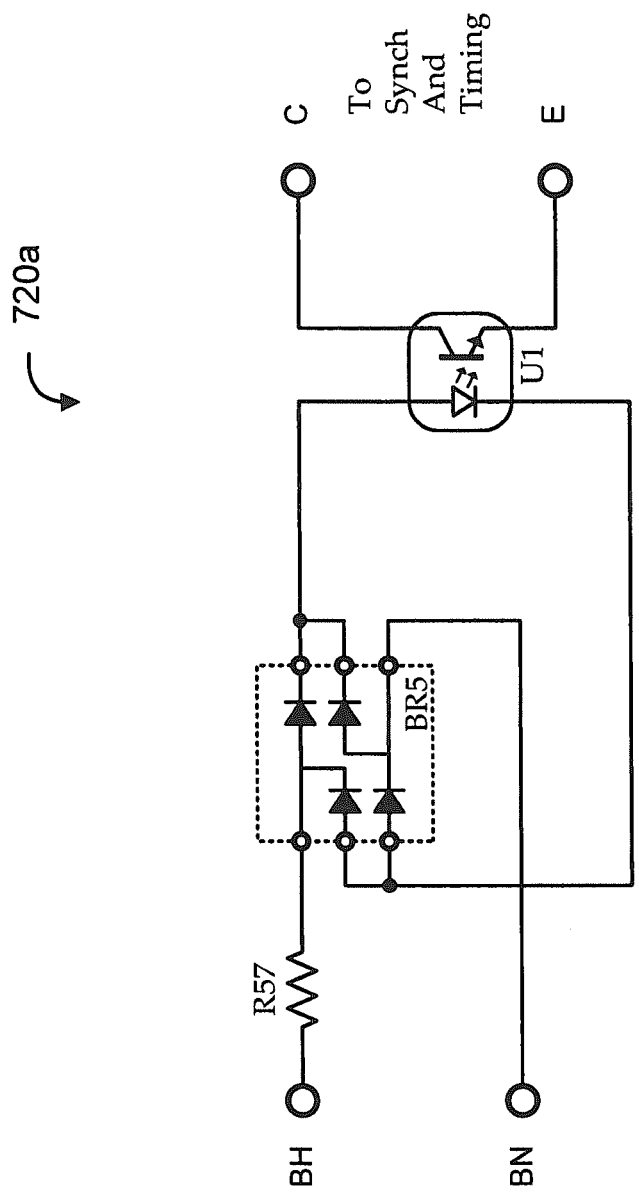
FIG. 11 shows a circuit diagram of an illustrative "B" power synchronization detection subsystem for use in some embodiments of a micro-ATS.

This is the start of the rapid cascade to release of the "SCR" pair, Q17 and Q18. FIG. 11 illustrates this transient condition.

Figure 12:
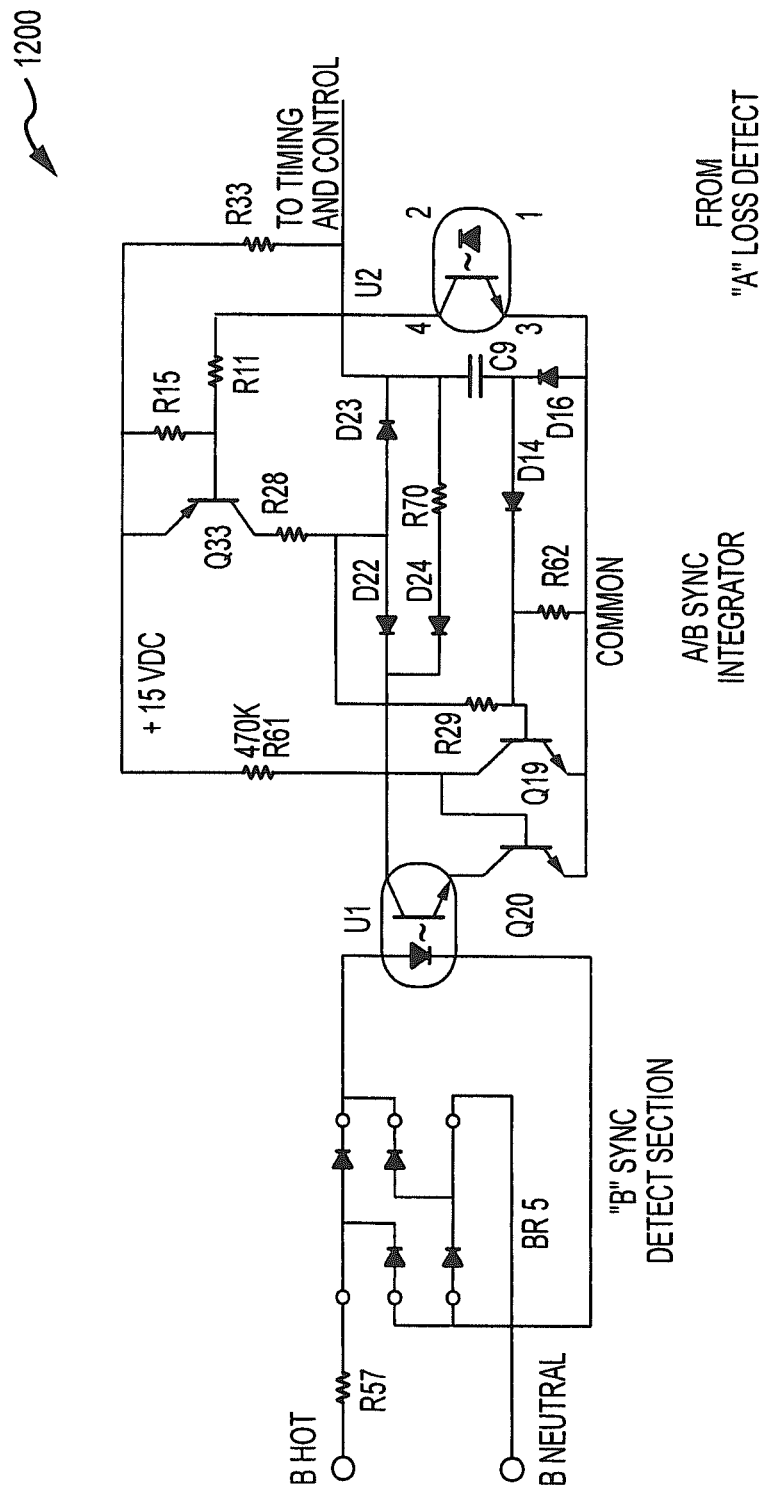
FIG. 12 shows a circuit diagram of an illustrative "A"/"B" synchronization integrator subsystem in context of the "B" power synchronization detection subsystem and the "A" power loss detect subsystem for use in some embodiments of a micro-ATS.

FIG. 12 shows the condition after the "SCR" pair, Q17 and Q18 have released, and are no longer conducting, and hence the LED 5 and the optical isolator diode are also no longer conducting. At this point the events controlled by the timing and synchronization circuits are initiating the transfer to the "B" side of the relays in the A/B relay switching circuit.

The final electrical activity is the removal of residual current from the base of Q18. Also, residual charge in C6 and C8 is depleted via resistors R19 and R21, respectively. Hence, the circuit is ready for the return of "A" power when it occurs.

FIG. 11 shows a circuit diagram of an illustrative "B" power synchronization detection subsystem 720a for use in some embodiments of a micro-ATS 700. "B" power 765 is received as BH and BN, and is full-wave rectified by bridge BR5. The current is limited by R57. The output of the bridge BR5 drives the diode in opto-transistor U1. As illustrated, the transistor on U1 will turn off when the output of the bridge BR5 is less than a preset threshold (illustrated as approximately 6 volts, though other values can be set if desired). This derives the zero-voltage crossing of "B" power 765, which can then be used for zero-voltage synchronization.

Embodiments of the "B" power synchronization detection subsystem 720, such as the embodiments illustrated and described with reference to FIG. 11, provide a number of innovative features. One such feature is that some embodiments of the "B" power synchronization detection subsystem 720 provide loss detection as a direct function of power availability. As illustrated, the "B" power synchronization detection subsystem 720 is powered by the source it is detecting. If the power fails, the circuit ceases to detect that source and it fails to provide the optically isolated control to the timing control subsystem 730 via the "B" power synchronization detection subsystem 720. This provides a fail-safe design, in that if "A" power 760 fails, the remainder of the micro-ATS 700 circuits default to transferring to "B" power 765.

Another such feature is that some embodiments of the "B" power synchronization detection subsystem 720 provide noise and false triggering immunity. As illustrated, the circuit has a power envelope detect methodology. C6 is continuously charged by the incoming power and continuously discharged by the A Loss Detect circuits and by the LED in the optical isolator U2. Thus, for a valid power loss to be detected, the capacitor C6 must discharge its energy to allow the transfer. One result is that it stores the energy during each half-cycle allowing easily programmed delay timing between the time that power fails and the time that initiation of transfer actually occurs. Another result is that unwanted glitches are filtered where they would otherwise cause false transfers. Yet another result is that under-frequency detection is provided without additional components. If the input frequency of the "A" power 760 side falls below the total envelope charge for a given time, the capacitor C6 will fail to store enough charge from cycle to cycle, and the latch (formed by Q17 and Q18) will release and allow transfer of the load to the "B" power 765 side.

FIG. 12 shows a circuit diagram 1200 of an illustrative "A"/"B" synchronization integrator subsystem 725a in context of the "B" power synchronization detection subsystem 720 and the "A" power loss detect subsystem 715 for use in some embodiments of a micro-ATS 700. Embodiments of the "A"/"B" synchronization integrator subsystem 725a provide synchronization of "B" to "A" transfers at zero voltage crossing times and the "A" to "B" integration function. For the sake of clarity, functionality will be described during start-up, during a transfer from "B" power 765 to "A" power 760, and during a transfer from "A" power 760 to "B" power 765.

Turning first to functionality during start-up, "A" power 760 is turned on. Accordingly, "A" power 760 will be present at the output because "A" power 760 uses the NC (Not Connected) contacts of the relays. After some delay (illustrated as approximately 4 seconds), the "A" power loss detect subsystem 715 will light its indicator LED (LED 5) and provide current for the diode in U2. The transistor in U2 will turn on and provide a current path for R15 and R11 to turn on Q33. Q33 will then provide a current path through R28 and D23 to charge the integrator capacitor C9. Q33 will also turn Q19 on and will be helped by the cathode of D16 going positive, providing positive bias through D14 and R62. When Q19 turns on, Q20 will turn off disabling the "B" power synchronization detection subsystem 720. Thus, the opto-transistor in U1 will have no influence on the charge of the integrator. Current continues to flow from the collector of Q33 to C9 via R28 and D23 charging C9. This is the initial charge integration signal to be sent to the timing control subsystem 730 for threshold detection there. As the charge builds, it eventually reaches a point where the comparators (U3a and U3b) detect the crossovers. This is the basis of establishing the timing spaces between the events of the relays switching. The inter relay transfer timing of transfer from B to A is essentially controlled by R28.

Turning to functionality during transfer from "B" power 765 to "A" power 760, much of the functionality is essentially the same as that described above with reference to the start-up functionality. Approximately 4 seconds after "A" power 760 returns, the indicator LED (LED 5) will light (i.e., this is similar to when "A" power 760 is initially started up, as described above). Current will go to U2 and turn U2 on. Q33 will turn on, starting to charge U9. At this point, Q20 and U1 are turned on, and Q19 is turned off and cannot turn on until the next zero crossing of "B" power 765 when U1 turns off. This allows the anode of D22 to go high, turning Q19 on, turning Q20 off, and slowing the integrator to charge through R28. This causes the micro-ATS 700 to switch to "A" power 760.

Turning to functionality during transfer from "A" power 760 to "B" power 765, if "A" power 760 should fail, U2 will turn off, causing Q33 to turn off. This will turn Q19 off and Q20 on. Since the opto-transistor in U1 is almost always conducting, Q20 and the opto-transistor in U1 will short the integrator through D24 and R70 at any time except exactly at the next zero crossing of the "B" power 765 side. As C9 rapidly discharges, the integrator output to the timing control subsystem 730 will cross over the thresholds of the comparator U3a and U3b. The first event will be to set RY On via U3a. Since U3b is presently biased to provide the shunt at the junction of Relays RY2 and RY3, high inrush current will flow in RY2, causing it to disconnect the "A" power 760 from the load. As the integrator voltage continues to fall, the second comparator threshold is passed, and U3b releases GC On. This de-energizes the gatekeeper relay (RY3) and the Neutral Relay (RY1) shunt. Then, very shortly thereafter the Gatekeeper relay (RY3) and the Neutral Relay (RY1) will connect the load to the "B" power 765 AC source. Only then does current start to flow to the load from the "B" power 765 AC power source.

Embodiments of the "A"/"B" synchronization integrator subsystem 725, such as the embodiments illustrated and described with reference to FIG. 12, provide a number of innovative features. One such feature is that some embodiments of the "A"/"B" synchronization integrator subsystem 725 provide very high efficiency, for example, because of their use of high impedance components to reduce size and minimize power consumption. Another such feature is that some embodiments of the "A"/"B" synchronization integrator subsystem 725 act as a multi-function circuit to minimize component count. As illustrated, embodiments combine the functions of synchronizing the return from "B" power 765 to "A" power 760, and the timing control for the gap between disconnecting the "A" power 760 before connecting the "B" power 765 to the outputs. By combining these functions, parts count can be minimized and the overall size of the finished product can be reduced. Yet another such feature is that some embodiments of the "A"/"B" synchronization integrator subsystem 725 provide power off delay timing during transfer from "B" power 765 to "A" power 760. The transition time power off delay is accomplished via an easily programmed capacitor value (C9). C9 is the integration storage capacitor that supplies threshold ramp signal to U1, the timing comparator. Adjustment of C9 changes the delay between the A disconnect relay (RY2), and changing state of the Gatekeeper (RY3) and Neutral (RY1) relays.

Figure 13:
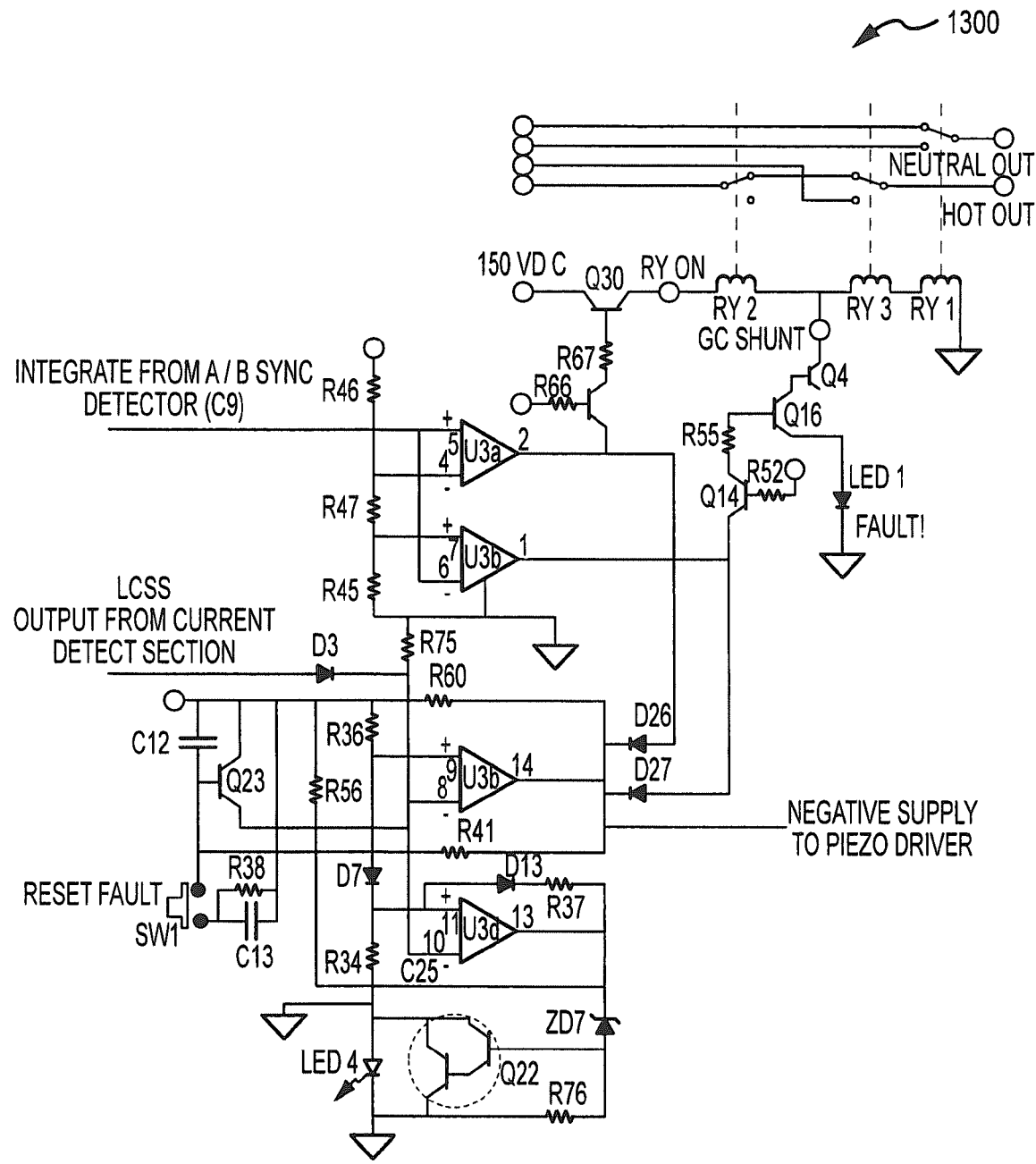
FIG. 13 shows a circuit diagram of an illustrative timing control subsystem for use in some embodiments of a micro-ATS.

FIG. 13 shows a circuit diagram of an illustrative timing control subsystem 730a for use in some embodiments of a micro-ATS 700. Comparators in embodiments of the timing control subsystem 730 control switching functions of the relays and activation of the warning indicators and buzzer. The ladder formed by R45, R46, and R47 defines voltages V1 and V2. Integrator (C9) is the output of the "A"/"B" synchronization integrator subsystem 725, and is high when the micro-ATS 700 is using "A" power 760 and low when the micro-ATS 700 is using "B" power 765. The slope of the transition from "A" power 760 to "B" power 765 and from "B" power 765 to "A" power 760 is controlled by C9 and R70, and by C9 and R28, respectively. C9, R70, and R28 are discussed as part of the "A"/"B" synchronization integrator subsystem 725.

Pin 2 of the comparator U3a is the Relay On (Low) signal and drives the emitter of Q29. Pin 2 will subsequently apply HV power to the A relay RY2 (RY On). Pin 1 of the comparator U3b is the GC Shunt Drive (Low) and drives the emitter of Q14. Pin 1 will subsequently ground the other side of the A relay (RY2) when asserted. This applies the full HV power (150 Volts) across the A relay (RY2), which can assures fast operation of the A relay (RY2). Times T1 and T2 are controlled by V1 and V2, and by the rising and falling slope of the Integrator (C9).

Embodiments of the timing control subsystem 730 participate in "A" power 760 to "B" power 765 transitions according to the following technique. When "A" power 760 fails, the Integrator (C9) will start to ramp down to V1. HV power will then be applied to RY2. Ground is already on the other side of the RY2 coil. RY2 will then disconnect from the "A" power 760 side. When the Integrator (C9) drops further to A2 (the end of time T1), the signal GC Shunt Drive will go high releasing the ground from RY2 and allowing current to flow through RY2 to RY1 and RY3. This connects "B" power 765 and Neutral Out to the output power 770 node. Time T1 assures that "A" power 760 is released before "B" power 765 is connected.

Embodiments of the timing control subsystem 730 participate in "B" power 765 to "A" power 760 transitions according to the following technique. At the beginning of T2, RY2 is grounded, removing power from the RY1 and RY3 relays. This connects the Neutral Out (NO) to "A" Side Neutral (AN) and Hot Out (HO) to the RY2 relay, which is open at this point. At the end of T2, HV power is removed from the RY2 relay, thus connecting "A" Side Power to the Hot Out (HO). HV and "Common 2" are the outputs of the HV power supply. During normal operation, Common and Common 2 are connected together by the Darlington transistor Q22.

Embodiments of the timing control subsystem 730 participate in over-current control according to the following technique. When the output current approaches a pre-defined warning point (e.g., between 12 and 13 Amps), an indicator is illuminated to warn the user that this is the maximum advisable limit for continuous current. At this point V3 and V4 are defined by the ladder resistors R34 and R36 and diode D7 as discussed above. Output current is detected in the output current detect subsystem 740, and an analog voltage is generated there and sent to the timing control subsystem 730. The slope of the "Load Current Sensed Signal" (LCSS) is a function of applied current to the attached load and time. V4 is set to be equivalent to approximately a 12-Amp load on the output of the micro-ATS 700 (or another desired value). When the LCSS exceeds V4, pin 13 of comparator U3d will go low. This will cause a loss of conduction through ZD7 guaranteeing that Q22 will turn off when U3d pin 13 goes low, which, in turn, will energize the indicator LED (LED4). R37 and D13 will cause V4 to drop slightly increasing the separation between V4 and the LCSS. C25 also serves to smooth out the difference between V4 and the LCSS.

If the LCSS then drops below V4, LED4 will turn off. If, however, the LCSS continues to increase to V3, pin 14 of U3c will go low. This can cause three events to occur. One event occurs because D26 and D27 are connected to U3a pin 2 and U3b pin 1. When U3c pin 14 goes low, pins 2 and 1 are also pulled low. This activates RY2, disconnecting the power from the output via D26, and locks out the shunt drive from activating via D27. Another event is that the piezoelectric device driver subsystem 750 will be turned on via the negative supply path. Another event is that Q23 will be turned on by R41. Q23 will pull the LCSS to 15 volts, latching the fault signal low. Q23 is discussed further with reference to the piezoelectric device driver subsystem 750.

According to some embodiments, when the micro-ATS 700 output current exceeds the pre-defined limits (e.g., substantially like a 14.5-Amp fast-blow fuse), an indicator is illuminated that indicates the micro-ATS 700 disconnected the load from the source, and a buzzer sounds to warn the user that the micro-ATS 700 has disconnected the load. This provides "virtual circuit breaker" (VCB) function of the micro-ATS 700.

At this point V3 and V4 are defined by the ladder resistors R34 and R36 and diode D7, as discussed above. If an over-current condition occurs, the LCSS will be detected by the timing and control comparators U3C and U3D. If it represents a current of greater than 15 A for 10 seconds, the "Fault (Low)" signal will be generated, latching Q23 and charging C12. This will protect fuses F1 and F2. If the overload is removed and switch SW1 is pressed, the charge on C12 will be transferred to C13. Q23 will be turned off and power will be restored to the output. If, however, the overload has not been removed, then C15 is still charged, so that "Fault Low" will be regenerated, and Q23 will be turned back on. Repeated pressing of the reset switch (SW1) will charge up C13 from C12 and nothing will happen. This prevents an already hot F1 or F2 from getting repeated hits when SW1 is pressed. Thus the virtual fuse protects the internal real fuse.

Embodiments of the timing control subsystem 730, such as the embodiments illustrated and described with reference to FIG. 13, provide a number of innovative features. One such feature is that some embodiments of the timing control subsystem 730 provide very high efficiency. Embodiments use very low-power components and high-impedance circuits to minimize power consumption. Another such feature is that some embodiments of the timing control subsystem 730 provide high voltage control. The connection of the low-voltage, low-power control section to the high-voltage relay-power control section is accomplished via an innovative coupling using a variation of the grounded base configuration, where the bases of Q14 and Q29 are referenced to the +15-Volt power supply. The emitters of those transistors are connected to the open collector outputs of U3. Since these outputs are only current sink to the common supply and that they also cannot be exposed to voltages greater than the plus supply, these voltage amplifier transistors (Q14 and Q29) provide that voltage amplification with as few components as is possible.

Yet another such feature is that some embodiments of the timing control subsystem 730 provide power savings in LED illumination of the indicator LEDs (LED 4 and LED 1). The improvement in efficiency is not so much the savings of power when the LEDs are illuminated, as this is the time when there is either a fault or a undesired condition, and is not the predominant operating condition of the micro-ATS 700. However, the fact that the innovative way of powering these LEDs eliminates the need for an additional power supply, and the attendant losses associated with such an addition, is an improvement in efficiency. Both of these LEDs are powered by current through the rest of the circuitry that is utilized, regardless of the conditions of the LEDs otherwise. The current is being passed through LED 4 from the current utilized to operate the timing control subsystem 730. When not needed (not illuminated) LED 4 is turned off by the shorting transistor Q22. The only condition when a fault is necessarily indicated (e.g, by LED 1) is when the A relay (RY2) is active, and the Gatekeeper and Neutral relays (RY3, RY1) are shunted into the off condition, thus disconnecting power from the source to the output. In this continuous condition, the current necessary to power the A relay (RY2) is passed through LED 1. This current path is already necessary to power the relay, thus it can be used to power the LED with no additional power supply circuitry. This design feature reduces power consumption, and simplifies the total design.

Figure 14:
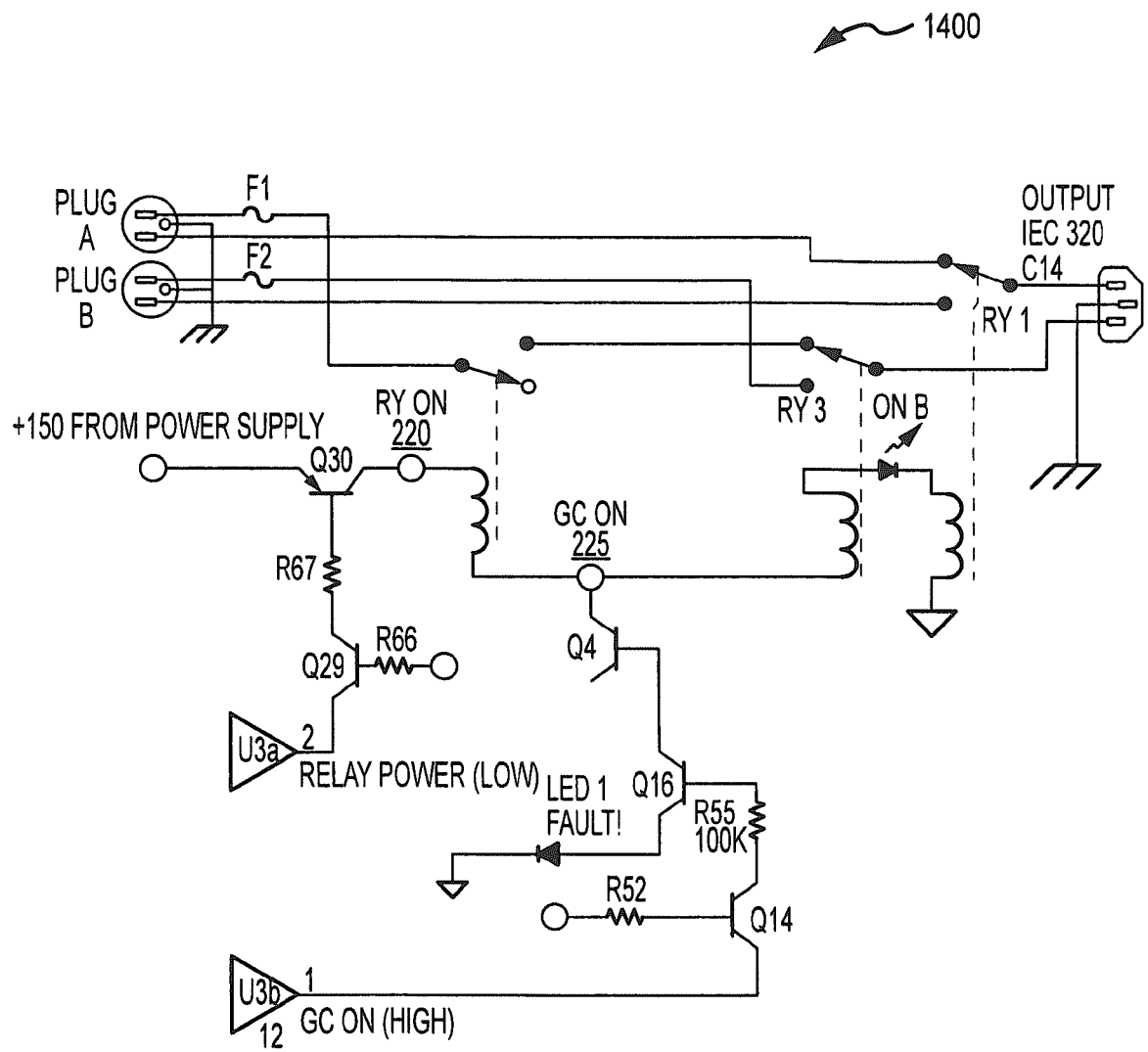
FIG. 14 shows a circuit diagram of an illustrative "A" & "B" power switching subsystem for use in some embodiments of a micro-ATS.

FIG. 14 shows a circuit diagram of an illustrative "A" & "B" power switching subsystem 735 for use in some embodiments of a micro-ATS 700. The "A" & "B" power switching subsystem 735 controls when the selected power source to the micro-ATS 700 is switched, either from "A" power 760 to "B" power 765 or "B" power 765 to "A" power 760. Embodiments also control over-current condition switching and relay sequencing, using RY1, RY2, and RY3 to control the flow of power from the "A" power 760 and "B" power 765 inputs to the output power 770 node. Both "A" power 760 and "B" power 765 can be protected by fuses F1 and F2, respectively.

One condition of the "A" & "B" power switching subsystem 735 that is worth discussing is during an inter-transfer time (e.g., which may be substantially similar or identical to the condition of the "A" & "B" power switching subsystem 735 under a fault condition). When GC On 825 goes low (U3 pin 1) as discussed with reference to the timing control subsystem 730, R52 will provide the bias to turn Q14 on. Current in the collector of Q14 will bias the base of Q16 and in turn will turn Q16 on via R55. This is the voltage amplifier from the 15-Volt limited output of U3 to the 150-Volt offset to Q16 and Q4. The current in the emitter of Q16 is passed through the base of Q4 and to the coils of RY2 and RY3, thereby grounding them (as discussed more fully above). At this point, only the A relay (RY2) is energized. The function of Q4 will be discussed below with reference to the disconnect switch subsystem 745. According to the illustrated embodiment, transfers from "A" power 760 to "B" power 765 and from "B" power 765 to "A" power 760 may take around 2 milliseconds. It is also the state of the micro-ATS 700 during a fault condition (e.g., an over-current detected condition). It is worth noting that there is no AC Hot path from either "A" power 760 or "B" power 765 to the output power 770 node in this condition.

Another condition of the "A" & "B" power switching subsystem 735 that is worth discussing is when power is transferred to the "B" power 765 source. When "Relay Power (Low)" goes low (U3 pin 2) as discussed with reference to the timing control subsystem 730, R66 will provide the bias to turn Q29 on. This is the voltage amplifier from the 15-Volt limited output of U3 to the 150-Volt offset to Q30. The current in the collector of Q29 will turn Q30 on via R67. This will provide 150-Volt "HV" power to the 48-Volt coils of the series-wired relay string (RY1, RY2, and RY3).

Figure 15:
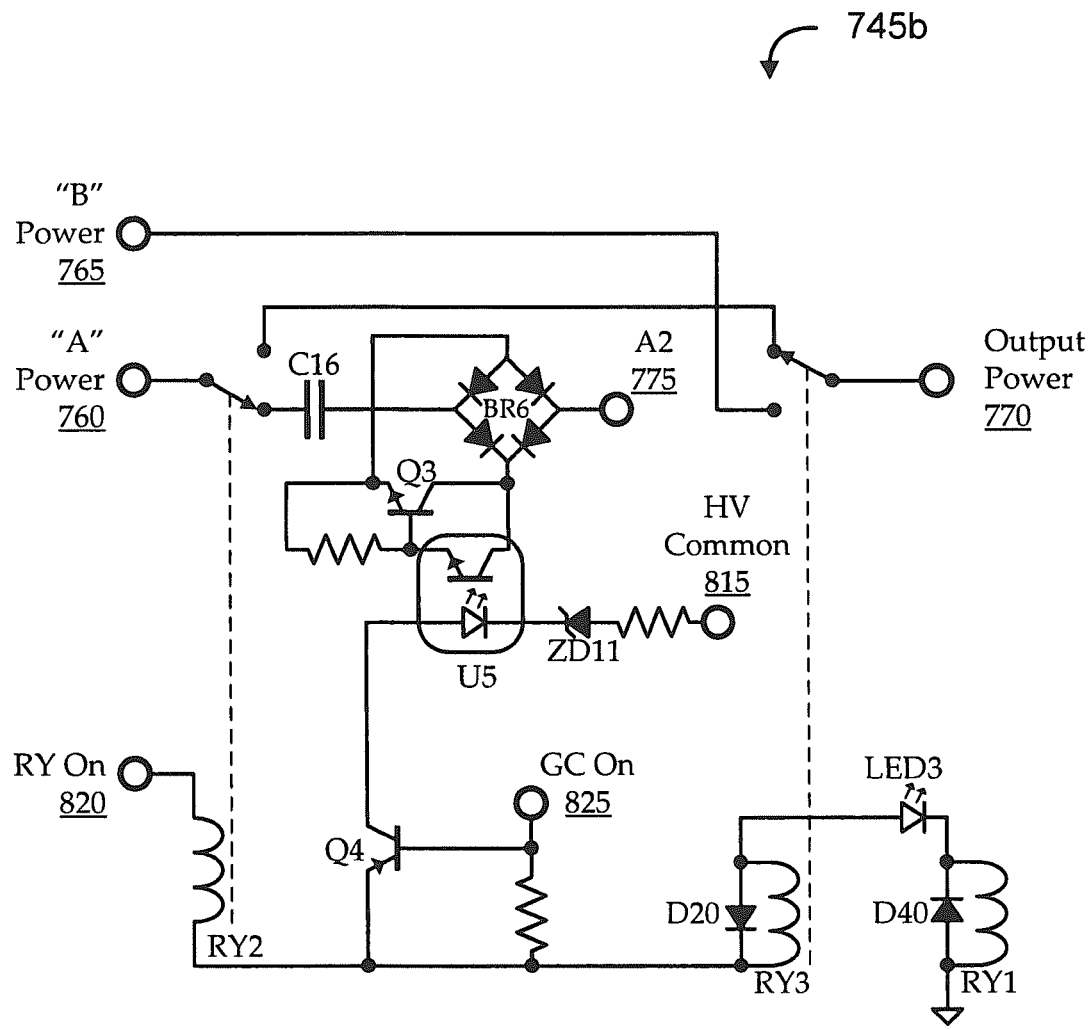
FIG. 15 shows a circuit diagram of an illustrative disconnect switch subsystem for use in some embodiments of a micro-ATS.

FIG. 15 shows a circuit diagram of an illustrative disconnect switch subsystem 745*a* for use in some embodiments of a micro-ATS 700. This switch is used to disconnect the alternate power source (via node A2 775) from the power supply subsystem 705 when not required. According to some embodiments, application of the alternate power source occurs only in one condition. When the micro-ATS 700 has a fault condition present (e.g., over-current), the relays of the "A" & "B" power switching subsystem 735 are configured with the A relay (RY2) in the disconnect (i.e., energized) position, and the Gatekeeper relay (RY3) and the Neutral relay (RY1) in the disabled (i.e., non-energized) position. Thus no output voltage is available at the H or N nodes, and the micro-ATS 700 would not have power input to the power supply subsystem 705. In this case, the normally open contact of the A Relay (RY2) has power present on it, which is directed to the power supply subsystem 705 via A2 775 to maintain power to the power supply subsystem 705 in this condition.

During all other states of the micro-ATS 700, it may not be desirable to have this connection. Differences in voltages between the A2 775 signal when the A relay (RY2) is energized and the "B" power 765 for the power supply subsystem 705 will cause transitory currents to be distributed unevenly between the AC hot power sources and their respective neutral return paths. This can result in possible interruption of a source power circuit served by a Ground Fault Circuit Interrupter (GFCI) receptacle or a circuit breaker. To prevent this condition, the disconnect switch subsystem 745 only allows alternate power via the A2 775 node to activate when a fault condition is present.

According to the illustrated embodiment, during a fault condition, the base of Q4 is pulled negatively by the output of the timing control subsystem 730 and the voltage amplifier via the signal GC On 825. Current through the base of Q4 to the emitter thus clamps off current through the Gatekeeper relay (RY3) and the Neutral relay (RY1). At the same time, RY Power On 820 is active to energize the via the emitter and base of Q4 to GC On 825, which is pulled to round. In this state, the A relay (RY2) is on (i.e., energized), and the Gatekeeper relay (RY3) and the Neutral relay (RY1) are held off. It is worth noting that, in this condition, there is no source of power available to the output power 770 node. This is the state of the relays during a "fault" condition (e.g., an over-current state).

In the event of a fault condition, in the timing control subsystem 730 (described above), the indicator LED (LED 4) is on, and Q22 is not on. In addition, the indicator LED (LED 1) is turned on by the current into the base of Q4. The sum total of the voltage from the cathode of the indicator LED (LED 4) to the HV Common 815 exceeds the threshold of ZD11. The current through ZD11 (green) thus illuminates the LED in U5, providing current to the base of Q3. Q3 then conducts and "shorts" out both conduction paths through BR6 allowing AC power to pass from C16 to A2 775. A2 775 then supplies the power supply subsystem 705 with AC source power only during a fault condition. C16 limits the total AC current to the power supply since, during this one condition, the A relay (RY2) is the only relay that is energized.

It should be noted that the reset switch SW1 in the Timing Control Subsystem can be connected to have additional functionality. In this mode two switches are used, one of which is the existing "reset" button which re-initiates power connection to the output after a fault condition, and one is an additional switch and associated latching circuit, used to clear the latching circuit if it is in the "off" mode and turn it back on. Thus the "off" switch will essentially "trip" the Virtual Circuit Breaker, by initiating the clear state (ie "off") condition without sounding the piezoelectric buzzer. This is done by connecting the off switch controlled latch to the control node between the present fault detect circuit and the relay control circuit. The mode of connection is commonly know as "wired OR".

Embodiments of the disconnect switch subsystem 745, such as the embodiments illustrated and described with reference to FIG. 15, provide a number of innovative features. One such feature is that some embodiments of the disconnect switch subsystem 745 provide very high efficiency. As illustrated, the use of three relays in series, rated at 48 volts each, can allow the application of directly rectified AC mains voltage to the relays. This eliminates additional power conversion circuitry, thus reducing parts counts as well as increasing efficiency. Another such feature is that some embodiments of the disconnect switch subsystem 745 use current limiting capacitor (C16) when only the A relay (RY2) is activated continuously, which allows use of the otherwise unused "normally open" contact of that relay, and further reduces parts count.

Yet another such feature is that some embodiments of the disconnect switch subsystem 745 provide relay sequencing when all three relays release simultaneously to prevent arching. As illustrated, the coupling of the fly-back suppression diode D48 on RY2 to the return path rather than directly across the relay provides a slight contact timing delay between the A relay (RY2) losing power and the Gatekeeper relay (RY3) and Neutral relay (RY1). This is accomplished by the anode of D48 being connected to the common rail instead of the more traditional connection to the relay coil. In this configuration, the A relay (RY2) has a higher impedance for the fly-back current to sink into, as the sinking current is also going through RY1 and RY3. The higher impedance results in the relay armature being able to move less quickly then the armatures of the other two relays. The result is that when the power is disconnected from the relay chain, RY2 will always connect the "A" power 760 slightly in delay to the disconnection timing of the gatekeeper (RY3) from the "B" power 765. This helps insure that "A" power 760 never becomes connected to "B" power 765 simultaneously while relay contacts are still together. Even if there is sufficient current to force a small arc, the relay contacts have disconnected prior to the arc starting, thus preventing the contacts from "welding" themselves in place and causing the "A" power 760 and "B" power 765 to flow uncontrollably. The result of this, in a polyphase application of "A" power 760 and "B" power 765 would result in a blown fuse.

Figure 16:
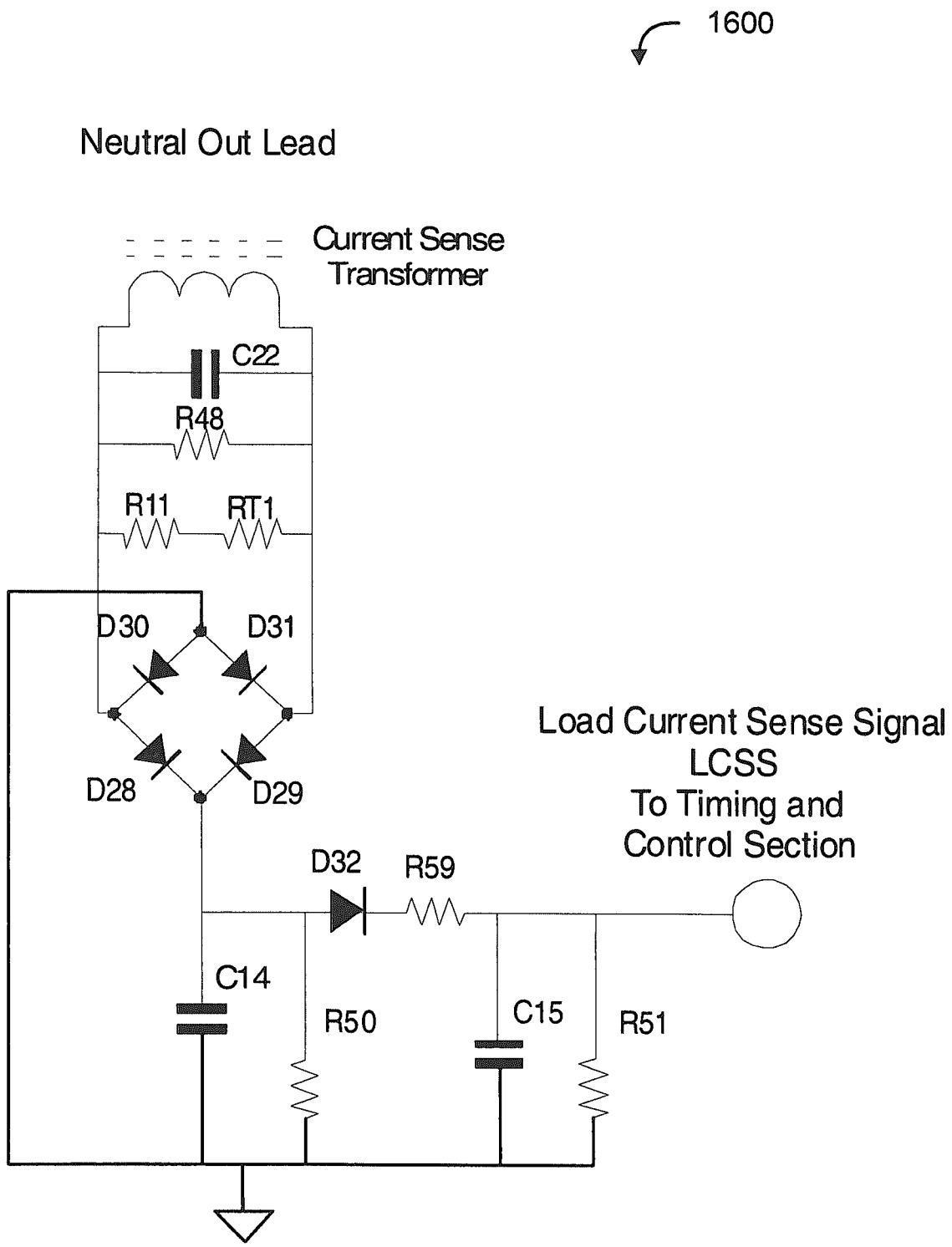
FIG. 16 shows a circuit diagram of an illustrative output current detect subsystem for use in some embodiments of a micro-ATS.

FIG. 16 shows a circuit diagram of an illustrative output current detect subsystem 740*a* for use in some embodiments of a micro-ATS 700. Embodiments of the output current detect subsystem 740*a* detect and measure the presence and various characteristics of the output current from the automatic transfer switch. This also circuit tends to mimic characteristics of a fuse, but only slightly below the thresholds of 15-Amp Fast Blow physical fuses that may be used in the "A" power 760 and "B" power 765 inputs to the micro-ATS 700. This allows the micro-ATS 700 to protect itself without blowing actual physical fuses, which must be replaced.

As illustrated, the neutral out of the micro-ATS 700 has a current sense transformer on it. This transformer has a diode bridge, formed by D28, D29, D30, and D31, which full-wave rectifies the "Load Current Sensed Signal" (LCSS, described above with reference to the timing control subsystem 730). C22 and R48 filter out the higher frequencies of the AC current and provide proper impedance loading of the current transformer. R11 and Thermistor RT1 provide thermal compensation so the micro-ATS 700 can remain accurate over a wide range of temperatures. C14, R50, D32, D3, C15, R51, and R75 can be configured and selected to effectively emulate the time VS current opening threshold of a 14.5-Amp fast-blow fuse, with the time part of the curve advanced to open about 33% faster than the equivalent 15-Amp fast-blow fuse.

Embodiments of the output current detect subsystem 740, such as the embodiments illustrated and described with reference to FIG. 16, provide a number of innovative features. One such feature is that some embodiments of the output current detect subsystem 740 employ a combination of capacitors and resistors that result in an analog representation of the characteristics of a fast blow fuse. The principal characteristics of the timing of a fuse are as follows: it can carry significant over-current for a short period of time; and, after some time, the fuse will "blow" at or near the rated current of the fuse. This is primarily controlled by the thermal characteristics of the fuse material itself, and how much mass is being heated to the melting point by the applied current. In order to emulate the characteristics of a fuse, a pseudo two-pole filter is formed by these components to emulate the desired characteristics. The circuit reduces the parts count to the minimum by having the two halves of the two poles interact with each other by allowing current from the first pole to charge the second pole without the reverse. The second pole is discharged by a controlled discharge path through R32. This single point of discharge can thus be used to bias both poles of the filter and alter the overall curve of the response time of this circuit without significantly changing the shape of the curve. This is useful for adjusting the "rating of the fuse" by a simple one component change, specifically R32. By changing the value of R32, the programmed threshold of maximum current rating of the electronic, or virtual, fuse (circuit breaker) can be adjusted simply and with minimum effect on the inrush current handling characteristics of the circuit.

Another such feature is that some embodiments of the output current detect subsystem 740 provide temperature stability. Numerous variables are introduced into the design of the virtual circuit breaker design (e.g., as discussed with reference to the output current detect subsystem 740 and to the timing control subsystem 730 above) that affect temperature related stability. Compensation of all of the thermal variables as well as emulating the thermal effects in a real fuse is accomplished by RT1 and R11. RT1 is a thermistor that has a negative temperature coefficient. As temperature goes up, the resistance goes down, in a predictable fashion. By placing these two components in series across the current sense transformer, the load impedance presented to that transformer is affected by temperature. The selection of values for the Thermistor RT1 and R11 result in the overall performance of the virtual circuit breaker effectively mimicking its electro-mechanical equivalent.

Figure 17:
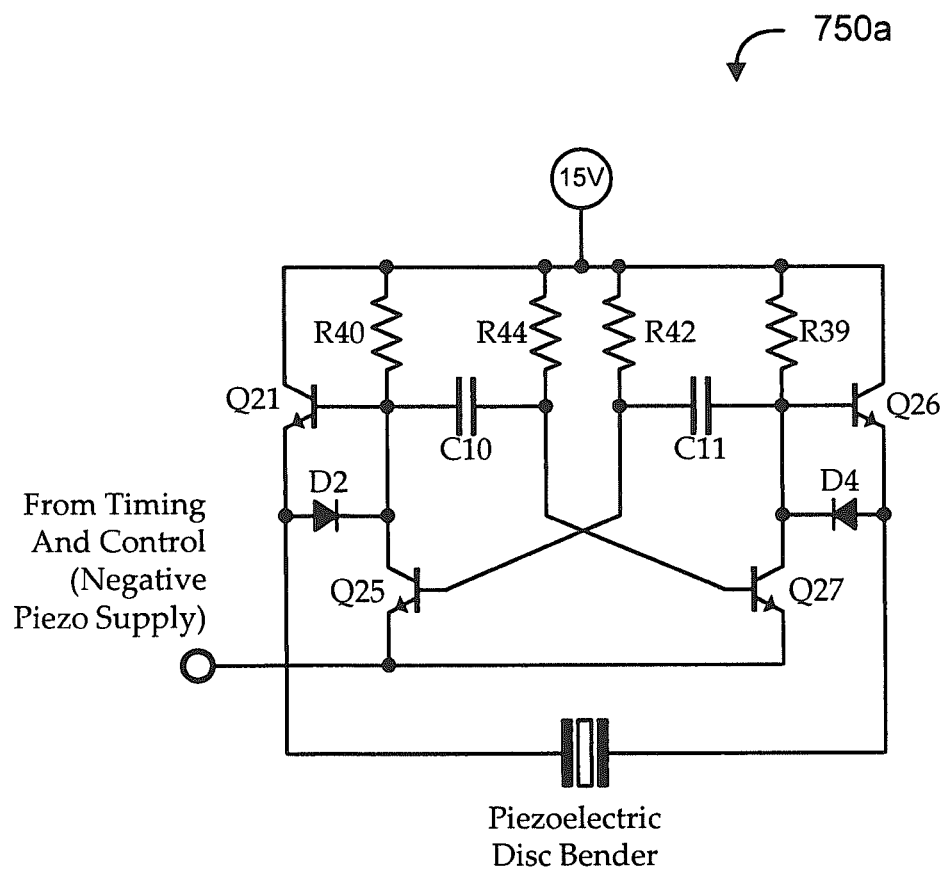
FIG. 17 shows a circuit diagram of an illustrative piezoelectric device driver subsystem for use in some embodiments of a micro-ATS.

FIG. 17 shows a circuit diagram of an illustrative piezoelectric device driver subsystem 750*a* for use in some embodiments of a micro-ATS 700. Embodiments of the piezoelectric device driver subsystem 750*a* include an innovative implementation of a power driver for driving a piezoelectric buzzer (or similar device). When "NOT FAULT" goes low, it provides a ground path for the oscillator formed by Q25, Q27, R40, R42, R44, R39, C10, and C11.

When power is applied, either Q25 or Q27 will turn on. If Q25 turns on, the voltage on both sides of C10 will drop, thereby providing a low to the base of Q27 and turning Q27 off. Then C10 will charge up via R44. When the voltage at the base of Q27 reaches approximately 0.6 volts, Q27 will turn on. Both sides of C11 will drop. Q25 will turn off, and so on, back and forth. Q21 and Q26 are emitter followers. As the collector of Q25 charges up when Q25 is off, Q23 emitter will follow its base driving the piezoelectric buzzer. When Q25 turns on it will sink connect from the piezo through D2, and similarly for Q26, D4, and Q27.

Embodiments of the piezoelectric device driver subsystem 750, such as the embodiments illustrated and described with reference to FIG. 17, provide a number of innovative features. One such feature is that the circuit provides high efficiency with a low parts count. As illustrated, high efficiency is achieved by combining the oscillator and amplifier necessary to drive the piezo into a power oscillator, and the combination also tends to minimize parts count. In this configuration, nearly all the current expended in the circuit for both the oscillator function and the power amplifier function is applied to the piezo crystal for conversion to acoustic energy.

The various circuits and other embodiments described above form novel embodiments of micro-ATSs 700 and provide a number of features. One such feature is ultra-low power consumption. Use of a transformer-less power supply reduces overall loss in converting from 120VAC mains voltage to DC voltages required for internal circuits. Another such feature is that virtually no power is consumed on the non-connected side (e.g., on the "B" power 765 side when the load is connected to "A" power 760). Yet another such feature is that the use of optical isolation in the power supply virtually eliminates cross currents between the "A" power 760 and "B" power 765 inputs. Still another such feature is that arc suppression is provided at the disconnection of the "B" power 765 side on the contacts of the affected relays by timing the break of the relay contacts at the zero crossing of the current presented to those contacts.

Additional features are realized by selections of certain circuit components and/or topologies. One such feature is that ultra low power consumption can be achieved by utilizing a capacitor current limit on the AC input. The selected capacitor (0.22 uF) limits 60 Hz to about 10 milliamps into the 48-volt load. At 50 Hz, the limit is 8 milliamps, both within operating range of the connected relays. Another such feature is that use of the same path of current in the "A" power loss detect subsystem 715 for illuminating the "on A" indicator, activating the optical isolator link to the synchronization circuit, and the hold latch, minimizes the normal operating state draw on the "A" power 760 side.

Another such feature is that power delivery from the "A" power 760 side to the Load, the predominant path of power for the majority of use with regards to time, is via the Normally Closed position of the routing relays. This eliminates the current necessary to activate the relays. Another such feature is that conversion of the AC mains voltage directly to DC without the use of a transformer, or power conversion, for the purpose of minimizing power consumption, is made possible by the arrangement of the relays when activated. Three relays are connected in series when activated to transfer the load to the "B" power 765 side. This action allows the use of high voltage (AC Mains Voltage directly rectified to 150 VDC). This design methodology allows the transformer-less power supply to be implemented.

Another such feature comes from use of the Normally Open contact of the A disconnect Relay (RY2) as an AC Mains diversion path for and alternate power source during a fault condition. In this condition, only the A relay is activated. The alternate path described allows a second rectifier and a capacitor current limit on the AC Mains, so the current rating of the coil of the single activated relay (RY2) is within operating range of 8-10 milliamps. Another such feature is that use of total circuit pass current on the low voltage timing control subsystem 730 to energize the indicator LED (LED 4) that indicates approaching the over current condition, and shunting the LED to the off condition when not in use, eliminates the need for an auxiliary power supply for this device. This increases the efficiency of power utilization in the micro-ATS 700, and lowers quiescent dissipation. Another such feature is that using relay pass current to activate the indicator LED (LED 1) when in an overload condition also eliminates need for an auxiliary power supply to power the LED when required. This improves efficiency and reduces normal operating condition power dissipation.

Another such feature arises in the context of "A" power loss detection through an innovative use of an arrangement of semiconductors to perform multiple functions. The arrangement of Q17 and Q18 is similar to a silicone controlled rectifier (SCR). The primary working characteristic of this configuration is that the SCR simile requires very little current to cause to latch into a conduction state. This latched state will continue until passing current through the pair ceases. When it ceases, the latch will disconnect and not allow current to flow until re-initiated. In addition, the otherwise inaccessible second PN junction of the SCR simile is accessible, thus allowing the action at this point to also affect Q15 at a certain point in the sequence to be beneficial. The Q15 is the timer reset for delaying the return to "A" power 760 from an "A" loss state. This must be reset every time the SCR simile goes into conduction. By tapping the SCR simile at the collector of Q17 (the base of the Q18 junction), normally an inaccessible junction in a conventional SCR, the avalanche activation of the SCR simile at that time can be utilized to force the reset of the timing capacitor C8 via Q18.

Another such feature arises in the context of synchronization of the return from "B" power 765 to "A" power 760 at the zero-crossing of the "B" power 765 signal to reduce arching of the B relay contacts. An optically coupled synchronization pulse and level from the "B" power 765 source is used for two functions: to synchronize transfer from the "B" power 765 to the "A" power 760 at the zero-crossing of the "B" power 765; and to provide a source of signal that indicates the loss of the "B" power 765 and thus force the connection to the "A" power 760, regardless of the state of other circuits that normally would influence transfers to the "B" power 765 side. First, the optically coupled sync signal holds off the signal from the optical coupler that indicates that "A" power 760 is ready to be transferred to until the sync pulse appears (via Q19, Q20, and the U1 opto-coupler transistor). After the synch pulse appears at the U1 opto-coupler, the release of the hold on the signal from Q33 allows the circuit to initiate the integrate function for the comparator, U3 to utilize to complete the transfer. Simultaneously, the release of the hold function then latches the sync pulses out so no additional pulses can be present via bias on the base of Q19. In addition, if there is no AC power present on the "B" power 765 side, the output of the sync circuit never presents a low impedance across the collector/emitter of the transistor in U1, and hence there is no current sync path for discharging C9, the integrator capacitor. Thus, R33 always holds the integrator capacitor fully charged, and the input to the comparator presented by C9 will always force selection of the "A" power 760 side, regardless of the state of the "A" power loss detect subsystem 715 output at U2. This unique approach to providing the sync and holding the output on "A" power 760 if "B" power 765 is not present utilizes a minimum number parts, each of which operates in high impedance mode. This reduces power consumption to the minimum, and still is low cost to produce.

Another such feature arises from the unique piezoelectric device driver subsystem 750. This arrangement of Q21, Q26, Q25, and Q27 forms a transistor pair oscillator. Q25 and Q27 form the basis of an astable oscillator with R39, R40, R42, R44, C10, and C11 forming the components that determine oscillation. The innovative addition of D2, D4, Q21, and Q26 turn the oscillator into a power oscillator capable of driving piezo components bilaterally (e.g., one side of the Piezo is at +15, while the other is at Common; then it switches, and the opposite is true). This maximizes the output to the Piezo for a given power supply voltage, at minimum parts count and minimum power dissipation. This same power oscillator can be used for other applications such as driving a miniaturized switching power supply, or for signal source in a small tester. Numerous applications exist for a miniature, low power, very low cost power oscillator.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. Accordingly, the appended claims include within their scope such processes, machines, manufacture, compositions of matter, means, methods, or actions.

2) Concept Claims—the Wider Claims on Basic Concepts
IV. System Claims—the Narrower Claims on Use of the Idea(s) in a Specific Application or Applications.
  I. Extremely Efficient Data Center Power Distribution
  A method is described to implement extremely efficient data center power distribution using highly parallel auto-switched power at ratios of 1 µATS™ to 1 EDP device or 1 µATS™ to a low integer number of EDP devices) as described earlier. This method is also much more reliable than other methods of using ATS devices for power distribution.
  II. Extremely Efficient Rack Space Usage
  If the ATS technology used to implement the highly parallel auto-switched data center power distribution has a sufficiently small form factor, it is possible to implement the methodology without using any rack space that could otherwise be used for mounting EDP equipment by placing the ATS units in various locations as follows:
  1. Mounted on and fitting within 1U or near the EDP equipment being powered
  2. Integrated into the structure of the rack
  3. Mounted near the rack, for example on top of it
  4. Integrated into EDP equipment.
  5. Integrated into an in-rack or near rack PDU such as the ZPDU. Each sub-branch output of the ZPDU would normally be auto-switched in this case.
  6.
  The described example µATS™ is sufficiently small to be placed in these locations.
  III. Increased Efficiency Data Center Power Distribution
  A method that increases the efficiency of traditional data center power distribution using auto-switched power as described earlier. This is done by using µATS™ devices to "shift" electrical loads in a data center onto one of a pair of UPS units, so that all of the load is taken by only one of the UPS units. This increases the efficiency of the UPS units by insuring that one of the UPS units is running at greater efficiency and the other is running at or close to zero load, where it consumes very little energy.

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention. Embodiments are described with respect to various systems, components, and processes for use in a data center environment, though it will be appreciated that various aspects of the invention are applicable in other contexts. For example, embodiments may be advantageous in designing power distribution for server farms, such as those used by large information services or cloud computing providers. Moreover, for convenience of reference, various systems, components and methodology are identified by goods and/or services offered under the Zonit trademark, which is owned by Zonit Structured Solutions, LLC, the assignee of the present application.

Embodiments provide techniques for delivering auto-switched power using multiple automatic transfer switches (ATSs) to end-user equipment mounted in data center racks. In some implementations, the design and construction is facilitated by the optional use of hydra cords to create a power distribution system in the rack that allows the dimensions of the rack to be optimized to maximize the efficiency of the use of data center floor space. Accordingly, airflow can be optimized in the equipment rack by minimizing the number of power cables needed and their routing in the rack. Certain embodiments further include other power distribution technologies that unite auto-switching capabilities with power phase load balancing.

Typical modern data centers can have power distribution networks that include thousands of branch distribution circuits. Precise loading and/or demands of the various electronic data processing (EDP) equipment is often unknown to the data center personnel. Accordingly, changes to the loading of these circuits can cause electrical failures, for example, when branch circuit breakers are tripped by personnel plugging in a load that exceeds the capacity of the circuit. Further, it may be important to maintain loading of each branch circuit at or below about 75% of its capacity to account for "inrush loads" that can occur during a cold start, which may be the highest load scenario and can otherwise trip the branch circuit breakers when it happens.

Downtimes or failures of EDP equipment in a data center can be undesirable for a number of reasons. One reason is that these EDP devices can support mission-critical or life safety goals, for which even a short interruption in functionality can be catastrophic. Another reason is that inter-dependencies of modern IT infrastructures and their applications are quite complex and may not always be fully appreciated. A single EDP device may provide an underlying service that nobody realized was associated with that device, and a power loss can cause larger business functions that depend on the affected service to be adversely and expensively impacted.

Yet another reason that downtimes or failures of EDP equipment in a data center can be undesirable is that restarting an IT infrastructure and the applications that run on it successfully, from either a cold-start or intermediate state, can be very site-specific and unpredictable. Most enterprise sites never test this aspect of their information systems. Often proper startup procedures rely on a specific sequence and timing of network, system, and application services. In any complex enterprise environment, all services do not usually recover normally if you power everything up at the same time. Similarly, problems can arise if you power down and power up particular sub-components. Restoring proper functioning of the functionality may involve extensive human intervention, including manual reboots or service stop/starts. Further, EDP equipment downtimes can be significant, can be difficult to diagnose and fix, and can cause corruption of service configurations or data in some instances.

Many types of EDP equipment may be particularly vulnerable to electrical failures at the branch circuit. For example, many models of EDP equipment have only one power supply, and therefore one power cord. Thus, a failure of the input power to the power cord interrupts power to the power supply of the equipment. One technique for improving power distribution reliability for EDP equipment is to offer configurations having multiple power supplies. However, even in equipment having multiple independent power supplies, interruption of the input power can cause failure (or downtime) of the equipment when the device can only be plugged into one power source at a time.

Implementations with multiple power supplies can have additional limitations. One limitation is that additional power supplies raise the cost of the device and can be associated with minimum additional amounts of power loss associated with running those additional supplies. Another limitations is that power supplies, especially the types typically used in EDP equipment, function most efficiently in a relatively narrow band of their output load rating (e.g., 70-85%). If an EDP device is offered in single and dual power supply configurations, the product manager may not wish to stock two different models of power supply with different load range optimizations, since that can represent additional expense to the manufacturer. This often means that the product manager will choose to stock the single power supply optimized configuration, which is optimized for perhaps a 70% load. When this power supply is specified in a dual power supply configuration, it will then be running at around 50% of its optimal loading, thereby appreciably lowering its efficiency.

A different approach to addressing the issue of power distribution reliability is to implement EDP equipment with auto-switching power plugstrips. Typically, those plugstrips are bulky and expensive, and they are usually mounted horizontally in data equipment racks, which can take up valuable rack space (they tend to take even more rack space with two input power plugs connected to two different power sources). Still, enabling auto-switched A-B power delivery to EDP equipment even having only a single power supply can appreciably increase the uptime of such equipment (though not typically to the level of dual power supply configurations). In many cases, this gain in reliability can be enough to meet the service level availability goals for the applications that the EDP equipment supports.

Accordingly, single power cord devices can realize significant gains in uptime reliability when connected to two independent power sources. These sources can be specified to gain the optimum cost benefit to reliability gain ratio. For example, implementations include data centers with uniform, redundant A-B power distribution, such as that supplied by the Zonit Power Distribution System.

A number of data center configurations are possible. One illustrative configuration includes two independent uninterrupted power sources (UPSs). This is often considered the highest reliability scenario, and is a common data center configuration.

Another illustrative data center configuration includes one line power source and one UPS. This type of configuration may be used as a cost savings measure when the total power usage in the data center exceeds the UPS capacity or to achieve higher power usage efficiency, since UPS units have a loss factor for the power they supply. The EDP equipment in the data center can be connected to run off of line power and only selected mission critical equipment is connected to the UPS as a backup power source. The majority of equipment is just line powered with a power conditioner module to stop input surges. For example, if the site steps down industrial power delivery from 480V to a more standard 208V, then a transformer is already in-line and any further power conditioning may not be necessary.

It is worth noting that UPS units both condition the power that goes through them and, if power is lost, use batteries to deliver backup power. Their capacity is therefore two-fold: the sustained amperage they can condition; and how many minutes of power they can deliver at a set load percentage, usually 100% for rating purposes. The amperage capacity is a function of the design of the UPS. The battery capacity is a combination of the amperage capacity and the number of batteries that are connected to the UPS. The battery capacity can be changed using external battery packs so the battery runtime of the UPS is increased to the desired target level.

Still another illustrative data center configuration includes two independent line power sources from two different power grids. In this configuration, only line power sources are used, but they are delivered on different distribution legs. This can reduce risk by insuring that two power branch distribution circuits must trip their breakers before power is lost to the equipment.

Effectively use of the auto-switching of power distribution to the EDP equipment between two independent power sources involves a device that can detect power loss (e.g., partial or complete failure of one or more phases of an input power signal) and automatically switch the input power to the connected EDP equipment to the other power source. To this end, some embodiments described herein provide efficient, reliable, and cost-effective automatic transfer switches (ATSs) for use in these types of EDP equipment deployment scenarios. For at least the reasons discussed above, ATSs (e.g., for single power cord devices) can save energy and reduce power costs, while avoiding interruptions in supply power to the connected EDP equipment.

Various embodiments described herein provide additional features. Some embodiments provide space-efficient parallel ATS deployments in data center rack configurations. These embodiments can provide alternate techniques to maximize the efficiency of usage of data center floor space and allow the deployment of the maximum number of equipment racks in a data center environment. Other embodiments provide configurations of ATSs and/or power cords to minimize power cable routing and/or airflow issues in data center equipment racks (e.g., "2-post" and/or cabinet ("4-post") equipment racks). Still other embodiments incorporate locking power cord technologies at one or both ends of power cords for more secure power delivery, for example in data centers located in seismically active geographies (e.g., California).

In particular, embodiments combine a number of small ATSs (e.g., referred to herein as "micro-ATSs") in parallel with integrated control logic to construct a large capacity, fast, efficient, and relatively low cost ATS. Certain embodiments of the micro-ATSs incorporate functionality described in PCT Application No. PCT/US2008/057140, U.S. Provisional Patent Application No. 60/897,842, and U.S. patent application Ser. No. 12/569,733, all of which are fully incorporated herein by reference for all purposes. Embodiments of the micro-ATSs will be discussed below, followed by embodiments for deploying the micro-ATSs to provide redundant power distribution.

Micro-ATS Embodiments

Traditional ATSs tend to have limitations that prevent their effective use in implementations of highly parallel, auto-switched, power distribution architectures. For example, these traditional ATSs may typically be too inefficient, consume too much rack space, and cost too much. Embodiments of the micro-ATS described herein address some or all of these issues.

According to one embodiment, the micro-ATS (e.g., the Zonit μATS™) is very small (e.g., 4.25-inches×1.6-inches× 1-inch, or less than 10 cubic inches) and very efficient (e.g., less than 0.2 volts at maximum load loss). Certain implementations use no rack space, as they are self-mounted on the back of each EDP device, incorporated in the structure of the rack outside the volume of the rack used to mount EDP equipment, incorporated in rack-mounted plugstrips, or incorporated in an in-rack or near-rack Power Distribution Unit (i.e., any of which being possible due to the small form-factor of the micro-ATS). In other implementations, the micro-ATS is small enough to be integrated directly into the EDP equipment itself.

Various embodiments of micro-ATSs are described herein, including their various components. For the sake of clarity and context, the micro-ATS embodiments are described as switching between two separate power sources, "A" and "B." In some implementations, the A and B power sources are single-phase sources. In other implementations, polyphase power sources are connected. Where polyphase power sources are connected, polyphase embodiments of micro-ATSs are used. Substantially the same components (e.g., circuits) described herein with reference to the single-phase implementations are applicable to the polyphase implementations.

For example, polyphase embodiments can be implemented as multiple single-phase micro-ATS units acting in parallel, with additional functionality provided for synchronizing certain of the control circuits so that they act together across the multiple ATS units to handle switching and return from one polyphase source to the other polyphase source and back. Various embodiments of polyphase micro-ATSs can also have different conditions under which to switch power sources. For example, given three phase power with X, Y, and Z "hot" leads, a fault on any of three might be considered reason to switch from the A to the B polyphase source. To return to the A polyphase source, it may be desirable to ensure first that all three hot leads are present, stable, and of sufficient power quality on the A source.

Turning first to FIG. 7, a system diagram of an illustrative micro-ATS 700 is shown, according to various embodiments. As illustrated, the micro-ATS 700 is connected to an "A" power source 760 and a "B" power source 765, and uses its various components to provide output power 770 to one or more devices or distribution topologies (e.g., to one or more EDP devices in a branch circuit of a data center). The micro-ATS 700 includes a power supply subsystem 705, an "A" power voltage range detect subsystem 710, an "A" power loss detect subsystem 715, a "B" power synchronization detection subsystem 720, an "A"/"B" synchronization integrator subsystem 725, a timing control subsystem 730, an "A" & "B" power switching subsystem 735, an output current detect subsystem 740, a disconnect switch subsystem 745, and a piezoelectric device driver subsystem 750.

Embodiments of the power supply subsystem 705 include innovative ways of powering control circuitry of the micro-ATS 700. Embodiments of the "A" power voltage range detect subsystem 710 determine if the power being supplied to the micro-ATS 700 is in a desired (e.g., predetermined) voltage range. Embodiments of the "A" power loss detect subsystem 715 determine when the "A" power being supplied to the micro-ATS 700 has been lost using desired discrimination characteristics. Embodiments of the "B" power synchronization detection subsystem 720 measure the timing of the alternating current waveform of the "B" power. Embodiments of the "A"/"B" synchronization integrator subsystem 725 provide synchronization of "B" to "A" transfers at zero voltage crossing times and "A" to "B" integration functionality. Embodiments of the timing control subsystem 730 control when the selected power source to the micro-ATS 700 is switched, either the "A" source to the "B" source or from the "B" source to the "A" source, and can handle over-current condition switching and relay sequencing. Embodiments of the "A" & "B" power switching subsystem 735 control actual switching between the "A" and "B" power sources in either direction to change which supply is acting as the input power source to the micro-ATS 700. Embodiments of the output current detect subsystem 740 detect and measure presence and various characteristics of output current from the micro-ATS 700, and can, in some embodiment, mimic characteristics of a fuse so that the micro-ATS 700 can protect itself without blowing actual physical fuses (i.e., which must be replaced). Embodiments of the disconnect switch subsystem 745 disconnect a secondary power source from the power supply when it is not in use. Embodiments of the piezoelectric device driver subsystem 750 implement innovative techniques for driving piezoelectric or other devices.

Each component is described below as performing particular functionality in the context of the micro-ATS 700. It will be appreciated that other configurations are possible in which similar or identical functionality can be implemented using other components, combinations of components, etc. Further, in some cases, values are given for components such as resistors and capacitors, etc. and ranges are given for current, voltage, and/or other power characteristics. These values and ranges are intended to add clarity to illustrative examples and should not be construed as limiting the scope of embodiments.

FIG. 8A shows a circuit diagram 800 of an illustrative power supply subsystem 705a in context of an illustrative "A" & "B" power switching subsystem 735 for use in some embodiments of a micro-ATS 700. As discussed above, the micro-ATS 700 is connected to an "A" power source 760 and a "B" power source 765. The power supply subsystem 705a performs a number of functions, including power conditioning (e.g., current limiting and power clean-up).

The source power for the power supply subsystem 705a is acquired from the center taps of RY3 H ("Hot") and RY1 N ("Neutral"). Thus, the source of power for the ATS Power Supply is from the "A" side when the output of the micro-ATS 700 is on the "A" Side, and on the "B" Side when transferred to the "B" side. Components of the "A" & "B" power switching subsystem 735 serve as the automatic transfer switch for the micro-ATS 700 power supply subsystem 705a. The current available from output power is limited by R3. ZD10 limits the full wave rectified output of the bridge BR4 to 150V peak. ZD10 guarantees that C1 does not exceed its rated voltage. C1 stores enough charge to allow HV ("High Voltage") operations of the relays during transitions between the "A" power source 760 and the "B" power source 765.

During an over-current fault, neither the "A" power source 760 nor the "B" power source 765 is available at the output power 770 node, but RY2 and all the rest of the micro-ATS 700 circuitry may still need power. This is accomplished by node A2 775 which manifests "A" power 760 at the NO terminal of RY2 via C16 and BR6 when RY2 is activated. C16 limits the current available during a fault.

Bridge BR6 normally blocks A2, as will be discussed more fully below. When a fault occurs, GC On will be pulled almost down to Common, and positive power will be available at U5 LED via ZD11. This turns on the U5 transistor. The U5 transistor and Q3 form a Darlington pair that shorts the bridge BR6, allowing A2 to drive HV through diode D9. A2 also drives LV ("Low Voltage") through diode D10. C20 provides filtering and storage for LV.

In some embodiments, as illustrated in FIG. 8B, the 15-volt power supply is normally supplied by HV through R63, R64 and R65. These three resistors drop the voltage and limit the current for Zener diode ZD2. ZD2 regulates the voltage for the comparator and other electronics on the control board.

C17 further filters out the 15-volt signal. During a fault condition A2 provides power for the 15V supply through LV. HV is pulled down to 45V in this condition due to current limiting capacitor C16 mentioned earlier.

Embodiments of the power supply subsystem 705, such as the embodiments illustrated and described with reference to FIGS. 8A and 8B, provide a number of innovative features. One such feature is that some embodiments of the power supply subsystem 705 acts as a transformer-less, very high-efficiency power supply. For example, as illustrated above, the circuit produces low and high-voltage DC power from multiple AC inputs that is suitable for powering both low-voltage control circuitry and higher power relays. It does so very efficiently and with a minimum of expensive analog parts.

Another such feature is that some embodiments of the power supply subsystem 705 provide capacitor current limiting for very low-power usage. As illustrated above, power consumption of the power supply subsystem 705 is limited by use of a capacitor. This can efficiently limit the power supply capacity to a desired value, thereby providing maximum efficiency and low power consumption.

Yet another such feature is that some embodiments of the power supply subsystem 705 provide optical isolation to reduce or even eliminate cross currents As will be discussed more fully below, embodiments of the control and synchronization subsystems (e.g., the "B" power synchronization detection subsystem 720, the "A"/"B" synchronization integrator subsystem 725, the timing control subsystem 730, etc.) optically isolate between input power sources, virtually eliminating cross-currents between them.

Still another such feature is that some embodiments of the power supply subsystem 705 provide power control relays (e.g., illustrated as RY1, RY2 and RY3) to direct the source power to the output of the micro-ATS 700 as well as provide the internal source selection (transfer switch function) for powering the micro-ATS 700 power supply subsystem 705.

And another such feature is that some embodiments of the power supply subsystem 705 use an optically isolated disconnect circuit to prevent cross-source currents when the micro-ATS 700 is in the over-current fault mode. In this mode, there is no power delivered to the output, and thus, power must still be delivered to the micro-ATS 700 control and relay drive circuitry. As illustrated above, this can be accomplished via the A2 775 power path, and controlled by BR6 and optical isolation control U5.

FIG. 9 shows a circuit diagram of an illustrative "A" power voltage range detect subsystem 710a for use in some embodiments of a micro-ATS 700. Embodiments of the "A" power voltage range detect subsystem 710a receive "A" power 760 nodes AH and AN. The "A" power 760 is full wave rectified by bridge BR2. C3 is used to limit the current available in this and the "A" power loss detect subsystem 715, as will be described below. In normal operation the "A" power voltage range detect subsystem 710a can generate the A (ON), A (COM), and CQ18 signals to the "A" power loss detect subsystem 715.

The illustrated "A" power voltage range detect subsystem 710a includes over-voltage detection and under-voltage detection functionality. According to the over-voltage detection functionality, D18 half-wave rectifies the "A" power 760 and drives a ladder comprised of R14 and R27, which charges C4. When over-voltage occurs on "A" power 760, ZD6 and Q36 will begin to conduct drawing current through resistors R7, R74, R6, R5, and R1. This will turn on Q34, which will pull up the voltage on C4 through R17. This will latch Q35, Q36, and Q34 in an on state. This also will pull current through R8, thereby turning on the over-voltage indicator, LED2. C2 will be charged and ZD5 will conduct. Q32 and Q31 will conduct, turning off Q37 and Q38. This turns off A (ON). In the illustrated embodiment, this will tend to occur at around 135VAC at AH, though other over-voltage thresholds can be set as desired.

Under-voltage functionality detects when "A" power 760 is below a desired low-voltage threshold. As illustrated, increasing diode D18 will charge capacitor C5 via the ladder formed by R16 and R30. When the charge on C5 reaches a preset level (illustrated as 100VAC, but other levels can be set as desired), ZD8 starts to conduct through R31 and R58. Q1 and Q2 will start to turn on, pulling current through R10, D12 and R9. This turns on Q37 and Q38 applying power to A (ON). This in turn drives current through R35 and D11, which turns Q1 and Q2 on harder and adds hysteresis to the voltage on C5. If "A" power 760 is at normal voltage and decreasing, the "A" voltage will have to drop to around 88VAC (or any other desired value) to turn A (ON) off. This is due to the additional current through R35 and D11 charging C5 when A (ON) is present.

When the "A" power loss detect subsystem 715 is on, signal CQ18 will be low. ZD9 and D1 will lower the voltage on the emitter of Q1. Q1 and Q2 will be turned on harder serving to improve the hysteresis of the under voltage circuit. C6 and R2 act to smooth out the A (ON) signal. C6 provides storage so that the zero crossings of the rectified AC signal do not turn the A detect circuit off. R2 controls the decay time of the discharge of C6 when power is lost on the "A" power 760 side.

Embodiments of the "A" power voltage range detect subsystem 710, such as the embodiments illustrated and described with reference to FIG. 9, provide a number of innovative features. One such feature is that some embodiments of the "A" power voltage range detect subsystem 710 provide very high efficiency. As illustrated, using high impedance components and switching off of the power delivery to the "A" power loss detect subsystem 715 as the technique for initiating and holding the voltage fault conditions is very efficient and consumes a minimum amount of power. In addition, the "A" power voltage range detect subsystem 710 also provides all power to the "A" power loss detect subsystem 715, and has current limiting provided by C3. Use of a capacitor for current limiting minimizes power consumption by returning unused current to the source on each half cycle instead of wasting it as heat as in a traditional resistor limiting technique.

Another such feature is that some embodiments of the "A" power voltage range detect subsystem 710 provide easily programmed over-voltage detect delay. As illustrated, the over-voltage detect functionality uses a single capacitor value (C4) to determine the delay for detecting an over-voltage condition. Another such feature is that some embodiments of the "A" power voltage range detect subsystem 710 provide easily programmed "A" voltage OK delay. The "A" power voltage range detect subsystem 710a determines whether the voltage from "A" power 760 is "OK." That functionality uses a single capacitor value (C5) to determine the delay for accepting the A input voltage for start-up of the micro-ATS 700, and can be easily adjusted for various requirements.

Yet another such feature is that some embodiments of the "A" power voltage range detect subsystem 710 provide an easily programmed thresholds for "A" under-voltage detect, "A" voltage OK, and "A" over-voltage detect. Under voltage assumes that the voltage was at one point acceptable, and that it is now lower than desired. As illustrated, a single resistor value (R35) controls the difference between the acceptable value and the low voltage shut down point. Similarly, the "A" voltage OK threshold can be programmed via a single resistor value change (R16), and the "A" over-voltage threshold can be programmed via a single resistor value change (R14).

FIG. 10 shows a circuit diagram of an illustrative "A" power loss detect subsystem 715a for use in some embodiments of a micro-ATS 700. Embodiments of the "A" power loss detect subsystem 715 handle fundamental operation of the primary power ("A" power 760) detect and delay portions of the micro-ATS 700.

The simplified overview of the "A" side power sense and delay circuit is shown. A description of the fundamentals of a Silicone Controlled Rectifier is also included to help understand the principals of the power detect and hold function.

The primary function of this circuit in the uATS is to detect the presence of AC power on the "A" side, and hold connection to that power source in the relay section later described. This circuit also has the delay control that prevents returning to a power after a transfer for about 5 seconds. This prevents unnecessary transfers if the "A" side power source is intermittent. In addition, this circuit also rejects many conditions, such as outages shorter than 4 ms, momentary sags, etc., of power that would otherwise cause false transfers.

The core functionality is achieved by rectifying the AC power via a current limiting 0.22 uf capacitor. The rectified power is mildly filtered in C6, but the primary function of C6 is to control the amount of hold-over current present during AC outages at the zero crossing of the AC line. Otherwise, the uATS would disconnect from the "A" side at every AC crossing, 120 times a second.

This capacitor is also largely responsible for determining the time for a minimum outage before releasing the latch that controls the "A" side connection, and transferring to the Alternate Power Source, ("B" side).

The transistor pair of Q17 (PNP) and Q18 (NPN) act as a SCR connected pair. Observing the description of the SCR, and the pair of Q17 and Q18 (FIG. 5) demonstrates this configuration.

The thyristor is a four-layer, three terminal semiconductor device, with each layer consisting of alternately N-type or P-type material, for example P-N-P-N. The main terminals, labeled anode and cathode, are across the full four layers, and the control terminal, called the gate, is attached to p-type material near to the cathode. (A variant called an SCS—Silicon Controlled Switch—brings all four layers out to terminals.) The operation of a thyristor can be understood in terms of a pair of tightly coupled bipolar junction transistors, arranged to cause the self-latching action:

Referring to FIG. 5, when current is continuously flowing through the Q17, Q18 pair, it will remain latched "on". If current is interrupted, the latching will be lost, and it will not conduct again until re-started. In this circuit, conduction, or "gating" is accomplished via the charging of C8 via R20, and the resulting eventual conduction of current through Zener Diode ZD1. This sub-circuit has a time constant of about 5 seconds and provides the delay function on start-up necessary to prevent rapid transfers if source power is intermittent. A unique feature of using this dual transistor SCR emulation is that access to the collector of Q17 allows the secondary function of the "SCR" pair by allowing supplemental current to be presented to the base of Q15. Upon successful latching of the "SCR" pair, the timing capacitor C8 is reset nearly to zero voltage by the conduction of Q15. This prepares the timing circuit for the next off-to-on cycle. Another feature of this circuit is that access to the base of Q17 allows insertion of a transient suppression filter and programmed current release point determined by resistors R13, R26 and C7. This is necessary because the release point of the "SCR" pair must be below the on threshold of the optical isolator and subsequent amplifier circuit. In other words, it is important that the release point be determined by the "SCR" un-latching rather than the gain of the optical coupler and amplifier.

Additional components include R19, which depletes C6 at a known rate, R21 which guarantees full discharge of C8 on initial startup, and LED 5 (Green), an indicator for the user interface to show that A power is on and is selected for the source of delivery to the output of the uATS.

Another unique feature of this design is it's extremely low power consumption. Since this circuit must operate at all times when the primary power ("A" side) is being delivered to the load, minimization of power consumption was of high importance. No external power supplies are required, and power through LED 5, and the Optical Isolator LED, is determined primarily by the current limiter 0.22 uf capacitor (C3), and the 56 K pass resistor R2. Other values of Resistance and capacitance could be selected to further reduce normal function power consumption, but these values are selected for maximum noise immunity and lowest power consumption in this application.

FIG. 5 demonstrates the initial electrical activity very shortly after application of power to the circuit.

AC power (Teal) is applied to the bridge, converted to rectified DC and charges C6 and C8. C8 charges slowly towards the conduction threshold of ZD1. No action happens in any other parts of the circuit. This is the initial delay part of the start up cycle of the "A" side. If the uATS were returning power from the "B" side to the "A" side after a previous failure of the "A" side, this delay would provide about 5 seconds to make sure the "A" side was stable.

FIG. 6 represents the condition just at the conduction threshold of ZD1. At this point the base of Q18 now has voltage being applied to it relative to the emitter.

Q18 is not yet conducting, as about 0.6 V must be present prior to beginning of conduction, but the latch is about to set.

At this point, C8 is charged to about 13 V, D19 is conducting and ZD1 is conducting. As C8 continues to charge, eventually base current starts to flow in Q18, initiating an "avalanche" condition in the "SCR" pair, Q18 and Q17.

FIG. 7 shows the condition of current flow a few microseconds after the base current starts to flow, and current starts to flow through LED5, the optical coupler LED, R13 and the base of Q17.

Current flows in the base of Q17, thus causing it to conduct and add current to the base of Q18, further turning it on, adding current to the base of Q17, so on and so on until the pair is "latched" on. This set of events occurs very rapidly, and the LED of the optical isolator is turned on very rapidly. Simultaneously, the base of Q15 has voltage applied to it, and the subsequent current causes Q15 to conduct, discharging C8. The discharge rate of C8 is limited by the base current limiter resistor R24.

FIG. 8 shows this state of this circuit during the discharge cycle of C8, and just before the final state of the circuit prior to normal functional operation of the uATS which is the state of delivering "A" Side power to the output.

At this stage, C8 has been discharged below the conduction threshold of ZD1, and hence Q18 is getting its base current solely from the collector of Q17 via the system current limiting resistor R25.

FIG. 9 shows the normal operating state of the uATS while on the "A" Side power source, the primary power source. The vast majority of the uATS operating time should be in this mode.

FIG. 10 shows the u ATS shortly after the loss of "A" Side Power. The circuit continues to operate for a short period by extracting the remaining charge from C6.

As the available power in C6 is depleted, the resistive divider of R26 and R13 reaches a point where Q17 begins to not be forward conducting through its base, thus reducing the current in it's collector.

This is the start of the rapid cascade to release of the "SCR" pair, Q17 and Q18. FIG. 11 illustrates this transient condition.

FIG. 12 shows the condition after the "SCR" pair, Q17 and Q18 have released, and are no longer conducting, and hence the LED 5 and the optical isolator diode are also no longer conducting. At this point the events controlled by the timing and synchronization circuits are initiating the transfer to the "B" side of the relays in the A/B relay switching circuit.

The final electrical activity is the removal of residual current from the base of Q18. Also, residual charge in C6 and C8 is depleted via resistors R19 and R21, respectively. Hence, the circuit is ready for the return of "A" power when it occurs.

FIG. 11 shows a circuit diagram of an illustrative "B" power synchronization detection subsystem 720a for use in some embodiments of a micro-ATS 700. "B" power 765 is received as BH and BN, and is full-wave rectified by bridge BR5. The current is limited by R57. The output of the bridge BR5 drives the diode in opto-transistor U1. As illustrated, the transistor on U1 will turn off when the output of the bridge BR5 is less than a preset threshold (illustrated as approximately 6 volts, though other values can be set if desired). This derives the zero-voltage crossing of "B" power 765, which can then be used for zero-voltage synchronization.

Embodiments of the "B" power synchronization detection subsystem 720, such as the embodiments illustrated and described with reference to FIG. 11, provide a number of innovative features. One such feature is that some embodiments of the "B" power synchronization detection subsystem 720 provide loss detection as a direct function of power availability. As illustrated, the "B" power synchronization detection subsystem 720 is powered by the source it is detecting. If the power fails, the circuit ceases to detect that source and it fails to provide the optically isolated control to the timing control subsystem 730 via the "B" power synchronization detection subsystem 720. This provides a fail-safe design, in that if "A" power 760 fails, the remainder of the micro-ATS 700 circuits default to transferring to "B" power 765.

Another such feature is that some embodiments of the "B" power synchronization detection subsystem 720 provide noise and false triggering immunity. As illustrated, the circuit has a power envelope detect methodology. C6 is continuously charged by the incoming power and continuously discharged by the A Loss Detect circuits and by the LED in the optical isolator U2. Thus, for a valid power loss to be detected, the capacitor C6 must discharge its energy to allow the transfer. One result is that it stores the energy during each half-cycle allowing easily programmed delay timing between the time that power fails and the time that initiation of transfer actually occurs. Another result is that unwanted glitches are filtered where they would otherwise cause false transfers. Yet another result is that under-frequency detection is provided without additional components. If the input frequency of the "A" power 760 side falls below the total envelope charge for a given time, the capacitor C6 will fail to store enough charge from cycle to cycle, and the latch (formed by Q17 and Q18) will release and allow transfer of the load to the "B" power 765 side.

FIG. 12 shows a circuit diagram 1200 of an illustrative "A"/"B" synchronization integrator subsystem 725a in context of the "B" power synchronization detection subsystem 720 and the "A" power loss detect subsystem 715 for use in some embodiments of a micro-ATS 700. Embodiments of the "A"/"B" synchronization integrator subsystem 725a provide synchronization of "B" to "A" transfers at zero voltage crossing times and the "A" to "B" integration function. For the sake of clarity, functionality will be described during start-up, during a transfer from "B" power 765 to "A" power 760, and during a transfer from "A" power 760 to "B" power 765.

Turning first to functionality during start-up, "A" power 760 is turned on. Accordingly, "A" power 760 will be present at the output because "A" power 760 uses the NC (Not Connected) contacts of the relays. After some delay (illustrated as approximately 4 seconds), the "A" power loss detect subsystem 715 will light its indicator LED (LED 5) and provide current for the diode in U2. The transistor in U2 will turn on and provide a current path for R15 and R11 to turn on Q33. Q33 will then provide a current path through R28 and D23 to charge the integrator capacitor C9. Q33 will also turn Q19 on and will be helped by the cathode of D16 going positive, providing positive bias through D14 and R62. When Q19 turns on, Q20 will turn off disabling the "B" power synchronization detection subsystem 720. Thus, the opto-transistor in U1 will have no influence on the charge of the integrator. Current continues to flow from the collector of Q33 to C9 via R28 and D23 charging C9. This is the initial charge integration signal to be sent to the timing control subsystem 730 for threshold detection there. As the charge builds, it eventually reaches a point where the comparators (U3a and U3b) detect the crossovers. This is the basis of establishing the timing spaces between the events of the relays switching. The inter relay transfer timing of transfer from B to A is essentially controlled by R28.

Turning to functionality during transfer from "B" power 765 to "A" power 760, much of the functionality is essentially the same as that described above with reference to the start-up functionality. Approximately 4 seconds after "A" power 760 returns, the indicator LED (LED 5) will light (i.e., this is similar to when "A" power 760 is initially started up, as described above). Current will go to U2 and turn U2 on. Q33 will turn on, starting to charge U9. At this point, Q20 and U1 are turned on, and Q19 is turned off and cannot turn on until the next zero crossing of "B" power 765 when U1 turns off. This allows the anode of D22 to go high, turning Q19 on, turning Q20 off, and slowing the integrator to charge through R28. This causes the micro-ATS 700 to switch to "A" power 760.

Turning to functionality during transfer from "A" power 760 to "B" power 765, if "A" power 760 should fail, U2 will turn off, causing Q33 to turn off. This will turn Q19 off and Q20 on. Since the opto-transistor in U1 is almost always conducting, Q20 and the opto-transistor in U1 will short the integrator through D24 and R70 at any time except exactly at the next zero crossing of the "B" power 765 side. As C9 rapidly discharges, the integrator output to the timing control subsystem 730 will cross over the thresholds of the comparator U3a and U3b. The first event will be to set RY On via U3a. Since U3b is presently biased to provide the shunt at the junction of Relays RY2 and RY3, high inrush current will flow in RY2, causing it to disconnect the "A" power 760 from the load. As the integrator voltage continues to fall, the second comparator threshold is passed, and U3b releases GC On. This de-energizes the gatekeeper relay (RY3) and the Neutral Relay (RY1) shunt. Then, very shortly thereafter the Gatekeeper relay (RY3) and the Neutral Relay (RY1) will connect the load to the "B" power 765 AC source. Only then does current start to flow to the load from the "B" power 765 AC power source.

Embodiments of the "A"/"B" synchronization integrator subsystem 725, such as the embodiments illustrated and described with reference to FIG. 12, provide a number of innovative features. One such feature is that some embodiments of the "A"/"B" synchronization integrator subsystem 725 provide very high efficiency, for example, because of their use of high impedance components to reduce size and minimize power consumption. Another such feature is that some embodiments of the "A"/"B" synchronization integrator subsystem 725 act as a multi-function circuit to minimize component count. As illustrated, embodiments combine the functions of synchronizing the return from "B" power 765 to "A" power 760, and the timing control for the gap between disconnecting the "A" power 760 before connecting the "B" power 765 to the outputs. By combining these functions, parts count can be minimized and the overall size of the finished product can be reduced. Yet another such feature is that some embodiments of the "A"/"B" synchronization integrator subsystem 725 provide power off delay timing during transfer from "B" power 765 to "A" power 760. The transition time power off delay is accomplished via an easily programmed capacitor value (C9). C9 is the integration storage capacitor that supplies threshold ramp signal to U1, the timing comparator. Adjustment of C9 changes the delay between the A disconnect relay (RY2), and changing state of the Gatekeeper (RY3) and Neutral (RY1) relays.

FIG. 13 shows a circuit diagram of an illustrative timing control subsystem 730a for use in some embodiments of a micro-ATS 700. Comparators in embodiments of the timing control subsystem 730 control switching functions of the relays and activation of the warning indicators and buzzer. The ladder formed by R45, R46, and R47 defines voltages V1 and V2. Integrator (C9) is the output of the "A"/"B" synchronization integrator subsystem 725, and is high when the micro-ATS 700 is using "A" power 760 and low when the micro-ATS 700 is using "B" power 765. The slope of the transition from "A" power 760 to "B" power 765 and from "B" power 765 to "A" power 760 is controlled by C9 and R70, and by C9 and R28, respectively. C9, R70, and R28 are discussed as part of the "A"/"B" synchronization integrator subsystem 725.

Pin 2 of the comparator U3a is the Relay On (Low) signal and drives the emitter of Q29. Pin 2 will subsequently apply HV power to the A relay RY2 (RY On). Pin 1 of the comparator U3b is the GC Shunt Drive (Low) and drives the emitter of Q14. Pin 1 will subsequently ground the other side of the A relay (RY2) when asserted. This applies the full HV power (150 Volts) across the A relay (RY2), which can assures fast operation of the A relay (RY2). Times T1 and T2 are controlled by V1 and V2, and by the rising and falling slope of the Integrator (C9).

Embodiments of the timing control subsystem 730 participate in "A" power 760 to "B" power 765 transitions according to the following technique. When "A" power 760 fails, the Integrator (C9) will start to ramp down to V1. HV power will then be applied to RY2. Ground is already on the other side of the RY2 coil. RY2 will then disconnect from the "A" power 760 side. When the Integrator (C9) drops further to A2 (the end of time T1), the signal GC Shunt Drive will go high releasing the ground from RY2 and allowing current to flow through RY2 to RY1 and RY3. This connects "B" power 765 and Neutral Out to the output power 770 node. Time T1 assures that "A" power 760 is released before "B" power 765 is connected.

Embodiments of the timing control subsystem 730 participate in "B" power 765 to "A" power 760 transitions according to the following technique. At the beginning of T2, RY2 is grounded, removing power from the RY1 and RY3 relays. This connects the Neutral Out (NO) to "A" Side Neutral (AN) and Hot Out (HO) to the RY2 relay, which is open at this point. At the end of T2, HV power is removed from the RY2 relay, thus connecting "A" Side Power to the Hot Out (HO). HV and "Common 2" are the outputs of the HV power supply. During normal operation, Common and Common 2 are connected together by the Darlington transistor Q22.

Embodiments of the timing control subsystem 730 participate in over-current control according to the following technique. When the output current approaches a pre-defined warning point (e.g., between 12 and 13 Amps), an indicator is illuminated to warn the user that this is the maximum advisable limit for continuous current. At this point V3 and V4 are defined by the ladder resistors R34 and R36 and diode D7 as discussed above. Output current is detected in the output current detect subsystem 740, and an analog voltage is generated there and sent to the timing control subsystem 730. The slope of the "Load Current Sensed Signal" (LCSS) is a function of applied current to the attached load and time. V4 is set to be equivalent to approximately a 12-Amp load on the output of the micro-ATS 700 (or another desired value). When the LCSS exceeds V4, pin 13 of comparator U3d will go low. This will cause a loss of conduction through ZD7 guaranteeing that Q22 will turn off when U3d pin 13 goes low, which, in turn, will energize the indicator LED (LED4). R37 and D13 will cause V4 to drop slightly increasing the separation between V4 and the LCSS. C25 also serves to smooth out the difference between V4 and the LCSS.

If the LCSS then drops below V4, LED4 will turn off. If, however, the LCSS continues to increase to V3, pin 14 of U3c will go low. This can cause three events to occur. One event occurs because D26 and D27 are connected to U3a pin 2 and U3b pin 1. When U3c pin 14 goes low, pins 2 and 1 are also pulled low. This activates RY2, disconnecting the power from the output via D26, and locks out the shunt drive from activating via D27. Another event is that the piezoelectric device driver subsystem 750 will be turned on via the negative supply path. Another event is that Q23 will be turned on by R41. Q23 will pull the LCSS to 15 volts, latching the fault signal low. Q23 is discussed further with reference to the piezoelectric device driver subsystem 750.

According to some embodiments, when the micro-ATS 700 output current exceeds the pre-defined limits (e.g., substantially like a 14.5-Amp fast-blow fuse), an indicator is illuminated that indicates the micro-ATS 700 disconnected the load from the source, and a buzzer sounds to warn the user that the micro-ATS 700 has disconnected the load. This provides "virtual circuit breaker" (VCB) function of the micro-ATS 700.

At this point V3 and V4 are defined by the ladder resistors R34 and R36 and diode D7, as discussed above. If an over-current condition occurs, the LCSS will be detected by the timing and control comparators U3C and U3D. If it represents a current of greater than 15 A for 10 seconds, the "Fault (Low)" signal will be generated, latching Q23 and charging C12. This will protect fuses F1 and F2. If the overload is removed and switch SW1 is pressed, the charge on C12 will be transferred to C13. Q23 will be turned off and power will be restored to the output. If, however, the overload has not been removed, then C15 is still charged, so that "Fault Low" will be regenerated, and Q23 will be turned back on. Repeated pressing of the reset switch (SW1) will charge up C13 from C12 and nothing will happen. This prevents an already hot F1 or F2 from getting repeated hits when SW1 is pressed. Thus the virtual fuse protects the internal real fuse.

Embodiments of the timing control subsystem 730, such as the embodiments illustrated and described with reference to FIG. 13, provide a number of innovative features. One such feature is that some embodiments of the timing control subsystem 730 provide very high efficiency. Embodiments use very low-power components and high-impedance circuits to minimize power consumption. Another such feature is that some embodiments of the timing control subsystem 730 provide high voltage control. The connection of the low-voltage, low-power control section to the high-voltage relay-power control section is accomplished via an innovative coupling using a variation of the grounded base configuration, where the bases of Q14 and Q29 are referenced to the +15-Volt power supply. The emitters of those transistors are connected to the open collector outputs of U3. Since these outputs are only current sink to the common supply and that they also cannot be exposed to voltages greater than the plus supply, these voltage amplifier transistors (Q14 and Q29) provide that voltage amplification with as few components as is possible.

Yet another such feature is that some embodiments of the timing control subsystem 730 provide power savings in LED illumination of the indicator LEDs (LED 4 and LED 1). The improvement in efficiency is not so much the savings of power when the LEDs are illuminated, as this is the time when there is either a fault or a undesired condition, and is not the predominant operating condition of the micro-ATS 700. However, the fact that the innovative way of powering these LEDs eliminates the need for an additional power supply, and the attendant losses associated with such an addition, is an improvement in efficiency. Both of these LEDs are powered by current through the rest of the circuitry that is utilized, regardless of the conditions of the LEDs otherwise. The current is being passed through LED 4 from the current utilized to operate the timing control subsystem 730. When not needed (not illuminated) LED 4 is turned off by the shorting transistor Q22. The only condition when a fault is necessarily indicated (e.g, by LED 1) is when the A relay (RY2) is active, and the Gatekeeper and Neutral relays (RY3, RY1) are shunted into the off condition, thus disconnecting power from the source to the output. In this continuous condition, the current necessary to power the A relay (RY2) is passed through LED 1. This current path is already necessary to power the relay, thus it can be used to power the LED with no additional power supply circuitry. This design feature reduces power consumption, and simplifies the total design.

FIG. 14 shows a circuit diagram of an illustrative "A" & "B" power switching subsystem 735 for use in some embodiments of a micro-ATS 700. The "A" & "B" power switching subsystem 735 controls when the selected power source to the micro-ATS 700 is switched, either from "A" power 760 to "B" power 765 or "B" power 765 to "A" power 760. Embodiments also control over-current condition switching and relay sequencing, using RY1, RY2, and RY3 to control the flow of power from the "A" power 760 and "B" power 765 inputs to the output power 770 node. Both "A" power 760 and "B" power 765 can be protected by fuses F1 and F2, respectively.

One condition of the "A" & "B" power switching subsystem 735 that is worth discussing is during an inter-transfer time (e.g., which may be substantially similar or identical to the condition of the "A" & "B" power switching subsystem 735 under a fault condition). When GC On 825 goes low (U3 pin 1) as discussed with reference to the timing control subsystem 730, R52 will provide the bias to turn Q14 on. Current in the collector of Q14 will bias the base of Q16 and in turn will turn Q16 on via R55. This is the voltage amplifier from the 15-Volt limited output of U3 to the 150-Volt offset to Q16 and Q4. The current in the emitter of Q16 is passed through the base of Q4 and to the coils of RY2 and RY3, thereby grounding them (as discussed more fully above). At this point, only the A relay (RY2) is energized. The function of Q4 will be discussed below with reference to the disconnect switch subsystem 745. According to the illustrated embodiment, transfers from "A" power 760 to "B" power 765 and from "B" power 765 to "A" power 760 may take around 2 milliseconds.

It is also the state of the micro-ATS 700 during a fault condition (e.g., an over-current detected condition). It is worth noting that there is no AC Hot path from either "A" power 760 or "B" power 765 to the output power 770 node in this condition.

Another condition of the "A" & "B" power switching subsystem 735 that is worth discussing is when power is transferred to the "B" power 765 source. When "Relay Power (Low)" goes low (U3 pin 2) as discussed with reference to the timing control subsystem 730, R66 will provide the bias to turn Q29 on. This is the voltage amplifier from the 15-Volt limited output of U3 to the 150-Volt offset to Q30. The current in the collector of Q29 will turn Q30 on via R67. This will provide 150-Volt "HV" power to the 48-Volt coils of the series-wired relay string (RY1, RY2, and RY3).

FIG. 15 shows a circuit diagram of an illustrative disconnect switch subsystem 745a for use in some embodiments of a micro-ATS 700. This switch is used to disconnect the alternate power source (via node A2 775) from the power supply subsystem 705 when not required. According to some embodiments, application of the alternate power source occurs only in one condition. When the micro-ATS 700 has a fault condition present (e.g., over-current), the relays of the "A" & "B" power switching subsystem 735 are configured with the A relay (RY2) in the disconnect (i.e., energized) position, and the Gatekeeper relay (RY3) and the Neutral relay (RY1) in the disabled (i.e., non-energized) position. Thus no output voltage is available at the H or N nodes, and the micro-ATS 700 would not have power input to the power supply subsystem 705. In this case, the normally open contact of the A Relay (RY2) has power present on it, which is directed to the power supply subsystem 705 via A2 775 to maintain power to the power supply subsystem 705 in this condition.

During all other states of the micro-ATS 700, it may not be desirable to have this connection. Differences in voltages between the A2 775 signal when the A relay (RY2) is energized and the "B" power 765 for the power supply subsystem 705 will cause transitory currents to be distributed unevenly between the AC hot power sources and their respective neutral return paths. This can result in possible interruption of a source power circuit served by a Ground Fault Circuit Interrupter (GFCI) receptacle or a circuit breaker. To prevent this condition, the disconnect switch subsystem 745 only allows alternate power via the A2 775 node to activate when a fault condition is present.

According to the illustrated embodiment, during a fault condition, the base of Q4 is pulled negatively by the output of the timing control subsystem 730 and the voltage amplifier via the signal GC On 825. Current through the base of Q4 to the emitter thus clamps off current through the Gatekeeper relay (RY3) and the Neutral relay (RY1). At the same time, RY Power On 820 is active to energize the via the emitter and base of Q4 to GC On 825, which is pulled to round. In this state, the A relay (RY2) is on (i.e., energized), and the Gatekeeper relay (RY3) and the Neutral relay (RY1) are held off. It is worth noting that, in this condition, there is no source of power available to the output power 770 node. This is the state of the relays during a "fault" condition (e.g., an over-current state).

In the event of a fault condition, in the timing control subsystem 730 (described above), the indicator LED (LED 4) is on, and Q22 is not on. In addition, the indicator LED (LED 1) is turned on by the current into the base of Q4. The sum total of the voltage from the cathode of the indicator LED (LED 4) to the HV Common 815 exceeds the threshold of ZD11. The current through ZD11 (green) thus illuminates the LED in U5, providing current to the base of Q3. Q3 then conducts and "shorts" out both conduction paths through BR6 allowing AC power to pass from C16 to A2 775. A2 775 then supplies the power supply subsystem 705 with AC source power only during a fault condition. C16 limits the total AC current to the power supply since, during this one condition, the A relay (RY2) is the only relay that is energized.

Embodiments of the disconnect switch subsystem 745, such as the embodiments illustrated and described with reference to FIG. 15, provide a number of innovative features. One such feature is that some embodiments of the disconnect switch subsystem 745 provide very high efficiency. As illustrated, the use of three relays in series, rated at 48 volts each, can allow the application of directly rectified AC mains voltage to the relays. This eliminates additional power conversion circuitry, thus reducing parts counts as well as increasing efficiency. Another such feature is that some embodiments of the disconnect switch subsystem 745 use current limiting capacitor (C16) when only the A relay (RY2) is activated continuously, which allows use of the otherwise unused "normally open" contact of that relay, and further reduces parts count.

Yet another such feature is that some embodiments of the disconnect switch subsystem 745 provide relay sequencing when all three relays release simultaneously to prevent arching. As illustrated, the coupling of the fly-back suppression diode D48 on RY2 to the return path rather than directly across the relay provides a slight contact timing delay between the A relay (RY2) losing power and the Gatekeeper relay (RY3) and Neutral relay (RY1). This is accomplished by the anode of D48 being connected to the common rail instead of the more traditional connection to the relay coil. In this configuration, the A relay (RY2) has a higher impedance for the fly-back current to sink into, as the sinking current is also going through RY1 and RY3. The higher impedance results in the relay armature being able to move less quickly then the armatures of the other two relays. The result is that when the power is disconnected from the relay chain, RY2 will always connect the "A" power 760 slightly in delay to the disconnection timing of the gatekeeper (RY3) from the "B" power 765. This helps insure that "A" power 760 never becomes connected to "B" power 765 simultaneously while relay contacts are still together. Even if there is sufficient current to force a small arc, the relay contacts have disconnected prior to the arc starting, thus preventing the contacts from "welding" themselves in place and causing the "A" power 760 and "B" power 765 to flow uncontrollably. The result of this, in a polyphase application of "A" power 760 and "B" power 765 would result in a blown fuse.

FIG. 16 shows a circuit diagram of an illustrative output current detect subsystem 740a for use in some embodiments of a micro-ATS 700. Embodiments of the output current detect subsystem 740a detect and measure the presence and various characteristics of the output current from the automatic transfer switch. This also circuit tends to mimic characteristics of a fuse, but only slightly below the thresholds of 15-Amp Fast Blow physical fuses that may be used in the "A" power 760 and "B" power 765 inputs to the micro-ATS 700. This allows the micro-ATS 700 to protect itself without blowing actual physical fuses, which must be replaced.

As illustrated, the neutral out of the micro-ATS 700 has a current sense transformer on it. This transformer has a diode bridge, formed by D28, D29, D30, and D31, which full-wave rectifies the "Load Current Sensed Signal" (LCSS, described above with reference to the timing control subsystem 730). C22 and R48 filter out the higher frequencies of the AC current and provide proper impedance loading of the current transformer. R11 and Thermistor RT1 provide thermal compensation so the micro-ATS 700 can remain accurate over a wide range of temperatures. C14, R50, D32, D3, C15, R51, and R75 can be configured and selected to effectively emulate the time VS current opening threshold of a 14.5-Amp fast-blow fuse, with the time part of the curve advanced to open about 33% faster than the equivalent 15-Amp fast-blow fuse.

Embodiments of the output current detect subsystem 740, such as the embodiments illustrated and described with reference to FIG. 16, provide a number of innovative features. One such feature is that some embodiments of the output current detect subsystem 740 employ a combination of capacitors and resistors that result in an analog representation of the characteristics of a fast blow fuse. The principal characteristics of the timing of a fuse are as follows: it can carry significant over-current for a short period of time; and, after some time, the fuse will "blow" at or near the rated current of the fuse. This is primarily controlled by the thermal characteristics of the fuse material itself, and how much mass is being heated to the melting point by the applied current. In order to emulate the characteristics of a fuse, a pseudo two-pole filter is formed by these components to emulate the desired characteristics. The circuit reduces the parts count to the minimum by having the two halves of the two poles interact with each other by allowing current from the first pole to charge the second pole without the reverse. The second pole is discharged by a controlled discharge path through R32. This single point of discharge can thus be used to bias both poles of the filter and alter the overall curve of the response time of this circuit without significantly changing the shape of the curve. This is useful for adjusting the "rating of the fuse" by a simple one component change, specifically R32. By changing the value of R32, the programmed threshold of maximum current rating of the electronic, or virtual, fuse (circuit breaker) can be adjusted simply and with minimum effect on the inrush current handling characteristics of the circuit.

Another such feature is that some embodiments of the output current detect subsystem 740 provide temperature stability. Numerous variables are introduced into the design of the virtual circuit breaker design (e.g., as discussed with reference to the output current detect subsystem 740 and to the timing control subsystem 730 above) that affect temperature related stability. Compensation of all of the thermal variables as well as emulating the thermal effects in a real fuse is accomplished by RT1 and R11. RT1 is a thermister that has a negative temperature coefficient. As temperature goes up, the resistance goes down, in a predictable fashion. By placing these two components in series across the current sense transformer, the load impedance presented to that transformer is affected by temperature. The selection of values for the Thermistor RT1 and R11 result in the overall performance of the virtual circuit breaker effectively mimicking its electro-mechanical equivalent.

FIG. 17 shows a circuit diagram of an illustrative piezo-electric device driver subsystem 750a for use in some embodiments of a micro-ATS 700. Embodiments of the piezoelectric device driver subsystem 750a include an innovative implementation of a power driver for driving a piezoelectric buzzer (or similar device). When "NOT FAULT" goes low, it provides a ground path for the oscillator formed by Q25, Q27, R40, R42, R44, R39, C10, and C11.

When power is applied, either Q25 or Q27 will turn on. If Q25 turns on, the voltage on both sides of C10 will drop, thereby providing a low to the base of Q27 and turning Q27 off. Then C10 will charge up via R44. When the voltage at the base of Q27 reaches approximately 0.6 volts, Q27 will turn on. Both sides of C11 will drop. Q25 will turn off, and so on, back and forth. Q21 and Q26 are emitter followers. As the collector of Q25 charges up when Q25 is off, Q23 emitter will follow its base driving the piezoelectric buzzer. When Q25 turns on it will sink connect from the piezo through D2, and similarly for Q26, D4, and Q27.

Embodiments of the piezoelectric device driver subsystem 750, such as the embodiments illustrated and described with reference to FIG. 17, provide a number of innovative features. One such feature is that the circuit provides high efficiency with a low parts count. As illustrated, high efficiency is achieved by combining the oscillator and amplifier necessary to drive the piezo into a power oscillator, and the combination also tends to minimize parts count. In this configuration, nearly all the current expended in the circuit for both the oscillator function and the power amplifier function is applied to the piezo crystal for conversion to acoustic energy.

The various circuits and other embodiments described above form novel embodiments of micro-ATSs 700 and provide a number of features. One such feature is ultra-low power consumption. Use of a transformer-less power supply reduces overall loss in converting from 120VAC mains voltage to DC voltages required for internal circuits. Another such feature is that virtually no power is consumed on the non-connected side (e.g., on the "B" power 765 side when the load is connected to "A" power 760). Yet another such feature is that the use of optical isolation in the power supply virtually eliminates cross currents between the "A" power 760 and "B" power 765 inputs. Still another such feature is that arc suppression is provided at the disconnection of the "B" power 765 side on the contacts of the affected relays by timing the break of the relay contacts at the zero crossing of the current presented to those contacts.

Additional features are realized by selections of certain circuit components and/or topologies. One such feature is that ultra low power consumption can be achieved by utilizing a capacitor current limit on the AC input. The selected capacitor (0.22 uF) limits 60 Hz to about 10 milliamps into the 48-volt load. At 50 Hz, the limit is 8 milliamps, both within operating range of the connected relays. Another such feature is that use of the same path of current in the "A" power loss detect subsystem 715 for illuminating the "on A" indicator, activating the optical isolator link to the synchronization circuit, and the hold latch, minimizes the normal operating state draw on the "A" power 760 side.

Another such feature is that power delivery from the "A" power 760 side to the Load, the predominant path of power for the majority of use with regards to time, is via the Normally Closed position of the routing relays. This eliminates the current necessary to activate the relays. Another such feature is that conversion of the AC mains voltage directly to DC without the use of a transformer, or power conversion, for the purpose of minimizing power consumption, is made possible by the arrangement of the relays when activated. Three relays are connected in series when activated to transfer the load to the "B" power 765 side. This action allows the use of high voltage (AC Mains Voltage directly rectified to 150 VDC). This design methodology allows the transformer-less power supply to be implemented.

Another such feature comes from use of the Normally Open contact of the A disconnect Relay (RY2) as an AC Mains diversion path for and alternate power source during a fault condition. In this condition, only the A relay is activated. The alternate path described allows a second rectifier and a capacitor current limit on the AC Mains, so the current rating of the coil of the single activated relay (RY2) is within operating range of 8-10 milliamps. Another such feature is that use of total circuit pass current on the low voltage timing control subsystem 730 to energize the indicator LED (LED 4) that indicates approaching the over current condition, and shunting the LED to the off condition when not in use, eliminates the need for an auxiliary power supply for this device. This increases the efficiency of power utilization in the micro-ATS 700, and lowers quiescent dissipation. Another such feature is that using relay pass current to activate the indicator LED (LED 1) when in an overload condition also eliminates need for an auxiliary power supply to power the LED when required. This improves efficiency and reduces normal operating condition power dissipation.

Another such feature arises in the context of "A" power loss detection through an innovative use of an arrangement of semiconductors to perform multiple functions. The arrangement of Q17 and Q18 is similar to a silicone controlled rectifier (SCR). The primary working characteristic of this configuration is that the SCR simile requires very little current to cause to latch into a conduction state. This latched state will continue until passing current through the pair ceases. When it ceases, the latch will disconnect and not allow current to flow until re-initiated. In addition, the otherwise inaccessible second PN junction of the SCR simile is accessible, thus allowing the action at this point to also affect Q15 at a certain point in the sequence to be beneficial. The Q15 is the timer reset for delaying the return to "A" power 760 from an "A" loss state. This must be reset every time the SCR simile goes into conduction. By tapping the SCR simile at the collector of Q17 (the base of the Q18 junction), normally an inaccessible junction in a conventional SCR, the avalanche activation of the SCR simile at that time can be utilized to force the reset of the timing capacitor C8 via Q18.

Another such feature arises in the context of synchronization of the return from "B" power 765 to "A" power 760 at the zero-crossing of the "B" power 765 signal to reduce arching of the B relay contacts. An optically coupled synchronization pulse and level from the "B" power 765 source is used for two functions: to synchronize transfer from the "B" power 765 to the "A" power 760 at the zero-crossing of the "B" power 765; and to provide a source of signal that indicates the loss of the "B" power 765 and thus force the connection to the "A" power 760, regardless of the state of other circuits that normally would influence transfers to the "B" power 765 side. First, the optically coupled sync signal holds off the signal from the optical coupler that indicates that "A" power 760 is ready to be transferred to until the sync pulse appears (via Q19, Q20, and the U1 opto-coupler transistor). After the synch pulse appears at the U1 opto-coupler, the release of the hold on the signal from Q33 allows the circuit to initiate the integrate function for the comparator, U3 to utilize to complete the transfer. Simultaneously, the release of the hold function then latches the sync pulses out so no additional pulses can be present via bias on the base of Q19. In addition, if there is no AC power present on the "B" power 765 side, the output of the sync circuit never presents a low impedance across the collector/emitter of the transistor in U1, and hence there is no current sync path for discharging C9, the integrator capacitor. Thus, R33 always holds the integrator capacitor fully charged, and the input to the comparator presented by C9 will always force selection of the "A" power 760 side, regardless of the state of the "A" power loss detect subsystem 715 output at U2. This unique approach to providing the sync and holding the output on "A" power 760 if "B" power 765 is not present utilizes a minimum number parts, each of which operates in high impedance mode. This reduces power consumption to the minimum, and still is low cost to produce.

Another such feature arises from the unique piezoelectric device driver subsystem 750. This arrangement of Q21, Q26, Q25, and Q27 forms a transistor pair oscillator. Q25 and Q27 form the basis of an astable oscillator with R39, R40, R42, R44, C10, and C11 forming the components that determine oscillation. The innovative addition of D2, D4, Q21, and Q26 turn the oscillator into a power oscillator capable of driving piezo components bilaterally (e.g., one side of the Piezo is at +15, while the other is at Common; then it switches, and the opposite is true). This maximizes the output to the Piezo for a given power supply voltage, at minimum parts count and minimum power dissipation. This same power oscillator can be used for other applications such as driving a miniaturized switching power supply, or for signal source in a small tester. Numerous applications exist for a miniature, low power, very low cost power oscillator.

Embodiments Using Micro-ATSs for Redundant Power Distribution

ATSs can be deployed at various points in the power distribution topology to provide for automatic failover from a primary power source to a backup power source typically at one of three points in the power distribution topology: the panelboard on the wall, where the branch circuits originate; the end of the branch circuit in the rack where the power is fed to plugstrips; or between the plugstrip and the EDP equipment being powered. The choice of where to place auto-switching functionality in a power distribution topology can involve consideration of a number of issues.

One issue to consider when determining where to place auto-switching functionality in a power distribution topology is the potential domain of failure, the number of power receptacles that will be affected if an ATS fails to function properly. Power distribution topologies used in data centers can be considered rooted tree graphs (i.e., mathematically speaking), so that the closer to the root of the tree the ATS is located, the higher the number of power receptacles that will be affected by the actions of that ATS. For example, FIGS. 18A-18D show illustrative power distribution topologies.

Figure 18A:
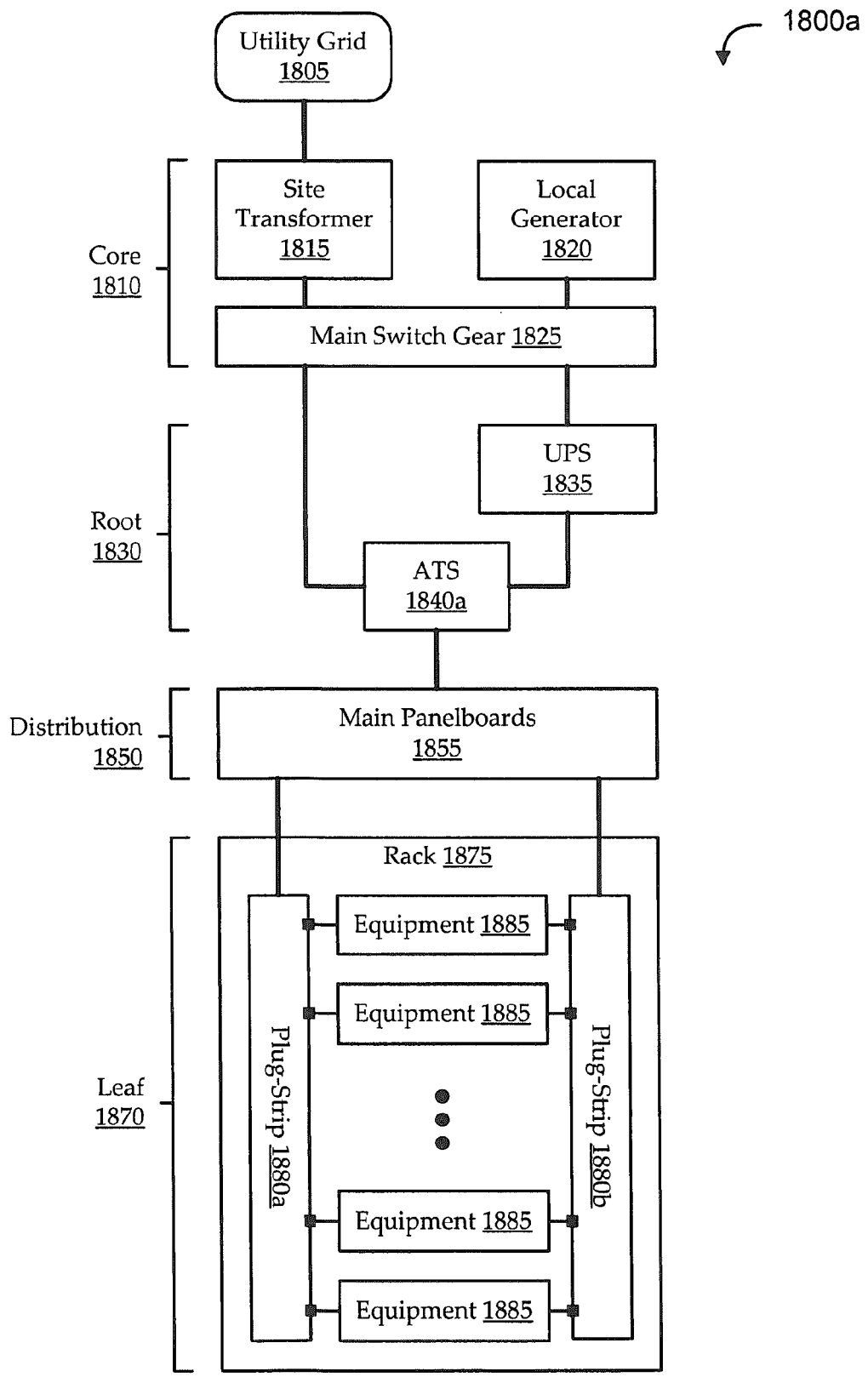
FIG. 18A shows a power distribution topology having an ATS disposed in the root nodes of the topology.

Turning to FIG. 18A, a power distribution topology 1800a is shown having an ATS 1845a disposed in the root nodes 1830 of the topology. For the sake of clarity, the power distribution topology 1800a includes a core infrastructure 1810, root nodes 1830, distribution nodes 1850, and leaf nodes 1870. The root nodes 1830 is considered to be "downstream" of the core infrastructure 1810. Each portion of the power distribution topology 1800a includes power distribution components.

As shown, the utility grid 1805 feeds a site transformer 1815 in the core infrastructure 1810 (e.g., a step down transformer). The core infrastructure 1810 also includes a local generator 1820. The site transformer 1815 and the local generator 1820 act as two independent sources of power for the power distribution topology 1800a. In other embodiments, other independent sources, such as independent utility grids, and/or more than two independent sources may be used. In some implementations, main switch gear 1825 can allow the entire core infrastructure 1810 to be switched to alternate power (e.g., from the site transformer 1815 to the local generator 1820).

Power is provided from the core infrastructure 1810 to the root nodes 1830 of the power distribution topology 1800a. In the illustrative power distribution topology 1800a of FIG. 18A, the root nodes 1830 include one or more uninterruptable power supplies (UPSs) 1835. It should be noted that large data centers often have many generators and UPSs 1835, since there is a limit to the capacity size you can buy, and if you exceed that limit, you have to install multiple UPSs 1835 and run them in parallel. Each UPS 1835 can be considered as a root node 1830 in the power distribution topology 1800a.

Power paths coming from the main switch gear 1825 and the UPS(s) 1835 are routed to an ATS 1845a disposed as a root node 1830. The ATS 1845a is configured to automatically switch between core power coming from the core infrastructure 1810 and power coming from the UPS(s) 1835 (e.g., in case of a full or partial power failure in the core infrastructure 1810. In this way, the ATS 1845a provides reliable, constant power to downstream components.

As illustrated, power is delivered from the root nodes 1830 to the distribution nodes 1850. In particular, the output power from the ATS 1845a is delivered to one or more panelboards 1855. In some implementations, multiple power distribution panelboards 1855 are used, since they come only so large in power capacity and number of circuit breaker stations. Also, it may be more efficient to locate panelboards 1855 so as to minimize the average power whip length, and as many as is practical may be used to accomplish this purpose.

Typically, the distribution nodes 1850 are considered as originating at the main panelboards 1855 and ending at equipment racks 1875 (e.g., leaf nodes 1870). In the illustrative embodiment, power is distributed at the equipment racks 1875 via plugstrips 1880. The plugstrips may also have circuit breakers in them. It is worth noting that some of skill in the art confusingly refer to both panelboards 1855 and plugstrips 1880 as power distribution units (PDUs). Accordingly, for the sake of clarity, the terms panelboards and plugstrips are used herein.

The equipment racks 1875 include EDP equipment 1885. Many types of EDP equipment 1885 are possible, and may be rack-mounted in the equipment racks 1875. Each piece of EDP equipment 1885 can be plugged into one or both plugstrips 1880. For example, EDP equipment 1885 having multiple internal power supplies may be plugged into multiple plugstrips 1880

In the illustrated configuration, the ATS 1845a is deployed as a root node 1830 of the power distribution topology 1800a, upstream of the distribution nodes 1850 and leaf nodes 1870. This upstream placement may provide ATS functionality with only a single (or relatively few) ATSs. Notably, an important factor to consider when determining where to place auto-switching functionality in a power distribution topology is power distribution efficiency—the amount of power that is "lost" by the insertion of ATSs into the power distribution system. No ATS is 100% efficient (i.e., they all have a loss factor). Generally, it is helpful to categorize two types of ATSs as relay-based and solid state-based. Each has different characteristics with regards to power loss and transfer time. In many applications, transfer time between the power sources is important, because the power supplies used in modern EDP equipment can often only tolerate very brief power interruptions. For example, the Computer and Business Equipment Manufacturers Association (CBEMA) guidelines used in power supply design recommend a maximum outage of 20 milliseconds or less.

Mechanical relay-based ATSs use one or more mechanical relays to switch between their input power sources. Generally speaking, relays have two primary loss factors, the contact area of the relay, and any power the relay may require to maintain it in the "ON" state (i.e., in which it is conducting current). The shape and material of the contacts is carefully chosen and engineered to minimize resistance across the contacts, yet minimize or prevent arcing across the contacts when they are switching. Also, since some arcing may occur in some circumstances, the contacts must be designed to minimize the possibility of the arc "welding" the contacts shut, which can be highly undesirable.

Another design issue is transfer time of the relay. The contacts are mounted (e.g., on an armature) so that they can be moved to accomplish their switching function. The contact mass, range of motion, mechanical leverage, and force used to move the armature are all relay design issues. The range of motion is dictated by the gap needed between the contacts to minimize arcing at the maximum design current level. As the maximum design current is increased, the gap also tends to increase. The mass of the contact is accelerated by the force applied to the armature, which has a practical limit.

These factors can impose a limit on the amount of current that can be sent through a pair of contacts and still maintain an acceptable transfer time for EDP equipment. For example, if the mass of the armature and contact gap are too large, the relay transfer time can exceed a threshold time limit (e.g., the CBEMA recommend maximum of approximately 20 milliseconds of power outage for continued operation of modern switched power supplies). Well designed relay-based ATSs typically manifest a loss factor of about 0.5% or less. They also have power supplies to power their internal logic that typically use in the range of 12-20 watts in operation.

In the case of solid state-based ATSs, the switches use solid state semiconductors to accomplish switching between their input power sources and their output load. They can typically switch faster than comparable relay-based switches, because they use semiconductor-based switching rather than mechanical relays. However, the semiconductors also have a loss factor, and the efficiency of this type of switch is often less than that of a relay based switch (e.g., around 1%). Also, they are often less reliable, unless they are built with redundant internal failover capability, which can make them appreciably more expensive. As with their relay-based counterparts, solid state-based ATSs typically have power supplies to power their internal logic that use in the range of 12-20 watts [should this be 20? The provisional says 200, but I think that may be a typo] or more in operation, depending on the size of the transfer switch, and the level of redundancy offered by the switch.

It should be noted that the ATSs that are upstream of the UPS units are considered part of the "core power" infrastructure not the "power distribution" infrastructure. Automatic transfer switching can be done in the core infrastructure 1810 to insure continuity of connection to a valid power source, such as utility power grid feeds or generators. The transfer time of relay-based switches that can handle the power capacities required in the core infrastructure 1810 is typically too slow to avoid shutdown by connected EDP equipment 1885 for the reasons described earlier (e.g., according to the CBEMA guidelines). Accordingly, ATSs of this type tend to be placed upstream of UPS units, where brief power outages that these switches create on transfer can be covered by the UPS units.

Indeed, large state transfer switches can be used in the core infrastructure, as they are fast enough to switch within typical (e.g., CBEMA) guidelines. However, these types of ATSs are very expensive and can represent a single point of failure. Further, they tend to have an unfavorable loss associated with power flowing through the semiconductor devices.

As illustrated, the single ATS 1845*a* will switch every branch circuit in a given panelboard 1855 to a secondary power source when the primary power source fails. For at least the above reasons, this type of upstream placement of the ATS 1845*a* in the power distribution topology 1800*a* can mitigate certain issues (e.g., power loss, transfer time, etc.) that can be exacerbated when many ATSs must be used throughout a power distribution topology 1800*a*. However, in this configuration, failure of the single ATS 1845*a* upstream of the panelboard 1855 can cause many downstream EDP devices to be deprived of power. For example, a typical panelboard has a capacity of 225 KVA, and 84 or 96 circuit breaker stations. This can power approximately up to 40 racks via 28-96 branch circuits (e.g., depending on the type and number of branch circuits and the average number of watts used per rack). Having 40 racks be deprived of power due to a single ATS failure in a data center is a major hit that can have very serious service impacts.

Figure 18B:
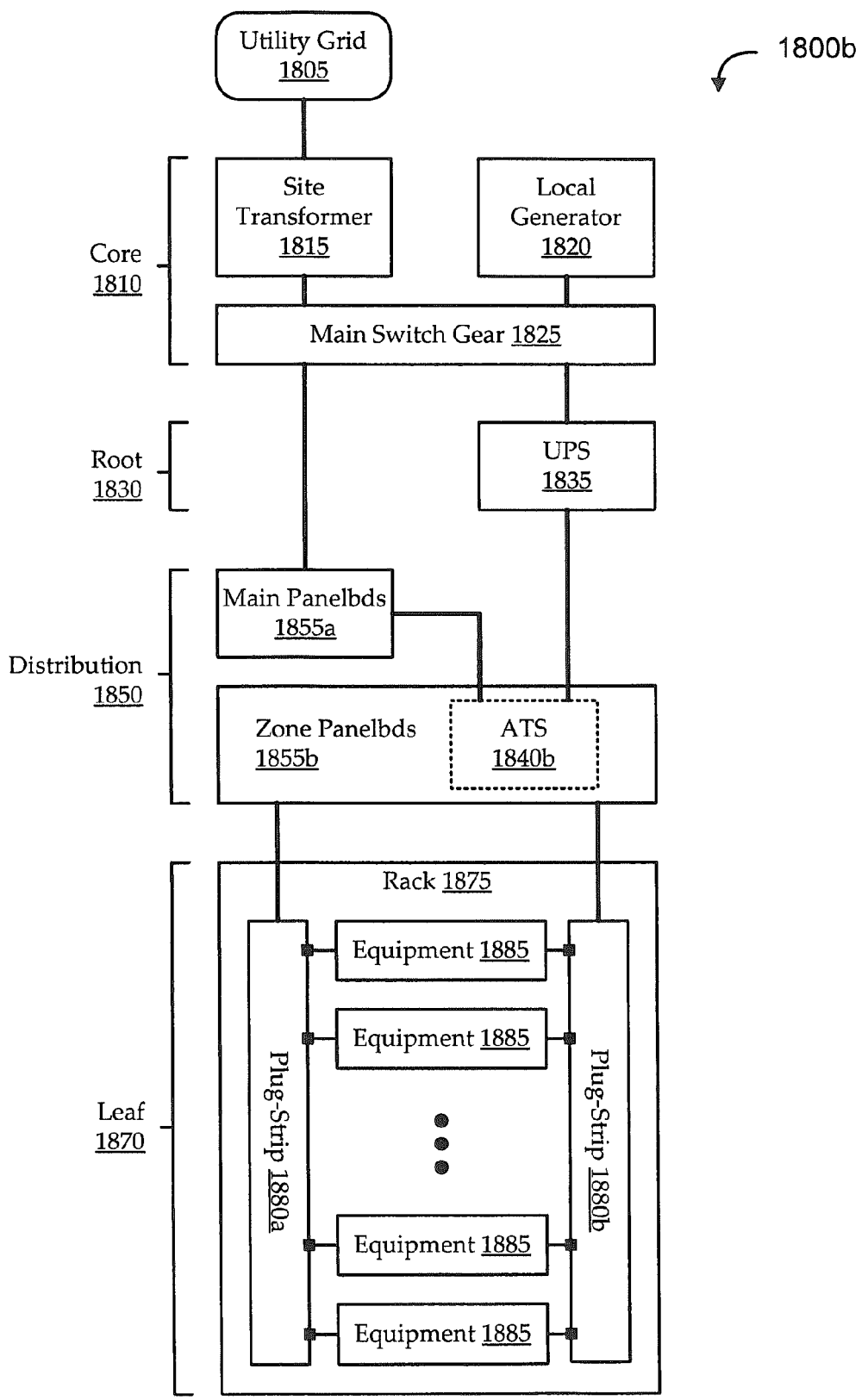
FIG. 18B shows another illustrative a power distribution topology having an ATS disposed further downstream, in the distribution nodes of the topology.

FIG. 18B shows another illustrative a power distribution topology 1800*b* having an ATS 1845*b* disposed further downstream, in the distribution nodes 1850 of the topology. For the sake of clarity, the power distribution topology 1800*b* is illustrated as having the same core infrastructure 1810 and similar root nodes 1830, distribution nodes 1850, and leaf nodes 1870 as those shown in FIG. 18A. Unlike in FIG. 18A, the ATS 1845*b* is implemented in the distribution nodes 1850. Instead of the main switch gear 1825 and the UPS(s) 1835 feeding an ATS in the root nodes 1830 of the topology, the alternate power paths feed distribution nodes 1850.

As illustrated, the distribution nodes 1850 include one or more main panelboards 1855*a* and one or more zone panelboards 1855*b*. Some or all of the zone panelboards 1855*b* include an integrated ATS 1845*b* (or multiple integrated ATSs 1845*b*). The alternate power sources (e.g., from the main switch gear 1825 and the UPS(s) 1835) feed the integrated ATS(s) 1845*b*. The zone panelboards 1855*b* can then supply power to equipment racks 1875 in their respective zones.

In the illustrative power distribution topology 1800*b*, there are still relatively few ATSs, which can still reduce issues associated with ATS inefficiencies, etc. However, placing the ATSs 1845*b* further downstream allows the ATSs 1845*b* to handle power transfer only for a subset of the equipment racks 1875 in a large data center (i.e., a particular zone). Accordingly, failure of an ATS 1845*b* will cause a more limited number of downstream EDP devices to be deprived of power. This can have a less catastrophic impact to the data center than from a similar failure with a farther upstream ATS.

Figure 18C:
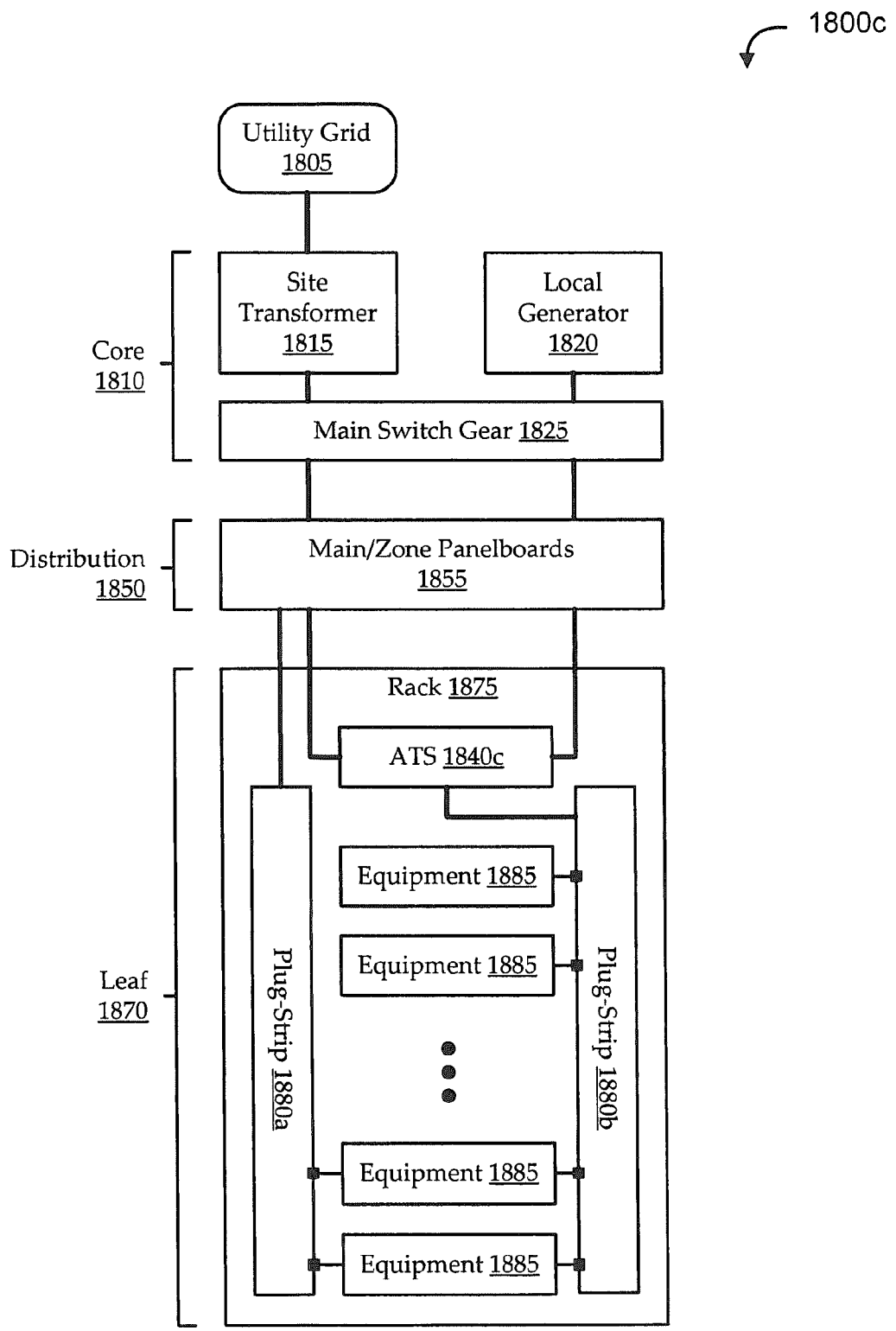
FIG. 18C shows yet another illustrative a power distribution topology having an ATS disposed even further downstream, in the leaf nodes of the topology.

FIG. 18C shows yet another illustrative a power distribution topology 1800*c* having an ATS 1845*c* disposed even further downstream, in the leaf nodes 1870 of the topology. For the sake of clarity, the power distribution topology 1800*c* is illustrated as having the same core infrastructure 1810 and similar root nodes 1830, distribution nodes 1850, and leaf nodes 1870 as those shown in FIGS. 18A and 18B. Unlike in FIG. 7, the ATS 1845*c* is implemented at or near the equipment racks 1875 in the leaf nodes 1870.

As illustrated, the main switch gear 1825 and the UPS(s) 1835 feed distribution nodes 1850 (e.g., main and/or zone panelboards 1855). The distribution nodes 1850 in turn feed the leaf nodes 1870. For example, panelboards 1855 supply power to equipment racks 1875. In the illustrative power distribution topology 1800*c*, an ATS 1845*c* is disposed at or near each equipment rack 1875 or set of equipment racks 1875. In one embodiment, the ATS 1845*c* is configured to fit within a rack space, as discussed more fully below. In other embodiments, the ATSs 1845c are place on top of equipment racks 1875, next to equipment racks 1875, or in any other useful location.

In some implementations, the primary power path is distributed from the panelboard 1855 to a first plugstrip 1880a of the equipment rack 1875. A second plugstrip 1880b of the equipment rack 1875 is feds by the ATS 1845c, which is configured to switch between the primary and secondary power sources, as needed. For example, EDP equipment 1885 having only a single plug can be plugged into the second plugstrip 1880b and powered by the primary power source if of sufficient quality, or otherwise by the secondary power source. In some implementations, other EDP equipment 1885 (e.g., having multiple internal power supplies, two plugs, etc.) is plugged into both plugstrips 1880.

In this configuration, a single ATS failure would only impact those pieces of EDP equipment 1885 relying on the ATS's switching capabilities (i.e., likely to be only one or a small number of racks' worth of EDP equipment 1885). However, it is worth noting that many more ATSs would likely be used than in the configurations illustrated in FIG. 18A or 18B. Further, deployment of the ATSs at the equipment racks 1875 can impact valuable rack space.

Rack space in a data center can be very expensive. The data center infrastructure of generators, UPS units, power distribution, raised floor, computer room cooling, raised floors, etc. is often a very large capital investment and a large ongoing operational expense. One standard rack unit ("1U") of rack space in a standard forty-two-unit ("42U") equipment cabinet is equivalent to 2.5% of the space available in that rack. Thus installing rack-mounted ATSs in large numbers in equipment racks uses a lot of rack space, which represents a loss of space that can be used for EDP equipment and would therefore be very undesirable. Accordingly, ATSs do not tend to be deployed in that configuration.

Figure 18D:
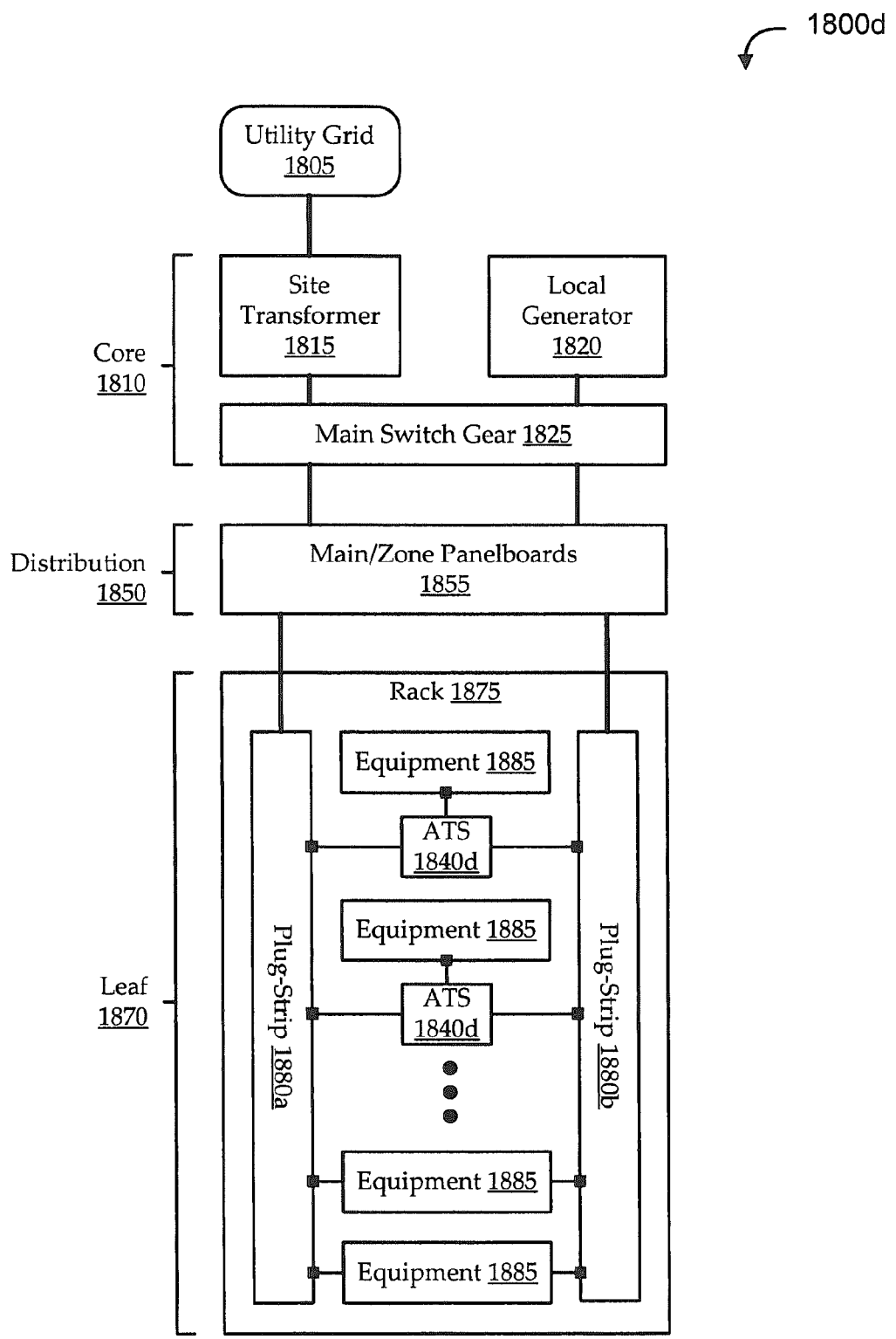
FIG. 18D shows still another illustrative a power distribution topology having ATSs disposed still further downstream at the EDP equipment, in the end leaf nodes of the topology.

FIG. 18D shows still another illustrative a power distribution topology 1800d having ATSs 1840d disposed still further downstream at the EDP equipment 1885, in the end leaf nodes 1870 of the topology. For the sake of clarity, the power distribution topology 1800d is illustrated as having the same core infrastructure 1810 and similar root nodes 1830, distribution nodes 1850, and leaf nodes 1870 as those shown in FIGS. 18A-18C.

As in FIG. 18C, the main switch gear 1825 and the UPS(s) 1835 feed distribution nodes 1850 (e.g., main and/or zone panelboards 1855), which feed the leaf nodes 1870. For example, panelboards 1855 supply power to equipment racks 1875. In the illustrative power distribution topology 1800d, an ATS 1845d is disposed in, at, or near each piece of EDP equipment 1885 (or at least those pieces of EDP equipment 1885 for which the ATS functionality is desired). In one embodiment, the ATS 1845d is configured so that a number of ATSs 1845d can be combined to fit within a rack space and to run in parallel for a number of connected pieces of EDP equipment 1885, as discussed more fully below. For example, the ATSs 1845d may be the micro ATSs 700 described above, and may be deployed in parallel with integrated control logic to construct a large capacity, fast, efficient, and relatively low cost ATS for use in providing redundant power distribution for EDP equipment 1885. In other embodiments, the ATSs 1845d are integrated into power cords, into pieces of EDP equipment 1885, or disposed in any other useful way.

In this configuration, a single ATS failure would only impact the EDP equipment 1885 it serves (i.e., likely to be only one EDP device). However, this configuration could involve deployment of many more ATSs than in any of the other configurations illustrated in FIGS. 18A-18C. Each ATS can add inefficiencies in power distribution (e.g., power loss), space usage (e.g., by taking up valuable rack space), etc.

As discussed above, embodiments include a micro-ATS 700 (e.g., acting as any of ATS 1845b-ATS 1845d) that can be deployed in configurations where size and efficiency are of concern. For example, the Zonit µATS™ is very small (e.g., 4.25-inches×1.6-inches×1-inch, or less than 10 cubic inches) and very efficient (e.g., less than 0.2 volts at maximum load loss). Certain implementations use no rack space, as they are self-mounted on the back of each piece of EDP equipment 1885, incorporated in the structure of the equipment rack 1875 outside the volume of the equipment rack 1875 used to mount EDP equipment 1885, incorporated in rack-mounted plugstrips 1880, or incorporated in an in-rack or near-rack panelboards 1855 (i.e., any of which being possible due to the small form-factor of the micro-ATS). In other implementations, the micro-ATS 700 is small enough to be integrated directly into the EDP equipment 1885 itself.

The small form factor of the micro-ATS 700 can enable usage of 24-inch outside-to-outside width EDP equipment racks 1875. These types of equipment racks 1875 can provide certain advantages. For example, the cabinets fit exactly on two-foot by two-foot raised floor tiles, which makes putting in perforated floor tiles to direct air flows easy, since the racks align on the floor tile grid. Further, the equipment racks 1875 can save precious data center floor space. NEMA equipment racks 1875 are not typically standardized for overall rack width, and the narrower the rack is, the more racks can be fit in a given row length. For example a 24-inch equipment rack 1875 will save three inches over the very common 27-inch width equipment racks 1875, thereby allowing for one extra equipment rack 1875 for each eight equipment racks 1875 in a row (i.e., nine 24-inch equipment racks 1875 can be fit into the floor space of eight 27-inch equipment racks 1875). Narrower equipment racks 1875 are becoming more practical with modern EDP equipment 1885, for example, since almost all models now utilize front to back airflow cooling (i.e., as opposed to side-to-side cooling, which used to be common, but has now almost completely disappeared). Notably, however, a 24-inch equipment rack 1875 has appreciably less space on the sides for ancillary equipment like vertical plugstrips 1880, ATSs, etc., such that those components must have as small a form-factor as is practical to fit into the equipment racks 1875.

The micro-ATS 700 allows efficient, cost-effective and rack space saving per device or near per device (ratios of one micro-ATS 700 per one piece of (or a low integer number of) EDP equipment 1885) and allows highly parallel and highly efficient auto-switched power distribution methods to be utilized. It should be pointed out that the ratio of micro-ATS 700 units to EDP equipment 1885 can be selected to optimize several interrelated design constraints, reliability, cost and ease of moving the EDP equipment 1885 in the data center. The one-to-one ratio maximizes per-device power reliability and ease of moving the device while keeping it powered up. For example, this can be performed using a device-level ATS, like the micro-ATS 700, by doing a "hot walk," in which the device is moved by first unplugging one ATS power cord, moving the plug to a new location, unplugging the second ATS power cord, etc. Long extension cords make "hot walks" easier. Ethernet cables can be unplugged and reinserted without taking a modern operating system down and TCP/IP connections will recover when this is done. In some implementations, cost can be reduced by using ratios other than one-to-one for micro-ATS 700 units to pieces of EDP equipment 1885. A limiting factor can be micro-ATS 700 power capacity and what raised level of risk the data center manager is willing to take, since the more devices connected to any ATS the greater the impact if it fails to function properly.

Figure 19:
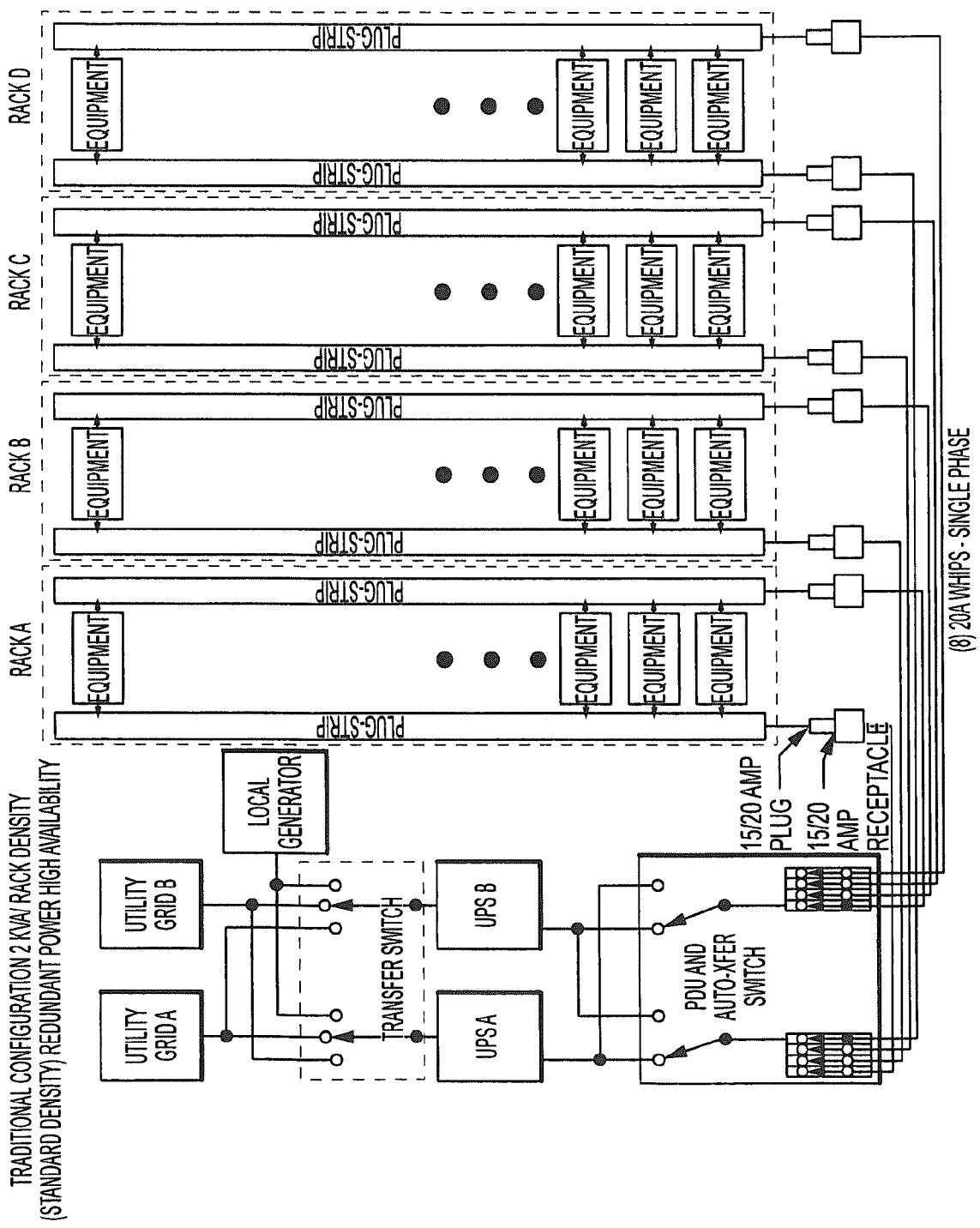
FIG. 19 shows an illustrative traditional power distribution topology, according to some prior art embodiments.

Turning to FIG. 19, an illustrative traditional power distribution topology is shown, according to some prior art embodiments. As illustrated, the topology includes a "double conversion" technique using UPS units (e.g., 1835), which in some recent implementations include flywheel UPS devices. Even some of the best double conversion UPS units used in data centers have power efficiencies that vary as their load changes.

Figure 20:
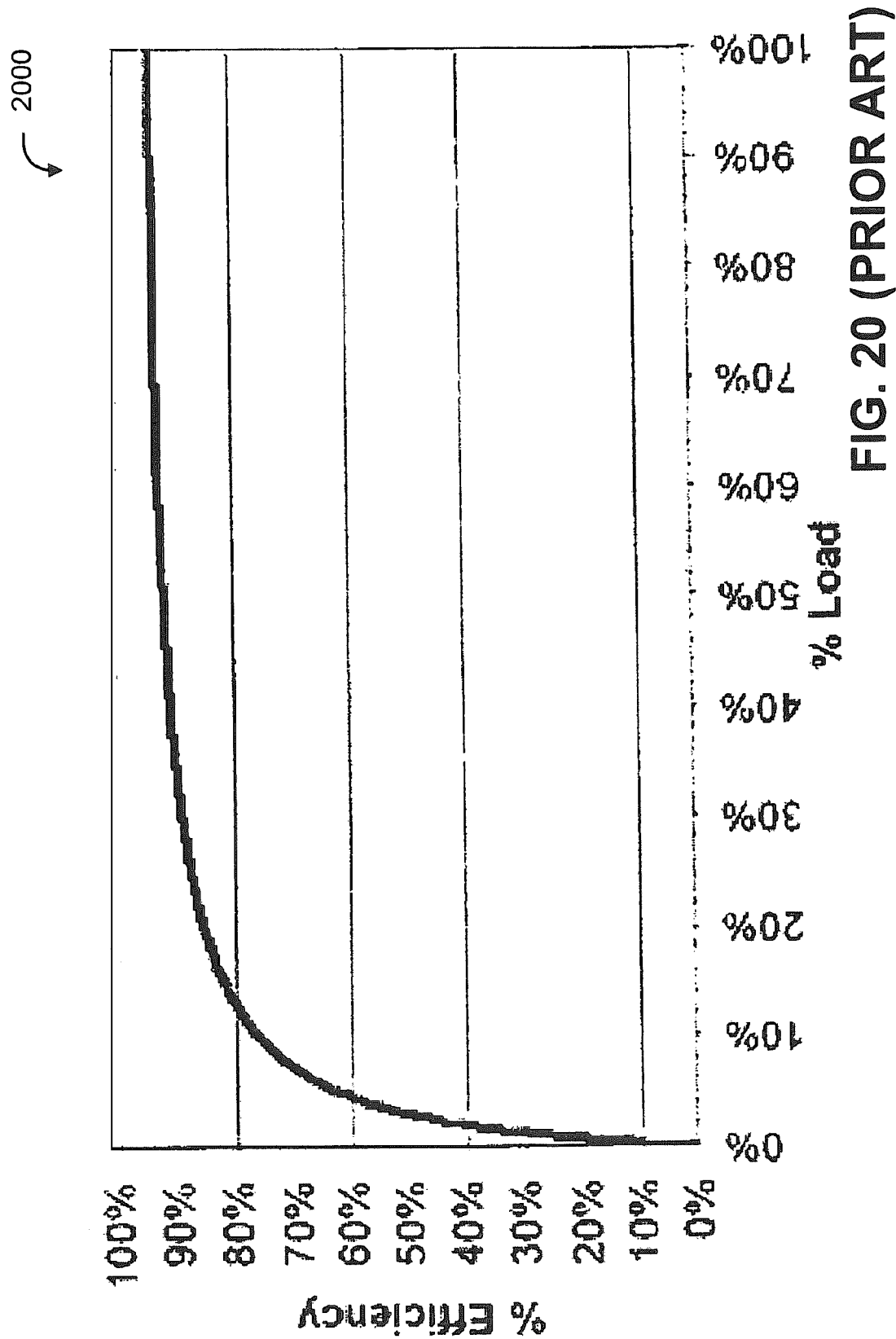
FIG. 20 illustrates an efficiency versus load graph for a typical double-conversion UPS unit.

For example, FIG. 20 illustrates an efficiency versus load graph for a typical double-conversion UPS unit. For example, standard UPS units may typically average 85-90% efficiency, and flywheel UPS units may average around 94% efficiency at typical load levels. This level of efficiency may be unacceptable in many instances, for example, when power costs are stable and relatively low, and when climate impacts of carbon-based fuels are appreciated. Recently, power has quickly changed from an inexpensive commodity to an expensive buy that has substantial economic and environmental costs and key implications for national economies and national security. A traditional UPS powered data center more typically has efficiencies in the 88-92% range, for example, because data center managers tend to run UPS units at less than 100% capacity to account for any needed equipment adds, moves, or changes. Also, often the load between the UPS units is divided so that each has approximately ½ the load of the total data center. In this case, neither UPS can be loaded above 50%, since to be redundant, either UPS must be able to take the full load if the other UPS fails. This pushes the UPS efficiency even lower, since each unit will usually not be loaded up above 40-45% so that the data center manager has some available UPS power capacity for adds, moves, or changes of EDP equipment in the data center.

It is worth noting that the number of very large data centers that house extremely high numbers of servers has been increasing, such that server deployment numbers are extremely high. There are a number of commercial organizations today that have in excess of one million servers deployed. With facilities of this scale and the increasing long-term cost of power, making investments in maximizing power usage efficiency can make good sense, economically, environmentally and in terms of national security.

As discussed above, there are several reasons to put multiple (e.g., dual or N+1 are the most common configurations) power supplies into EDP equipment 1885. One reason is to eliminate a single point of failure through redundancy. However, modern power supplies are very reliable, having a typical Mean Time Between Failure (MTBF) value of about 100,000 hours (i.e., 11.2 years), which may be well beyond the service life of most EDP equipment 1885. Another reason that multiple power supplies are used is to allow connection to more than one branch circuit. As discussed above, the branch circuit tends to be the most common point of failure for power distribution. Yet another reason is that having dual power connections makes power system maintenance much easier, for example, by allowing one power source to be shut down without affecting end user EDP equipment 1885.

However, putting multiple power supplies in EDP equipment 1885 can have various costs. One cost arises from the purchase of the additional power supply(s). For example, the supplies are often specific to each generation of equipment, and therefore must be replaced in each new generation of equipment, which can be as short as three years in some organizations for typical servers.

Further, servers are currently most cost-effective when bought in the "pizza box" form factor. For example, servers deployed in large data centers are typically all "commodity" Intel X86 architecture compatible central processing units (CPU's). These servers are used to power most of the large server farms running large websites, cloud computing running VMWare or other virtualized solutions, high performance computing (HPC) environments, etc. Commodity servers have great pressure to be cost competitive, especially as regards their initial purchase price. This in turn can influence the manufacturers' product managers to choose the lowest cost power supply solutions, potentially at the expense of yielding the best power efficiency.

Another cost of additional power supplies is that each power supply has an associated loss factor. For example, power supplies are not 100% efficient and costs can be reduced by designing the supplies to run most efficiently at a given load range (e.g., typically +/−20% of the optimum expected load). Many power supplies have an efficiency curve that resembles that shown in FIG. 20. Notably, a product manager for a server manufacturer may desire to sell a server in two configurations, with one or two power supplies, and may prefer to stock only a single power supply model to avoid additional costs due to stocking, selling, and servicing two models of power supplies. This can trade capital expense (the server manufacturer can sell the server at a lower initial price point) for operational expense. For example, with two AC-to-DC power supplies, the DC output bus will typically be a common shared passive bus in the class of commodity server that is most often used in large scale deployments. Adding power source switching to this class of server to gain back efficiency (e.g., when only one power supply at a time takes the load) may be too expensive for the market being served and can add another potential point of failure for which additional costs may be incurred to add redundancy for greater reliability.

Further, typical modern EDP power supplies are almost all auto-ranging (i.e., they accept 110-240V input) and all switched (i.e., they draw on the AC input power for just a short period of time, convert that energy to DC, then repeat). Power supplies of this type can be more resistant to power quality problems, because they only need to "drink" one gulp at a time, not continuously. If the input AC power voltage range is controlled within a known range, they will typically function very reliably. While the power supplies may require sufficient energy in each "gulp" and that the input power is within the limits of their voltage range tolerance, they may not require perfect input AC waveforms to work well. This can make it possible to use a data center power distribution system that is much more efficient than a fully UPS-supplied power system at a very reasonable capital expense.

Embodiments address efficient power distribution (e.g., in data centers) using highly parallel automatic transfer switching. As discussed above, a primary source of loss in traditional data center power systems is the UPS unit(s) (e.g., due to conversion losses). One technique for avoiding these losses is to use filtered utility line power, though this can bring a set of issues that need to be solved before the methodology can be practical.

FIG. 21 shows an illustrative power distribution topology 2100, according to various embodiments. As described above, the power distribution topology 2100 can be considered as having a core infrastructure, which can include a site transformer 1815 (e.g., a step down transformer fed by the utility grid 1805), a local generator 1820, and a main switch gear 1825. The site transformer 1815 and the local generator 1820 act as two independent sources of power for the power distribution topology 2100. In some implementations, main switch gear 1825 can allow the entire core infrastructure to be switched to alternate power (e.g., from the site transformer 1815 to the local generator 1820).

Power is provided from the core infrastructure to the root nodes of the power distribution topology 2100. As illustrated, core power is delivered from the main switch gear 1825 to one or more UPSs 1835 and a Transient Voltage Surge Suppression (TVSS) unit 2110. The TVSS acts as a very efficient (e.g., often above 99.9%) and mature technology for filtering input power to the distribution nodes of the topology. By contrast, UPSs 1835 may typically be between 85% and 94% efficient (or less).

In this configuration, the root nodes of the power distribution topology 2100 effectively deliver an efficient, primary ("A") power source 760 and a less efficient, secondary ("B") power source 765. Each of these power sources is then routed through the distribution nodes of the power distribution topology 2100. For example, one or more panelboards 1855 (e.g., main and/or zone panelboards 1855) are used to distribute "A" power 760 and "B" power 765 to the equipment racks 1875 at the leaf nodes of the power distribution topology 2100.

In some implementations, the panelboards 1855 deliver power to receptacles 2125 (e.g., standard 120-volt NEMA receptacles). Each equipment rack 1875 includes at least a first plugstrip 1880a having a plug 2120 configured to plug into a receptacle 2125 supplying "A" power 760, and a second plugstrip 1880b having a plug 2120 configured to plug into a receptacle 2125 supplying "B" power 765. Accordingly, both "A" power 760 and "B" power 765 are delivered by the power distribution topology 2100 all the way to the equipment racks 1875 in which the EDP equipment 1885 is installed.

Each piece of EDP equipment 1885 for which ATS functionality is desired can be supplied with redundant power (i.e., both "A" power 760 and "B" power 765) through the plugstrips 1880 by exploiting micro-ATS 700 functionality. As illustrated, micro-ATSs 700 are electrically coupled with (e.g., plugged into) "A" power 760 and "B" power 765 (e.g., via the first and second plugstrips 1880, respectively), and are electrically coupled with one or more pieces (e.g., typically one or a small number) of EDP equipment 1885. According to a typical operational profile, the micro ATSs 700 are configured to deliver "A" power 760 to the EDP equipment 1885 with it is of sufficient quality and to switch over to "B" power 765 when a partial or complete power failure is detected on "A" power 760.

Figure 22A:
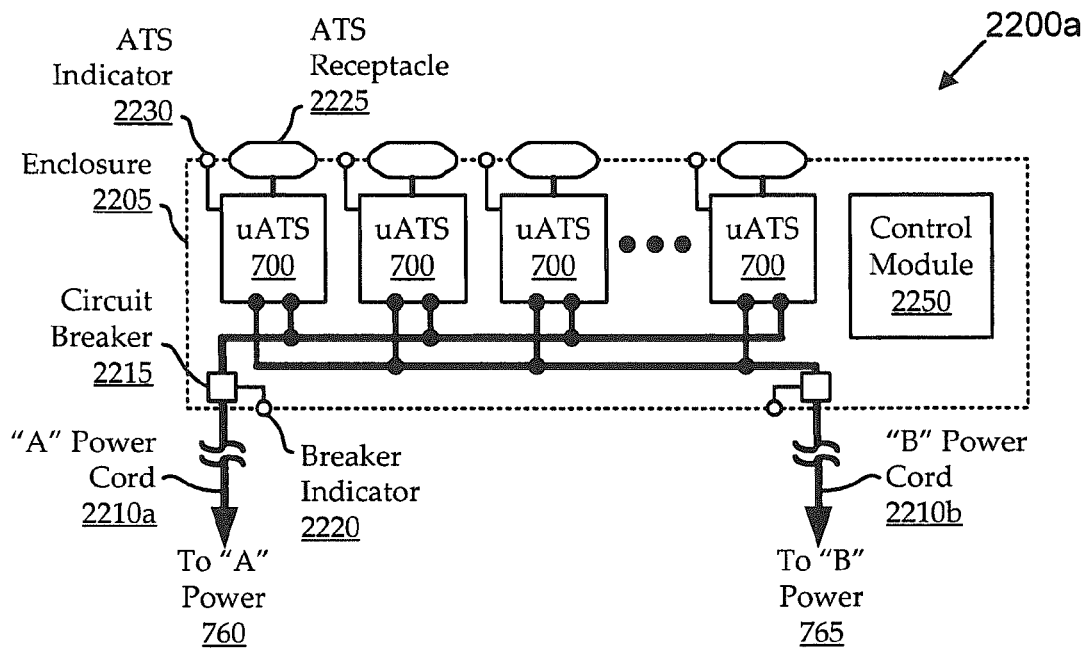
FIGS. 22A and 22B show illustrative parallel micro-ATS modules, according to various embodiments.
Figure 22B:
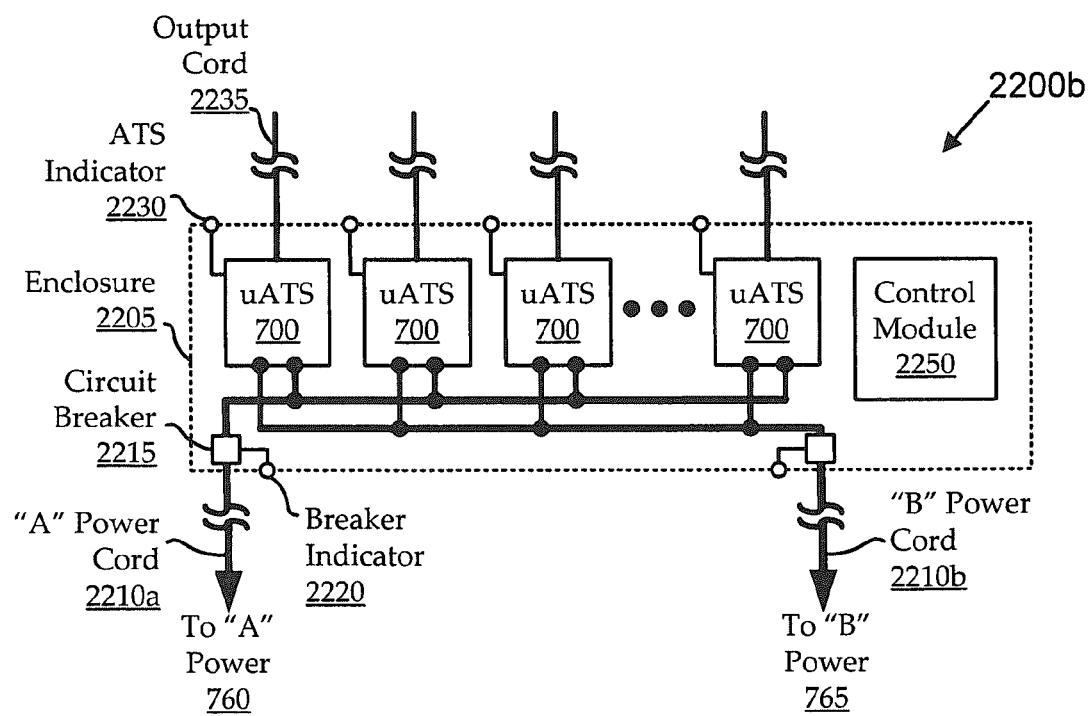

Some additional features can be realized by deploying multiple micro-ATSs 700 in a highly parallel fashion as a module. FIGS. 22A and 22B show illustrative parallel micro-ATS modules 2200, according to various embodiments. According to some implementations, the parallel micro-ATS modules 2200 are configured to fit within a single rack space ("1U"). A rack-mountable enclosure 2205 contains two or more micro-ATSs 700 (e.g., twelve) configured to operate in a parallel fashion.

As illustrated, the parallel micro-ATS modules 2200 connect to "A" power 760 and "B" power 765 (e.g., via an "A" power cord 2210a and a "B" power cord 2210b, respectively). The amperage of the "A" and "B" power sources can be chosen to match the number of auto-switched output receptacles (described below) and their anticipated average and/or maximum power draw. The parallel micro-ATS modules 2200 takes input power from "A" power 760 and "B" power 765 and distributes to its component micro-ATSs 700. The "A" and "B" power sources may be single phase, split-phase or three-phase, though they may typically be substantially identical.

Each component micro-ATSs 700 feeds an output receptacle (ATS receptacle 2225 of FIG. 22A) or a hard-wired power cord (output cord 2235 of FIG. 22B). In some embodiments, the ATS receptacle 2225 or output cord 2235 is accessible via the face (e.g., rear face) of the enclosure 2205 for connection with EDP equipment 1885 in the equipment rack 1875. Certain embodiments also include one or more ATS indicators 2230 that can indicate, for example, whether a particular micro-ATS 700 is functioning properly, which power source is currently being supplied, etc. In some embodiments, the parallel micro-ATS modules 2200 include circuit breakers 2215, optionally with visual power status indicators 2220, to allow disconnecting the parallel micro-ATS modules 2200 electrically from the branch circuits that feed it (i.e., from "A" power 760 and/or from "B" power 765).

As illustrated, some embodiments also include a control module 2250 to provide control functionality for improved parallel operation of the component micro-ATSs 700 in the parallel micro-ATS modules 2200. According to certain embodiments, the control module 2250 helps parallelize operation of the multiple component micro-ATSs 700. In other embodiments, the control module 2250 offloads certain functionality of the component micro-ATSs 700. For example, in some implementations, the parallel micro-ATS module 2200 is designed to switch all its micro-ATSs 700 upon detection of the same condition (e.g., a particular threshold reduction in power quality). In these types of configurations, certain implementations move functionality of the detection components (e.g., one or more of the "A" power voltage range detect subsystem 710, "A" power loss detect subsystem 715, output current detect subsystem 740, etc.) to the control module 2250. When the control module 2250 detects a power failure in the "A" power 760 source, for example, it may force all the component micro-ATSs 700 in the parallel micro-ATS module 2200 to switch their outputs to "B" power 765.

Embodiments of the parallel micro-ATS modules 2200 are configured so that the enclosure 2205 can be mounted within the equipment rack 1875, on top of the equipment rack 1875, or the side of the equipment rack 1875. The size of the enclosure 2205 can be minimized due to the very small form factor of component micro-ATSs 700. Some implementations of the enclosure 2205 are configured to have dimensions within one NEMA standard rack unit (e.g., 1.75-inches in height). For example, embodiments of the micro-ATSs 700 have dimensions of 4.25 inches deep by 1.6 inches high by one inch wide, so that twelve or more micro-ATSs 700 can easily fit within a parallel micro-ATS modules 2200, along with any cabling, control circuitry, buses, cooling, etc.

Figure 23:
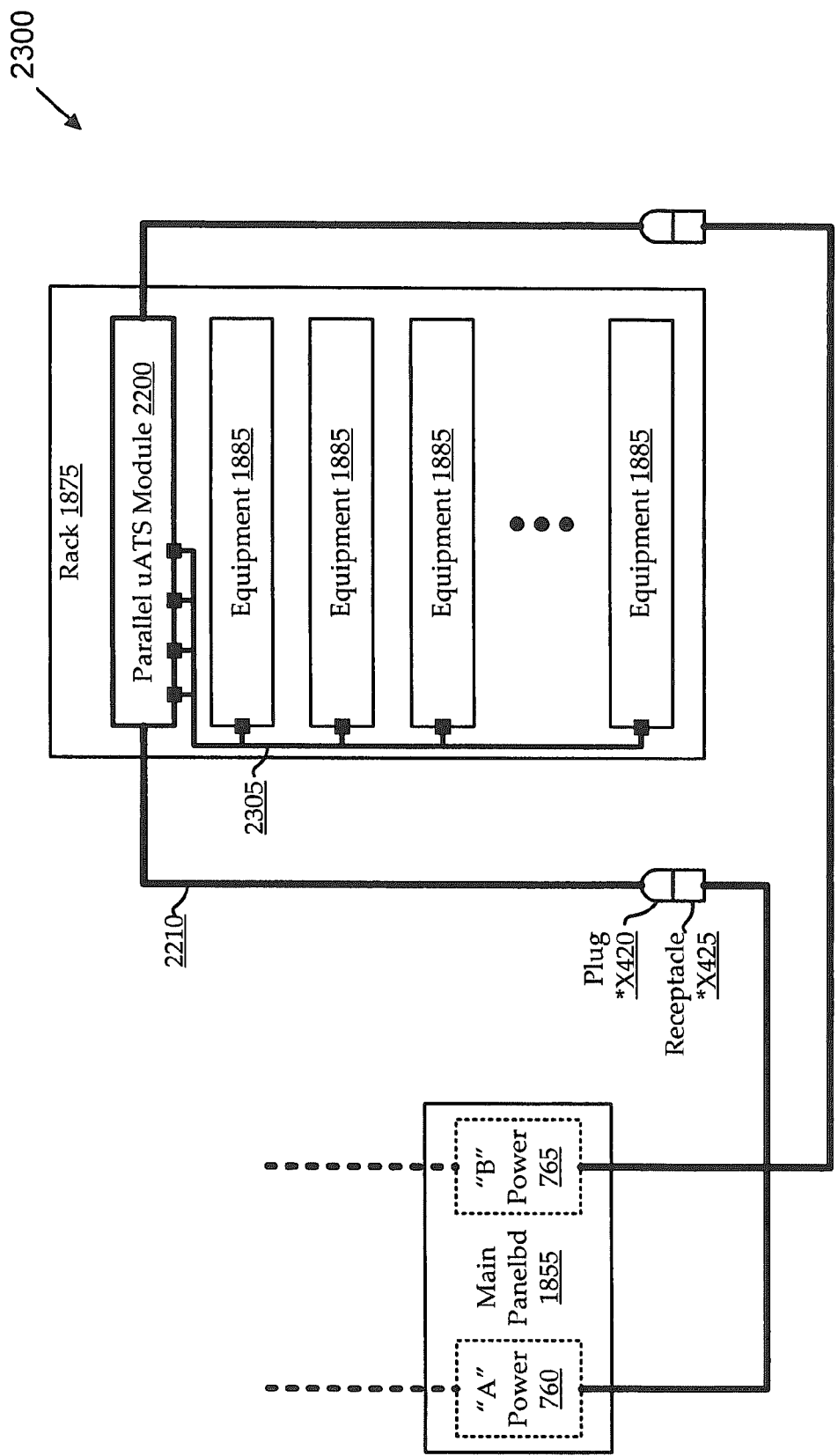
FIG. 23 shows an illustrative power distribution topology that includes a rack-mounted parallel micro-ATS module, according to various embodiments.

FIG. 23 shows an illustrative power distribution topology that includes a rack-mounted parallel micro-ATS module 2200, according to various embodiments. Though not shown, it is assumed that a core infrastructure is used to provide at least two independent sources of power. The power sources can be delivered through one or more root nodes to one or more distribution nodes. As illustrated, root nodes of the power distribution topology 2300 effectively deliver a primary ("A") power source 760 and a secondary ("B") power source 765 through one or more panelboards 1855.

In some implementations, the panelboards 1855 deliver power to receptacles 2125 (e.g., standard 120-volt NEMA receptacles). Each equipment rack 1875 includes a parallel micro-ATS modules 2200 that can connect with the "A" power 760 and the "B" power 765 sources using input power cords 2210 (e.g., via respective plugs 2120 configured to plug into respective receptacles 2125). Accordingly, both "A" power 760 and "B" power 765 are delivered by the power distribution topology 2300 all the way to the equipment racks 1875 in which the EDP equipment 1885 is installed via the parallel micro-ATS modules 2200.

Each piece of EDP equipment 1885 for which ATS functionality is desired can be supplied with redundant power (i.e., both "A" power 760 and "B" power 765) by being connected to a component micro-ATS 700 of the parallel micro-ATS module 2200. For example, as discussed above, the connection to the parallel micro-ATS module 2200 may be implemented using a receptacle (e.g., ATS receptacle 2225 of FIG. 22A) or an output power cord (e.g., output cord 2235 of FIG. 22B). The illustrated embodiment shows cords 2305 connecting the parallel micro-ATS module 2200 with each piece of EDP equipment 1885.

According to various embodiments, "hydra" power cords are included. For example, the cords 2305 may be combined into a single hydra cord to further allow the dimensions of the equipment rack 1875 to be optimized to most efficiently use data center floor space and to allow the maximum number of racks to be deployed in a given area of floor space. Hydra cords can be optimized to increase power efficiency delivery, cord routing, eliminate cord tangle, and incorporate locking power cord functionality. In some embodiments, the hydra power cords are connected to the parallel auto-switch module via standard receptacles, locking or non-locking or directly attached via hard-wire. In environments where the contents of the equipment rack are pre-designed, the hydra cords can be used as a wiring harness for the "programmed deployment."

The number of heads on the hydra cord can be varied to match the desired average power output to each connected end-user device. The length and gauge of the hydra power cord (both the main feed section and the separate feeds to each "hydra head") can be optimized to minimize electrical transmission losses and power cord tangle by optimizing the cord lengths for each hydra cord to supply power to a particular set of equipment positions in the equipment rack 1875. A set of appropriately sized hydra cables can be used to feed each equipment location in the rack at whatever interval is desired, such as one NEMA standard equipment mounting space. At various points in the topology (e.g., at plugs or receptacles of the parallel micro-ATS modules 2200, at the hydra cord heads, etc.) locking power cord technologies can be used to improve the security of power delivery. For example, standard NEMA L5-15 locking receptacles for 120V service or NEMA L6-15 receptacles for 200V+ service can be used. The "hydra cord head" on the output cords can be equipped with IEC locking receptacles (C13 and C19) using various technologies.

It is worth noting that, although the enclosure 2205 takes up rack space, it can also eliminate the need for in rack plugstrips 1880, which are typically mounted vertically in the equipment rack 1875. Accordingly, data center floor space can be optimized by reducing the width of each equipment rack 1875. For example, equipment racks 1875 are often around 27" wide to allow adequate space to mount a variety of vertical plugstrips 1880, which do not have industry standardized dimensions. The NEMA standard equipment width that is most commonly used is 19 inches. Therefore the total width and depth of the rack determine its floor area usage. By eliminating the need to run anything but power cords and network cords down the sides of the rack, it is possible to specify narrower racks, down to a width of approximately 21 inches. For the sake of illustration, suppose 24-inch wide racks (which would align onto standard two-foot by two-foot floor tiles used in most raised floors) are used instead of 27-inch wide racks. Nine 24-inch racks could be deployed in the same floor space that previously accommodated only eight 27-inch racks.

It is further worth noting that a typical rack-mountable ATS can cause the entire set of EDP equipment 1885 in the rack to fail if the ATS fails (e.g., as in embodiments of the configuration illustrated in FIG. 18C). However, the highly parallel implementation described herein can minimize the domain of failure to only the one (or small subset) of end-user devices that are powered by each individual micro-ATS 700 in the parallel micro-ATS module 2200. This can appreciably improve reliability, servicing, etc.

Power distribution topologies, like the ones illustrated in FIGS. 21 and 23, provide a number of features. One such feature involves input voltage range control. Modern power supplies can tolerate a wide range of power quality flaws, but they typically cannot survive lengthy input power over-voltage conditions. The TVSS unit 2110 can filter transient surges and spikes, but it does not compensate for long periods of input power over-voltage (i.e., these are passed through to the root nodes). To guard against these conditions, embodiments address out-of-range voltages (e.g., modern power supplies are not typically damaged by under-voltage conditions, but will still shutdown) by switching to the conditioned UPS power if the utility line power voltage goes out of range.

A number of techniques are possible for implementing this switching. For example, voltage sensing and auto-switching could be implemented at different locations in the data center power system. However, for at least the reasons discussed above, many of these techniques have significant limitations. Accordingly, embodiments typically use one of the following techniques.

Some embodiments implement over-voltage protection at the utility step-down transformer (e.g., site transformer 2110). Auto-ranging transformers of this type are available and can often be ordered from utility companies. Configurations have a set of taps on their output coil and automatically switch between them as needed to control their output voltage to a specified range. Step-down transformers of this type of this type are not usually deployed by utility companies (e.g., because of cost), but they can often be specified and retrofitted for power distribution topologies if requested.

Other embodiments implement over-voltage protection at an ATS in the power distribution topology. As described above with reference to FIGS. 18A-18D, 21, and 23, ATSs can be placed in a number of locations throughout the topology, for example, including at panelboards, at the end of a branch circuit, at the device level, etc. The power distribution topologies shown in FIGS. 21 and 23 illustrate implementing the switching by placing micro-ATSs 700 at the device level. It should be noted that a semiconductor-based ATS could be used upstream of the UPS, but this can be relatively very expensive, and a failure of the ATS could result in potentially catastrophic effects, as all of the powered EDP units could have their power supplies damaged or destroyed if the ATS unit fails to switch.

Another feature of power distribution topologies using micro-ATSs 700 is the availability of auto-switching of all single power supply (or cord) EDP devices. If utility line power fails, it is desirable for all single power supply EDP devices to be switched to a reliable alternate power source, such as power supplied via the UPS. EDP equipment 1885 may require that the switching is accomplished within a predetermined maximum time (e.g., the CBEMA 20 millisecond guideline). Notably, while plugging all devices directly into the UPS would provide highly reliable power, it would also appreciably reduce power distribution efficiency over any implementation that only uses the UPS during the times when utility power is down. This can have significant impacts in environments like large server farms, where the cost constraints are such that single power supply configurations for the massive number of servers are greatly preferred for cost and efficiency reasons, and services will not be much or at all interrupted by the loss of a single or a few servers.

Yet another feature of power distribution topologies using micro-ATSs 700 is auto-switching of all dual (or N+1) power supplies in EDP devices. EDP equipment 1885 implemented with multiple power supplies typically share the load among their available power supplies. It is possible to build an EDP device that switches the load between power supplies, so that only one or more are the active supplies and the others are idle, but as described earlier, this is rarely done for both cost and reliability reasons. Embodiments ensure that multi-power-supply EDP equipment 1885 draw on only filtered utility line power if it is available (and of sufficient quality) and switch to the UPS only if it is not. To this end, embodiments auto-switch each secondary power supply unit between the utility line and UPS power. Otherwise, the UPS unit will bear a portion of the data center load, which can lower the overall efficiency of the power distribution.

Still another feature of power distribution topologies using micro-ATSs 700 is avoidance of harmonic reinforcing power load surges. If utility line power fails, all EDP devices must draw on the UPS unit until the generator starts and stabilizes. Modern generators used in data centers have very sophisticated electronics controlling their engine "throttle". The control logic of the generator is designed to produce maximum stability and optimum efficiency. However, it takes a certain amount of time to respond to a changed electrical load and then stabilize at that new load. If the load put on the generator changes too fast in a repeating oscillation pattern, it is possible to destabilize the generator, by defeating its control logic and forcing it to try to match the oscillations of the power demands. This can either damage the generator or force it to shutdown to protect itself. In either case the data center can potentially go off-line, which can be a very undesirable result. There are several potential scenarios that can potentially cause this problem.

One such scenario is when there is an intermittent utility line failure. Utility line power is outside the control of the data center operator. It can be affected by weather, equipment faults, human error and other conditions. It can fail intermittently which poses a potential hazard to the core data center power infrastructure. If utility power goes on and off intermittently, and the timing of the on-off cycles is within a certain range, auto-switching between the utility line source and the generator (even filtered by the UPS units) can result in harmonic reinforcing power load surges being imposed on the generator.

For example, suppose utility line power from the site transformer 1815 fails. As desired, power is switched to UPS 1835 power. Eventually, a timeout occurs, causing the local generator 1820 to auto-start. When the local generator 1820 stabilizes, it may be switched into the system by the main switch gear 1825, thereby feeding the UPSs 1835. At some point, utility line power returns and then goes off again. The local generator 1820 will not have shutdown, but the main switch gear 1825 may now switch between the local generator 1820 and site transformer 1815 power sources. Any equipment-level ATSs (e.g., micro-ATSs 700 at the EDP equipment 1885) will return to line power when it is back on. Notably, however, the timing of this return may be critical: if it happens too fast for the local generator 1820 to respond properly, and utility line power fails in an oscillating fashion, the local generator 1820 may become destabilized, as described above.

Another such scenario occurs when there is load/voltage oscillation. When a load is switched onto the local generator 1820, especially a large load, its output voltage can momentarily sag. The local generator 1820 may then compensate by increasing throttle volume and subsequent engine torque, which increases output current and voltage. There are mechanisms to keep the output voltage in a desired range, but they can be defeated by a load that is switched in and out at just the right range of harmonic frequency. This can happen, for example, if the power distribution system has protection from overvoltage built into it via mechanisms (e.g., as described below). Again, the result can be harmonic reinforcing power load surges being imposed on the local generator 1820.

For example, suppose again that utility line power from the site transformer 1815 fails. As desired, power is switched to UPS 1835 power, a timeout occurs, and the local generator 1820 auto-starts. When the local generator 1820 stabilizes, it may be switched into the system by the main switch gear 1825 (e.g., the local generator 1820 is switched into the system to feed the utility line power side of the system in preference to feeding through the UPS in order to maintain redundant feeds to the racks w/ EDP equipment). The local generator 1820 sags under the large load suddenly placed on it and may respond by increasing its throttle setting. The local generator 1820 overshoots the high voltage cutoff value of the micro-ATS 700 units, causing them to switch back to UPS power, thereby removing the load from the local generator 1820. The local generator 1820 then throttles back and its output voltage returns to normal levels. The micro-ATS 700 units switch back to the generator, causing it to sag again. The sag and return of the local generator 1820 throttle can repeat, causing a harmonic reinforcing power load surge to build up and destabilize the local generator 1820.

As discussed above, implementation of a power distribution topology using micro-ATSs 700 (e.g., alone or as part of a parallel micro-ATS module 2200) involves a number of features, particularly when the implementation is to include safe, reliable, and economical use of filtered utility line power. These features include input line power voltage range control, auto-switching of single power cord EDP devices, auto-switching of dual (or N+1) power supply EDP devices, prevention of harmonic reinforcing load surges. These features can be realized by auto-switching at the device or near-device level in the power distribution topology. However, to realize these features, embodiments of micro-ATSs 700 are used having a number of characteristics. It will be appreciated that the micro-ATS 700 embodiments described above manifest these characteristics either by virtue of their design as a single micro-ATS 700 embodiment or when combined into a highly parallel ATS embodiment (e.g., as part of a parallel micro-ATS module 2200).

Embodiments of the micro-ATS 700 prefer and select the primary power source (e.g., "A" power 760) when it is available and of sufficient quality. For example, maximum efficiency may be realized by ensuring that, if utility line power is available and of sufficient quality, it is being used to power all loads.

Embodiments of the micro-ATS 700 also protect against out-of-range voltage conditions on the primary power source and switch to the secondary power source if the primary power source is out of range (and switch back to the primary source when it returns to the acceptable range and is stable). It is also desirable that the micro-ATS 700 switch to the secondary power source as a precaution when other primary power source issues are detected. Some embodiments may not manifest this characteristic, as they may exploit the fact that modern power supplies are relatively immune to power quality issues other than input voltage range.

Further, embodiments of the micro-ATS 700 transfer within the CBEMA 20-millisecond limit in both directions (i.e., from primary to secondary power and from secondary to primary power). In fact, some embodiments switch from "A" power 760 to "B" power 765 in 14-16 milliseconds. While circuit embodiments described above can be configured to achieve even faster switching times, switching times are selected also to maximize rejection of false conditions that could initiate a transfer. In some embodiments, transfer times between "B" power 765 and "A" power 760 are approximately 5 milliseconds once initiated (e.g., after a delay, as described below). For example, this transfer timing can be achieved because most "B" power 765 to "A" power 760 transfers occur after "A" power 760 has returned to an operational condition, so that the micro-ATS 700 can select the time to make the transfer when both power sources are up and running.

Embodiments of the micro-ATS 700 also incorporate a delay factor in secondary to primary power switching (except if the secondary power source fails). The delay factor chosen is sufficient to allow modern generators to stabilize their throttle settings and not oscillate. For example, the time is selected to be outside of the normal response time characteristics of most typical generators to prevent harmonic reinforcing load surges by allowing the generator time to adapt to the load change and to stabilize its output.

Even further, embodiments of the micro-ATSs 700 are configured to use minimal or no valuable rack space that could be used for EDP equipment 1885. For example, embodiments mount in a "zero-U" fashion or are otherwise integrated into or near the rack without using rack space. Certain embodiments are integrated into EDP equipment 1885 directly. Other embodiments are integrated into plug-strips 1880 or in-rack or near-rack power distribution units such as the Zonit Power Distribution Unit (ZPDU). These embodiments may trade a minimal amount of rack space usage against access at the rack to the circuit breakers controlling power to the plugstrips 1880 in the racks. According to certain of these embodiments, the ATS function is integrated into every sub-branch output of the local power distribution unit, so that each one is auto-switched. This can be a worthwhile trade-off to some data center managers.

Still further, embodiments of the micro-ATS 700 (e.g., when deployed as parallel micro-ATS modules 2200) also "spread" the load on the source being transferred. In practice, each micro-ATS 700 has a small degree of variability in its timing of transfers from "B" power 765 to "A" power 760 with respect to other micro-ATS 700 (e.g., as an artifact of the manufacturing process). The variability is not large in real time but is significant in electrical event time. When running the micro-ATSs 700 as components of a parallel micro-ATS modules 2200, the variance "spreads" the load being transferred as seen by the power source, for example, a generator or UPS unit. For instance, the load appears to the power source as a large number of micro-ATS 700 transfers over a time window. This can be beneficial to generators and UPS units, since it distributes a large number of smaller loads over a period of time, thereby reducing instantaneous inrush.

Embodiments of the micro-ATS 700 are also highly efficient, reliable, and inexpensive. When deploying micro-ATS 700 units at the device level, there will be a large number of them, and they must therefore be efficient enough to offset the cost of their purchase. Embodiments use less than 100 milliwatts when on the primary power source in normal operational mode. In a related sense, they must be highly reliable and otherwise inexpensive to purchase.

As discussed above, features of the micro-ATS 700 allow deployment of device-level ATS functionality that is reliable, efficient, cost-effective, and of minimal impact to rack space usage. For reasons discussed above, a population of highly reliable ATS units at the device level can produce much higher per-device power reliability levels than an ATS that switches a branch circuit or an entire panelboard can. For example, the chance that all micro-ATSs 700 will fail at the same time and affect all their connected, auto-switched EDP devices is infinitesimal as compared to the chance that a single ATS deployed closer to the root of the power distribution topology will fail.

Additionally, it is desirable that techniques for data center power distribution are highly efficient. Highly parallel implementations of device or near-device level auto-switched power distribution can provide a highly efficient approach that is also cost-effective to implement for several reasons. As noted above, mechanical relay-based ATSs tend to be more efficient more reliable (at given cost levels) than solid-state based ATSs, but they may also exhibit relatively high loss due to contact resistance and relatively higher relay transfer times. However, using many small ATS units in parallel at the device or near-device level (e.g., as parallel micro-ATS modules 2200) yields an effective cumulative relay contact area that is much greater than is feasible to put in a higher capacity relay-based ATS unit regardless of where that unit is placed in the power distribution topology. Further, deploying the micro-ATS 700 units in parallel micro-ATS modules 2200 also allows for a relatively fast transfer time because each component ATS has smaller relay contacts faster transfer times. It will be further appreciated that the circuit embodiments described above allow the micro-ATS 700 to be more efficient than many traditional ATS unit designs of the same power handling capacity by a factor of 10 or more. It is worth noting that use of traditional ATS designs in a highly parallel configuration may not be practical for at least this reason, as the net result would likely be to consume more power rather than less power, regardless of the capital expense of the switching units used.

It will be appreciated that data center power distribution techniques should be cost-effective if they are to be widely used and accepted. As discussed above, micro-ATS 700 embodiments are highly cost-effective, due, for example, to relatively low manufacturing costs, relatively long service life, etc.

A related concern may be preserving rack space wherever possible. As discussed above, space in a data center equipment rack or cabinet can be very expensive, and embodiments of the micro-ATS 700 can be deployed to consume little or no rack space (e.g., by being integrated into the rack structure outside of the volume in the rack where EDP equipment is mounted). For the sake of illustration, suppose a large server farm in a data center has many "pizza-box" servers in a rack with a network switch. Each server may use around 3-6 watts of 120-volt power, such that a 15-amp ATS can handle 2-4 servers. If the ATS units are 1U rack-mounted devices, using one ATS for every 3 servers would still consume 25% of the rack space. This may typically be too inefficient a use of expensive rack space to be practical. However, use of a parallel micro-ATS module 2200 would consume much less rack space (e.g., even a rack-mounted implementation typically uses a single rack space).

It is worth noting that use of the micro-ATSs 700 (e.g., as part of a parallel micro-ATS module 2200) can also increase efficiency for traditional power distribution via UPS load shifting. As discussed above, it is common to share loads when double-conversion UPS units are used in a data center as the power sources (e.g., as illustrated in FIG. 19). This is usually due to the nature of the end use equipment having dual power supplies that distribute the load more or less equally to both the "A" and "B" power supply inputs. Also, as discussed above, this can reduce UPS efficiency, since they are typically loaded at below 50% to provide fully redundant power.

Using large numbers of micro-ATSs 700, it is possible to raise the efficiency of such a power distribution system. All of the electrical load for EDP equipment 1885 in the data center can be "load shifted" via micro-ATS 700 units onto one of the two UPS units, increasing the efficiency of that UPS unit (e.g., as shown in the UPS efficiency curve shown in FIG. 20). The other UPS unit is at idle and will only be used if the primary unit fails. The UPS units must be designed to handle this type of load being immediately placed on them, but almost all modern UPS units can do this. The result tends to be an increase of approximately 3-5% in the efficiency of the data center.

Implementations can be deployed incrementally for each piece of EDP equipment 1885, which can reduce service impacts. In some embodiments, every power supply (or corded) EDP device will be connected via a micro-ATS 700 to the "A" and "B" UPS units. Every dual or N+1 power supply EDP device will have one power supply connected to the "A" UPS via a normal power cord, and the second or all other N+1 power supplies will be connected to the "A" and "B" UPS units via micro-ATS 700 units. Accordingly, when the "A" UPS unit is available, it takes all the load; and when it is not, the "B" UPS carries the load. As discussed above, the micro-ATS 700 units can be deployed at a per-device ratio, or at a ratio of one micro-ATS 700 to a low integer number of EDP devices (e.g., respecting micro-ATS 700 power capacity limits).

It should be noted that while only one pair of UPS units is discussed here the methodology scales to larger data centers that have many UPS units deployed in pairs for redundancy. Similarly, the illustrative embodiments discussed herein show limited configuration options for the sake of clarity. It will be appreciated that embodiments can be adapted to any number of equipment racks, EDP equipment, ATSs, panelboards, plugstrips, etc.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. Accordingly, the appended claims include within their scope such processes, machines, manufacture, compositions of matter, means, methods, or actions.

What is claimed is:

1. A parallel auto-switching module comprising:
   an enclosure having a vertical height dimension sized to occupy no more than two standard equipment rack spaces;
   a plurality of independent automatic transfer switches disposed within the enclosure, each configured for:
   receiving a first parallel power feed from a primary power source disposed external to the enclosure;
   receiving a second parallel power feed from a secondary power source disposed external to the enclosure;
   detecting a power failure on the first parallel power feed; and
   automatically switching an output power feed from being electrically coupled with the first parallel power feed to being electrically coupled with the second power feed when the power failure on the first parallel power feed is detected, wherein each of said automatic transfer switches is operative for detecting said power failure and for automatically switching said output power independent of the operation of each other of said automatic transfer switches and free from any manual input to execute said switching.

2. The parallel auto-switching module of claim 1, wherein each automatic transfer switch comprises at least two mechanical relays configured to automatically switch the output power feed from being electrically coupled with the first parallel power feed to being electrically coupled with the second power feed when the power failure on the first parallel power feed is detected.

3. The parallel auto-switching module of claim 1, wherein each automatic transfer switch is configured within a volume of less than ten cubic centimeters.

4. The parallel auto-switching module of claim 1, wherein the enclosure has a height of no more than approximately 1.75 inches.

5. The parallel auto-switching module of claim 1, wherein each automatic transfer switch has a power density of at least two kilowatts per ten cubic inches.

6. The parallel auto-switching module of claim 1, wherein the output power feed of each automatic transfer switch is coupled with a receptacle accessible via an external face of the enclosure.

7. The parallel auto-switching module of claim 1, wherein the output power feed of each automatic transfer switch is coupled with an output power cord configured to interface with a receptacle of a rack-mounted device.

8. The parallel auto-switching module of claim 1, wherein each output power cord is configured to interface with the receptacle via a plug having a means for removably and physically locking the plug to the receptacle.

9. The parallel auto-switching module of claim 1, wherein the first parallel power feed is electrically coupled with a first input power cord in electrical communication with the primary power source, and the second parallel power feed is electrically coupled with a second input power cord in electrical communication with the secondary power source.

10. The parallel auto-switching module of claim 1, wherein:
   at least the primary power source is a polyphase power source;
   the first parallel power feed includes a parallel sub-feed for each phase of the primary power source; and
   each automatic transfer switch comprises a switching circuit corresponding to each sub-feed of the first parallel power feed.

11. The parallel auto-switching module of claim 1, wherein the primary power source and the secondary power sources are polyphase power sources, each parallel power feed includes a parallel sub-feed for each phase of the corresponding power source, and each automatic transfer switch is configured to:

detect the power failure on the first parallel power feed when the power failure is detected on any sub-feed of the first parallel power feed; and automatically switch the output power feed from being electrically coupled with each sub-feed of the first parallel power feed to being electrically coupled with each corresponding sub-feed of the second power feed when the power failure on the first parallel power feed is detected.

12. The parallel auto-switching module of claim 1, further comprising:

a control module configured to synchronize automatic switching of the plurality of automatic transfer modules for polyphase operation.

13. The parallel auto-switching module of claim 1, wherein the plurality of automatic transfer switches comprises twelve automatic transfer switches.

14. A parallel auto-switching equipment rack system comprising:

an equipment rack;

at least three electronic data processing systems mounted in the equipment rack via rack-mountable enclosures; and a parallel auto-switching module disposed at the equipment rack and comprising:

a module enclosure;

at least three automatic transfer switches disposed within the module enclosure, each having an output power feed that is electrically coupled with one of the electronic data processing systems, and each configured for:

receiving a first parallel power feed from a primary power source disposed external to the equipment rack;

receiving a second parallel power feed from a secondary power source disposed external to the equipment rack;

detecting a power failure on the first parallel power feed; and automatically switching its output power feed from being electrically coupled with the first parallel power feed to being electrically coupled with the second power feed when the power failure on the first parallel power feed is detected, wherein each of said automatic transfer switches is operative for detecting said power failure and for automatically switching said output power independent of the operation of each other of said automatic transfer switches and free from any manual input to execute said switching.

15. An equipment rack system, comprising:

an equipment rack having a number of ports for receiving equipment;

a number, N, of electronic data processing systems (EDPs) mounted in at least some of said ports of said rack; and a number, S, of independently operating automatic transfer switches (ATSs) disposed in said rack, each said ATS configured for: receiving input power from first and second external power sources; detecting a power failure related to the first external source; and automatically switching its output power feed to be coupled to the second external source when a power failure related to the first external source is detected, wherein each of said automatic transfer switches is operative for detecting said power failure and for automatically switching said output power independent of the operation of each other of said automatic transfer switches and free from any manual input to execute said switching;

said equipment rack system having a switch density ratio defined as S/N;

said equipment rack system further having a switch overhead ratio, defined as a ratio of the number of the ports occupied only by the ATSs to the number of the ports collectively occupied by the ATSs, and the EDPs, that is less than S/(N+1).

16. A system as set forth in claim 15, wherein said switch density ratio is at least 1/4 and said switch overhead ratio is less than 1/5.

17. A system as set forth in claim 15, wherein said EDPs occupy at least 20 ports of said rack and there are no more than two of said ports occupied solely by ATSs.

18. A system as set forth in claim 15, wherein at least one of said ports, having a height of 1 u, is occupied by both a first EDP and a first ATS.

19. A system as set forth in claim 18, wherein said first ATS is disposed external to a housing of said first EDP.

20. A system as set forth in claim 15, wherein said switch overhead ratio is no more than 1/11.

21. A system as set forth in claim 15, wherein said switch overhead ratio is 0.

22. A system as set forth in claim 15, wherein an alternate switch overhead ratio is S'/N', where N' is a number of rack height u's occupied by the EDPs and S' is a number of rack height u's occupied by at least one ATS and free from any EDPs, and said alternate switch overhead ratio is less than S/(N+1).

23. A system as set forth in claim 15, wherein at least two of said ATSs are disposed in a single one of said ports having a height of no more than 1 u.

24. A method for use in supplying redundant parallel power electronic data processing systems (EDP) mounted in an equipment rack having a number of ports for receiving equipment, comprising the steps of:

disposing a number, N, of EDPs in at least some of said ports of said rack;

disposing a number, S, of independently operating automatic transfer switches (ATSs) in said rack, each said ATS configured for: receiving input power from first and second external power sources; detecting a power failure related to the first external source, and automatically switching its upward power feed to be coupled to the second external source when the power failure related to the first external source is detected, wherein each of said automatic transfer switches is operative for detecting said power failure and for automatically switching said output power independent of the operation of each other of said automatic transfer switches and free from any manual input to execute said switching;

said steps of first and second disposing being accomplished such that said equipment rack has a switch density ratio defined as S/N, and said equipment rack further has a switch overhead ratio, defined as a ratio of the number of the ports occupied by the ATSs to number of ports collectively occupied by the ATSs and EDPs, that is less than S/(N+1); and electrically connecting said ATSs to said EDPs so as to provide parallel, redundant power to the EDPs from the first and second external power sources.

25. A method as set forth in claim 24, wherein said first and second disposing steps are accomplished such that said switch density ratio is at least 1/4 and said switch overhead ratio is less than 1/5.

26. A method as set forth in claim 24, wherein said steps of first and second disposing are accomplished such that said EDPs occupy 20 ports of said rack and there are no more than two of said ports occupied solely by ATSs.

27. A method as set forth in claim 24, wherein said steps of first and second disposing are accomplished such that at least one of said ports, having a height 1 u, is occupied by a first EDP and a first ATS.

28. A method as set forth in claim 27, wherein said first ATS is disposed external to a housing of said first EDP.

29. A method as set forth in claim 24, wherein said steps of first and second disposing are accomplished such that said switch overhead ratio is no more than 1/11.

30. A method as set forth in claim 24, wherein said steps of first and second disposing are accomplished such that said switch overhead ratio is 0.

31. A method as set forth in claim 24, wherein an alternate switch overhead ratio is S'/N', where N' is number of rack height u's occupied by the EDPs and S' is a number of rack height u's occupied by at least one ATS and free from any EDSs, and said steps of first and second disposing are accomplished such that said alternate over ratio is less than S/N+1.

32. A method as set forth in claim 24, wherein said step of second disposing involves disposing at least two of said ATSs in single one of said ports having a height of no more than one u.

33. A method for use in providing redundant parallel power to a number of electronic data processing systems in an equipment rack, comprising the steps of:
providing at least first and second automatic transfer switches, each of said automatic transfers switches configured for receiving a first parallel power feed from an external primary power source, receiving a second parallel power feed from a second external power source, and automatically switching an output power feed from being electrically coupled with the first parallel power feed to being electrically coupled with the second power feed upon detection of a switching event, wherein each of said automatic transfer switches is operative for detecting said power failure and for automatically switching said output power independent of the operation of each other of said automatic transfer switches and free from any manual input to execute said switching, said first and second automatic transfer switches being disposed within an enclosure;
disposing said enclosure in said rack;
operating said first and second automatic transfer switches such that a power failure associated with said primary power source of either said first automatic transfer switch or said second automatic transfer switch is treated as a switching event for both said first automatic transfer switch and said second automatic transfer switch.

* * * * *